US011448775B2

(12) United States Patent
Yang et al.

(10) Patent No.: US 11,448,775 B2
(45) Date of Patent: Sep. 20, 2022

(54) POSITIONING APPARATUS AND METHOD AND SELF-MOVING DEVICE

(71) Applicant: Positec Power Tools (Suzhou) Co., Ltd, Suzhou (CN)

(72) Inventors: Zhou Yang, Jiangsu (CN); Chang Zhou, Jiangsu (CN); Zheming Teng, Jiangsu (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 211 days.

(21) Appl. No.: 16/613,271

(22) PCT Filed: May 25, 2018

(86) PCT No.: PCT/CN2018/088519
§ 371 (c)(1),
(2) Date: Nov. 13, 2019

(87) PCT Pub. No.: WO2018/214978
PCT Pub. Date: Nov. 29, 2018

(65) Prior Publication Data
US 2021/0165109 A1 Jun. 3, 2021

(30) Foreign Application Priority Data

May 26, 2017 (CN) .......................... 201710385778.2
Oct. 18, 2017 (CN) .......................... 201710972337.2
Oct. 18, 2017 (CN) .......................... 201710978239.X

(51) Int. Cl.
*G01S 19/43* (2010.01)
*G01S 19/46* (2010.01)
*G01S 19/47* (2010.01)

(52) U.S. Cl.
CPC .............. *G01S 19/43* (2013.01); *G01S 19/46* (2013.01); *G01S 19/47* (2013.01)

(58) Field of Classification Search
CPC .......................... G01C 21/3697; H04W 4/046; H04W 72/048; H05B 47/11; G01S 19/43;
(Continued)

(56) References Cited

U.S. PATENT DOCUMENTS 9,410,808 B2  8/2016  Park et al.
9,554,508 B2  1/2017  Balutis
(Continued)

FOREIGN PATENT DOCUMENTS

CN  103299209 A  9/2013
CN  103324192 A  9/2013
(Continued)

OTHER PUBLICATIONS

Renaudin et al.,"Step Length Estimation Using Handheld Inertial Sensors", Sensors, vol. 12, No. 12, Dec. 25, 2012, pp. 8507-8525.
(Continued)

*Primary Examiner* — Phuoc H Doan
(74) *Attorney, Agent, or Firm* — Dentons US LLP

(57) ABSTRACT

The present disclosure relates to a positioning apparatus and method and a self-moving device. The positioning apparatus includes a first positioning module (101), a sensor module (102), and a processing module (103). The position of the positioning apparatus is determined according to the positioning result of the first positioning module (101) and the positioning result determined by using the sensor module (102) to measure the acceleration and the angle parameter and based on a pedestrian dead reckoning algorithm, and determine the boundary of the self-moving device. A pedestrian dead reckoning technology independent of an external environment is introduced during boundary positioning, and the pedestrian dead reckoning technology and other positioning technologies are integrated to establish a virtual boundary, so that positioning precision is high, and a precise (Continued)

boundary is established. In addition, it is not necessary to arrange a physical boundary, so that operations of a user are less complex.

20 Claims, 21 Drawing Sheets

(58) Field of Classification Search
CPC ........ G01S 19/46; G01S 19/471; G01S 19/13; G06Q 10/083
USPC ........................................ 455/456.1; 701/118
See application file for complete search history.

(56) References Cited

U.S. PATENT DOCUMENTS 10,991,242 B2 * 4/2021 Taylor ...................... H04Q 9/00
2017/0307399 A1 * 10/2017 Davidsson ............ H04W 4/022

FOREIGN PATENT DOCUMENTS

| | | |
|---|---|---|
| CN | 104035444 A | 9/2014 |
| CN | 105607104 A | 5/2016 |
| CN | 106462161 A | 2/2017 |
| CN | 107462260 A | 12/2017 |
| EP | 3018548 A1 | 5/2016 |
| EP | 3557355 A1 | 10/2019 |
| WO | 2012/093842 A2 | 7/2012 |

OTHER PUBLICATIONS

Communication pursuant to Rule 114(2) EPC for European Application No. 18806033.9 (dated Dec. 21, 2021) (3 Pages).

* cited by examiner

POSITIONING APPARATUS AND METHOD AND SELF-MOVING DEVICE

This application is a National Stage application of International Application No. PCT/CN2018/088519 filed on May 25, 2018, and claims priority to Chinese Application Nos. 201710385778.2 filed May 26, 2017, 201710978239.X, filed Oct. 18, 2017, and 201710972337.2 filed Oct. 18, 2017, which are hereby incorporated by reference in their entirety as if fully set forth herein.

BACKGROUND

Technical Field

The present disclosure relates to the field of positioning technologies, and in particular, to a positioning apparatus and method and a self-moving device.

Related Art

With the development of science and technology, intelligent self-moving devices become well known. Self-moving devices may execute preset related tasks based on automatically preset programs without manual operation and intervention, and are therefore applied widely in industries and home products. The applications to industries are, for example, robots that execute various functions, and the applications to home products are, for example, lawn mowers, and vacuum cleaners. These intelligent self-moving devices greatly save people's time and make industrial production and home life highly convenient.

During actual application, such a self-moving device usually needs to automatically move inside a preset working region and stay inside the preset working region. Therefore, it is necessary to determine a boundary of the working region and/or a position of the self-moving device.

In related technologies, a physical boundary may be set by arranging a boundary. However, this manner causes a user of a self-moving device great trouble.

In related technologies, a satellite positioning technology such as a global positioning system (GPS) positioning technology or a wireless positioning technology such as an ultra-wideband (UWB) positioning technology may be used to establish a virtual boundary/determine a position of a device. However, satellite positioning or wireless positioning is susceptible to environmental interference, and positioning precision of a boundary/device cannot be ensured when signal blockage or the like occurs.

How to conveniently and precisely determine a boundary of a working region of a self-moving device and/or enable a self-moving device to perform precise autonomous positioning is a problem to be resolved.

SUMMARY

In view of this, the present disclosure provides a positioning apparatus and method and a self-moving device, so as to conveniently and precisely determine a boundary of a working region of a self-moving device.

An aspect of the present disclosure provides a positioning apparatus, where a carrier can carry the positioning apparatus and walk, the positioning apparatus including: a first positioning module, configured to acquire a first positioning result of the carrier of the positioning apparatus; a sensor module, configured to measure acceleration and an angle parameter of walking of the carrier of the positioning apparatus; and a processing module, configured to: in a first mode used to determine a boundary of a working range of a self-moving device, if the first positioning result satisfies a quality condition, determine a position of the carrier of the positioning apparatus according to the first positioning result; or if the first positioning result does not satisfy a quality condition, determine a position of the carrier of the positioning apparatus according to the acceleration and the angle parameter and based on a pedestrian dead reckoning algorithm; and determine the boundary according to the position of the carrier of the positioning apparatus.

Another aspect of the present disclosure provides a positioning apparatus, where a carrier can carry the positioning apparatus and walk, the positioning apparatus including: a first positioning module, configured to acquire a first positioning result of the carrier of the positioning apparatus; a sensor module, configured to measure acceleration and an angle parameter of walking of the carrier of the positioning apparatus; and a processing module, configured to: in a first mode used to determine a boundary of a working range of a self-moving device, determine a third position of the carrier of the positioning apparatus according to the first positioning result; determine a fourth position of the carrier of the positioning apparatus according to the acceleration and the angle parameter and based on a pedestrian dead reckoning algorithm; determine a position of the carrier of the positioning apparatus according to the third position and the fourth position; and determine the boundary according to the position of the carrier of the positioning apparatus.

Another aspect of the present disclosure provides a self-moving device, where the self-moving device includes a device body and the foregoing positioning apparatus, and the positioning apparatus can be detachably installed at the device body.

Another aspect of the present disclosure provides a positioning method, the method including: acquiring a first positioning result of a carrier of a positioning apparatus and acceleration and an angle parameter of walking of the carrier; in a first mode used to determine a boundary of a working range of a self-moving device, if the first positioning result satisfies a quality condition, determining a position of the carrier of the positioning apparatus according to the first positioning result; or if the first positioning result does not satisfy a quality condition, determining a position of the carrier of the positioning apparatus according to the acceleration and the angle parameter and based on a pedestrian dead reckoning algorithm; and determining the boundary according to the position of the carrier of the positioning apparatus.

In a possible implementation, the method may further include: acquiring a model parameter of a step length-frequency model of the carrier of the positioning apparatus, where the step length-frequency model represents a relationship between a step frequency and a step length of the carrier; and the determining a position of the carrier of the positioning apparatus according to the acceleration and the angle parameter and based on a pedestrian dead reckoning algorithm may include: determining the position of the carrier of the positioning apparatus according to the model parameter of the step length-frequency model, the acceleration, and the angle parameter and based on the pedestrian dead reckoning algorithm.

In a possible implementation, the determining the position of the carrier of the positioning apparatus according to the model parameter of the step length-frequency model, the acceleration, and the angle parameter and based on the pedestrian dead reckoning algorithm may include: when the first positioning result does not satisfy the quality condition, acquiring a latest first positioning result that satisfies the quality condition as a starting position for the pedestrian dead reckoning algorithm; determining a real-time course of the carrier according to the angle parameter; determining a real-time step frequency of the carrier according to the acceleration; determining a real-time step length of the carrier according to the real-time step frequency and the model parameter of the step length-frequency model and by using the step length-frequency model; and determining the position of the carrier of the positioning apparatus according to the real-time course, the real-time step length, and the starting position and based on the pedestrian dead reckoning algorithm.

In a possible implementation, the acquiring a model parameter of a step length-frequency model of the carrier of the positioning apparatus may include: determining the step frequency and a step point of the carrier according to the acceleration measured by the sensor module, determining the step length of the carrier according to the first positioning result corresponding to the step point, and determining the model parameter of the step length-frequency model according to the step frequency and the step length, where the step point is a feature point of each step of the carrier.

In a possible implementation, the method may further include: when the first positioning result changes from not satisfying the quality condition to satisfying the quality condition, acquiring a first position, determined based on the pedestrian dead reckoning algorithm, of the carrier of the positioning apparatus and a second position, determined according to the first positioning result of the first positioning module, of the carrier of the positioning apparatus; and calibrating, according to the first position and the second position, the position, determined based on the pedestrian dead reckoning algorithm, of the carrier of the positioning apparatus when the first positioning result does not satisfy the quality condition.

In a possible implementation, the determining the boundary according to the position of the carrier of the positioning apparatus may include: performing interpolation processing on the position, determined based on the pedestrian dead reckoning algorithm, of the carrier of the positioning apparatus, to obtain the position of the carrier of the positioning apparatus after the interpolation processing; and performing smooth filtering on the position of the carrier of the positioning apparatus after the interpolation processing and the position, determined according to the first positioning result, of the carrier of the positioning apparatus, to determine the boundary.

In a possible implementation, the first positioning module may be a satellite positioning module, and the first positioning result is a satellite positioning result.

In a possible implementation, the method may further include: determining, according to either or both of a satellite quantity received by the satellite positioning module and a positioning state of the satellite positioning module, whether the satellite positioning result of the satellite positioning module satisfies the quality condition.

In a possible implementation, the determining, according to either or both of a satellite quantity received by the satellite positioning module and a positioning state of the satellite positioning module, whether the satellite positioning result of the satellite positioning module satisfies the quality condition may include: if the positioning state is a specified state and the satellite quantity is not less than a threshold, determining that the satellite positioning result satisfies the quality condition.

In a possible implementation, the method may further include: in a second mode used to locate the self-moving device, determining a position of the self-moving device according to at least one of the first positioning result and an inertial positioning result, where the inertial positioning result is determined according to at least the acceleration and the angle parameter output by the sensor module and based on an inertial navigation prediction algorithm.

In a possible implementation, the inertial navigation prediction algorithm includes an inertial navigation system (INS) algorithm.

In a possible implementation, the pedestrian dead reckoning algorithm includes a pedestrian dead reckoning (PDR) algorithm.

In a possible implementation, the first positioning module includes a UWB positioning module.

Another aspect of the present disclosure provides a positioning method, the method including: acquiring a first positioning result of a carrier of a positioning apparatus and acceleration and an angle parameter of walking of the carrier; in a first mode used to determine a boundary of a working range of a self-moving device, determining a third position of the carrier of the positioning apparatus according to the first positioning result; determining a fourth position of the carrier of the positioning apparatus according to the acceleration and the angle parameter and based on a pedestrian dead reckoning algorithm; determining a position of the carrier of the positioning apparatus according to the third position and the fourth position; and determining the boundary according to the position of the carrier of the positioning apparatus.

In a possible implementation, the determining a position of the carrier of the positioning apparatus according to the third position and the fourth position may include: determining the position of the carrier of the positioning apparatus according to integration of the third position and the fourth position.

In a possible implementation, the determining the position of the carrier of the positioning apparatus according to integration of the third position and the fourth position may include: determining the position of the carrier of the positioning apparatus according to a weighted sum of the third position and the fourth position.

In a possible implementation, the method further includes: determining respective weights of the third position and the fourth position in the weighted sum according to quality of the first positioning result.

In a possible implementation, the determining respective weights of the third position and the fourth position in the weighted sum according to quality of the first positioning result may include: as the quality of the first positioning result increases, increasing the weight of the third position in the weighted sum, and decreasing the weight of the fourth position in the weighted sum; and as the quality of the first positioning result decreases, decreasing the weight of the third position in the weighted sum, and increasing the weight of the fourth position in the weighted sum.

In a possible implementation, the first positioning module is a satellite positioning module, and the first positioning result is a satellite positioning result.

In a possible implementation, the method may further include: determining, according to either or both of a satellite quantity received by the satellite positioning module and a positioning state of the satellite positioning module, the quality of the satellite positioning result of the satellite positioning module.

In a possible implementation, the determining a position of the carrier of the positioning apparatus according to the third position and the fourth position may include: determining the position of the carrier of the positioning apparatus at a step point according to the third position at the step point and the fourth position at the step point; and performing interpolation processing on the position of the carrier of the positioning apparatus at the step point to obtain the position of the carrier of the positioning apparatus, where the step point is a feature point of each step of the carrier.

In a possible implementation, the determining a position of the carrier of the positioning apparatus according to the third position and the fourth position may include: performing interpolation processing on the fourth position at the step point to obtain a fourth position after interpolation; and determining the position of the carrier of the positioning apparatus according to the third position and the fourth position after interpolation, where the step point is a feature point of each step of the carrier.

In a possible implementation, the method may further include: acquiring a model parameter of a step length-frequency model of the carrier of the positioning apparatus, where the step length-frequency model represents a relationship between a step frequency and a step length of the carrier; and the determining a fourth position of the carrier of the positioning apparatus according to the acceleration and the angle parameter and based on a pedestrian dead reckoning algorithm includes: determining the fourth position of the carrier of the positioning apparatus according to the model parameter of the step length-frequency model, the acceleration, and the angle parameter and based on the pedestrian dead reckoning algorithm.

In a possible implementation, the determining the fourth position of the carrier of the positioning apparatus according to the model parameter of the step length-frequency model, the acceleration, and the angle parameter and based on the pedestrian dead reckoning algorithm may include: acquiring a starting position for the pedestrian dead reckoning algorithm; determining a real-time course of the carrier according to the angle parameter; determining a real-time step frequency of the carrier according to the acceleration; determining a real-time step length of the carrier according to the real-time step frequency and the model parameter of the step length-frequency model and by using the step length-frequency model; and determining the fourth position of the carrier of the positioning apparatus according to the real-time course, the real-time step length, and the starting position and based on the pedestrian dead reckoning algorithm.

In a possible implementation, the acquiring a model parameter of a step length-frequency model of the carrier of the positioning apparatus may include: determining the step frequency and a step point of the carrier according to the acceleration measured by the sensor module, determining the step length of the carrier according to the first positioning result corresponding to the step point, and determining the model parameter of the step length-frequency model according to the step frequency and the step length, where the step point is a feature point of each step of the carrier.

In a possible implementation, the method further includes: in a second mode used to locate the self-moving device, determining a position of the self-moving device according to at least one of the first positioning result and an inertial positioning result, where the inertial positioning result is determined according to at least the acceleration and the angle parameter output by the sensor module and based on an inertial navigation prediction algorithm.

In a possible implementation, the inertial navigation prediction algorithm includes an INS algorithm.

In a possible implementation, the first positioning module includes a UWB positioning module.

In a possible implementation, the pedestrian dead reckoning algorithm includes a PDR algorithm.

For the positioning apparatus, the positioning method, and the self-moving device in the aspects of the present disclosure, a pedestrian dead reckoning technology independent of an external environment is introduced during boundary positioning, and the pedestrian dead reckoning technology and other positioning technologies are integrated to establish a virtual boundary, so that positioning precision is high, and a precise boundary is established. In addition, it is not necessary to arrange a physical boundary, so that operations of a user are less complex.

The present embodiments further provide a self-moving device, including: a visual module, configured to acquire visual data of a surrounding environment of the self-moving device; an inertial navigation module, configured to acquire inertial data of the self-moving device; a satellite navigation module, configured to acquire satellite positioning data of the self-moving device; and a processing module, electrically connected to the visual module, the inertial navigation module, and the satellite navigation module, where the processing module is configured to: perform visual positioning according to the visual data to obtain a visual positioning result; perform inertial positioning according to the inertial data to obtain an inertial positioning result; integrate the visual positioning result and the inertial positioning result to obtain an integrated first integration result; and integrate, if the satellite positioning data satisfies a quality condition, the first integration result and the satellite positioning data to obtain an integrated second integration result, and determine the second integration result as a position of the self-moving device.

In a possible implementation, the processing module is further configured to: if the satellite positioning data does not satisfy the quality condition, determine the first integration result as the position of the self-moving device.

In a possible implementation, the integrating the visual positioning result and the inertial positioning result to obtain an integrated first integration result includes:

if the visual positioning result is valid, integrating the visual positioning result and the inertial positioning result to obtain the integrated first integration result; or if the visual positioning result is invalid, determining the inertial positioning result as the first integration result.

In a possible implementation, the integrating, if the satellite positioning data satisfies the quality condition, the first integration result and the satellite positioning data to obtain an integrated second integration result includes:

if the satellite positioning data satisfies the quality condition, acquiring a second integration result of the self-moving device at a current moment according to a first integration result at the current moment, satellite positioning data at the current moment, and a second integration result at a previous moment.

In a possible implementation, the visual module includes a monochrome CMOS visual sensor.

In a possible implementation, the inertial navigation module includes an inertial sensor, and the inertial sensor includes a gyroscope and an accelerator, or the inertial sensor includes a gyroscope, an accelerator, and either or both of a geomagnetic sensor and a speedometer.

In a possible implementation, the inertial data includes one or more of speed, acceleration, angular velocity, and an orientation angle.

In a possible implementation, an optical axis of the visual module, an axis of the inertial navigation module, and the center of the satellite navigation module are located on a central axis of the self-moving device, and the optical axis of the visual module and the axis of the inertial navigation module are collinear.

In a possible implementation, the center of the satellite navigation module is located above on a center point of two drive wheels of the self-moving device.

In a possible implementation, the integrating the visual positioning result and the inertial positioning result includes:

integrating the visual positioning result and the inertial positioning result in a manner of extended Kalman filtering.

In a possible implementation, the integrating the first integration result and the satellite positioning data includes:

integrating the first integration result and the satellite positioning data in a manner of extended Kalman filtering.

The present embodiment further provides a positioning method, including: performing visual positioning according to visual data to obtain a visual positioning result; performing inertial positioning according to inertial data to obtain an inertial positioning result; integrating the visual positioning result and the inertial positioning result to obtain an integrated first integration result; or if satellite positioning data satisfies a quality condition, integrating the first integration result and the satellite positioning data to obtain an integrated second integration result, and determining the second integration result as a position of a self-moving device.

In a possible implementation, the method further includes: if the satellite positioning data does not satisfy the quality condition, determining the first integration result as the position of the self-moving device.

In a possible implementation, the integrating the visual positioning result and the inertial positioning result to obtain an integrated first integration result includes:

if the visual positioning result is valid, integrating the visual positioning result and the inertial positioning result to obtain the integrated first integration result; or if the visual positioning result is invalid, determining the inertial positioning result as the first integration result.

In a possible implementation, the integrating, if the satellite positioning data satisfies the quality condition, the first integration result and the satellite positioning data to obtain an integrated second integration result includes:

if the satellite positioning data satisfies the quality condition, acquiring a second integration result of the self-moving device at a current moment according to a first integration result at the current moment, satellite positioning data at the current moment, and a second integration result at a previous moment.

In a possible implementation, the inertial data includes one or more of speed, acceleration, angular velocity, and an orientation angle.

In a possible implementation, the integrating the visual positioning result and the inertial positioning result includes:

integrating the visual positioning result and the inertial positioning result in a manner of extended Kalman filtering.

In a possible implementation, the integrating the first integration result and the satellite positioning data includes:

integrating the first integration result and the satellite positioning data in a manner of extended Kalman filtering.

The present embodiments further provide a positioning apparatus, including: a visual positioning module, configured to perform visual positioning according to visual data to obtain a visual positioning result; an inertial positioning module, configured to perform inertial positioning according to inertial data to obtain an inertial positioning result; a first integration module, configured to integrate the visual positioning result and the inertial positioning result to obtain an integrated first integration result; and a second integration module, configured to: if satellite positioning data satisfies a quality condition, integrate the first integration result and the satellite positioning data to obtain an integrated second integration result, and determine the second integration result as a position of a self-moving device.

The present embodiments further provide a self-moving device, including: a laser module, configured to acquire laser data of a surrounding environment of the self-moving device; an inertial navigation module, configured to acquire inertial data of the self-moving device; a satellite navigation module, configured to acquire satellite positioning data of the self-moving device; and a processing module, electrically connected to the laser module, the inertial navigation module, and the satellite navigation module, and configured to: perform laser positioning according to the laser data to obtain a laser positioning result; perform inertial positioning according to the inertial data to obtain an inertial positioning result; integrate the laser positioning result and the inertial positioning result to obtain an integrated first integration result; and integrate, if the satellite positioning data satisfies a quality condition, the first integration result and the satellite positioning data to obtain an integrated second integration result, and determine the second integration result as a position of the self-moving device.

In a possible implementation, the processing module is further configured to:

if the satellite positioning data does not satisfy the quality condition, determine the first integration result as the position of the self-moving device.

In a possible implementation, the integrating the laser positioning result and the inertial positioning result to obtain an integrated first integration result includes:

if the laser positioning result is valid, integrating the laser positioning result and the inertial positioning result to obtain the integrated first integration result; or if the laser positioning result is invalid, determining the inertial positioning result as the first integration result.

In a possible implementation, the integrating, if the satellite positioning data satisfies a quality condition, the first integration result and the satellite positioning data to obtain an integrated second integration result includes:

if the satellite positioning data satisfies the quality condition, acquiring a second integration result of the self-moving device at a current moment according to a first integration result at the current moment, satellite positioning data at the current moment, and a second integration result at a previous moment.

In a possible implementation, the laser module includes a circular scan laser radar.

In a possible implementation, the inertial navigation module includes an inertial sensor, and the inertial sensor includes a gyroscope and an accelerator, or the inertial sensor includes a gyroscope, an accelerator, and either or both of a geomagnetic sensor and a speedometer.

In a possible implementation, the inertial data includes one or more of speed, acceleration, angular velocity, and an orientation angle.

In a possible implementation, an axial center of the laser module, an axis of the inertial navigation module, and the center of the satellite navigation module are located on a central axis of the self-moving device, and the axial center of the laser module and the axis of the inertial navigation module are collinear.

In a possible implementation, the center of the satellite navigation module is located above on a center point of two drive wheels of the self-moving device.

In a possible implementation, the integrating the laser positioning result and the inertial positioning result includes:

integrating the laser positioning result and the inertial positioning result in a manner of extended Kalman filtering.

In a possible implementation, the integrating the first integration result and the satellite positioning data includes:

integrating the first integration result and the satellite positioning data in a manner of extended Kalman filtering.

The present embodiments further provide a positioning method, including: performing laser positioning according to laser data to obtain a laser positioning result; performing inertial positioning according to inertial data to obtain an inertial positioning result;

integrating the laser positioning result and the inertial positioning result to obtain an integrated first integration result; and if satellite positioning data satisfies a quality condition, integrating the first integration result and the satellite positioning data to obtain an integrated second integration result, and determining the second integration result as a position of a self-moving device.

In a possible implementation, the method further includes:

if the satellite positioning data does not satisfy the quality condition, determining the first integration result as the position of the self-moving device.

In a possible implementation, the integrating the laser positioning result and the inertial positioning result to obtain an integrated first integration result includes:

if the laser positioning result is valid, integrating the laser positioning result and the inertial positioning result to obtain the integrated first integration result; or if the laser positioning result is invalid, determining the inertial positioning result as the first integration result.

In a possible implementation, the integrating, if the satellite positioning data satisfies a quality condition, the first integration result and the satellite positioning data to obtain an integrated second integration result includes:

if the satellite positioning data satisfies the quality condition, acquiring a second integration result of the self-moving device at a current moment according to a first integration result at the current moment, satellite positioning data at the current moment, and a second integration result at a previous moment.

In a possible implementation, the inertial data includes one or more of speed, acceleration, angular velocity, and an orientation angle.

In a possible implementation, the integrating the laser positioning result and the inertial positioning result includes:

integrating the laser positioning result and the inertial positioning result in a manner of extended Kalman filtering.

In a possible implementation, the integrating the first integration result and the satellite positioning data includes:

integrating the first integration result and the satellite positioning data in a manner of extended Kalman filtering.

The present embodiments further provide a positioning apparatus, including: a laser positioning module, configured to perform laser positioning according to laser data to obtain a laser positioning result; an inertial positioning module, configured to perform inertial positioning according to inertial data to obtain an inertial positioning result; a first integration module, configured to integrate the laser positioning result and the inertial positioning result to obtain an integrated first integration result; and a second integration module, configured to: if satellite positioning data satisfies a quality condition, integrate the first integration result and the satellite positioning data to obtain an integrated second integration result, and determine the second integration result as a position of a self-moving device.

Other features and aspects of the present disclosure will become clear according to the following detailed description of the exemplary embodiments with reference to the accompanying drawings.

BRIEF DESCRIPTION OF THE DRAWINGS

The accompanying drawings that are included in this specification and constitute a part of this specification and this specification together show exemplary embodiments, features, and aspects of the present disclosure, and are used to explain the principle of the present disclosure.

DETAILED DESCRIPTION

Figure 1:
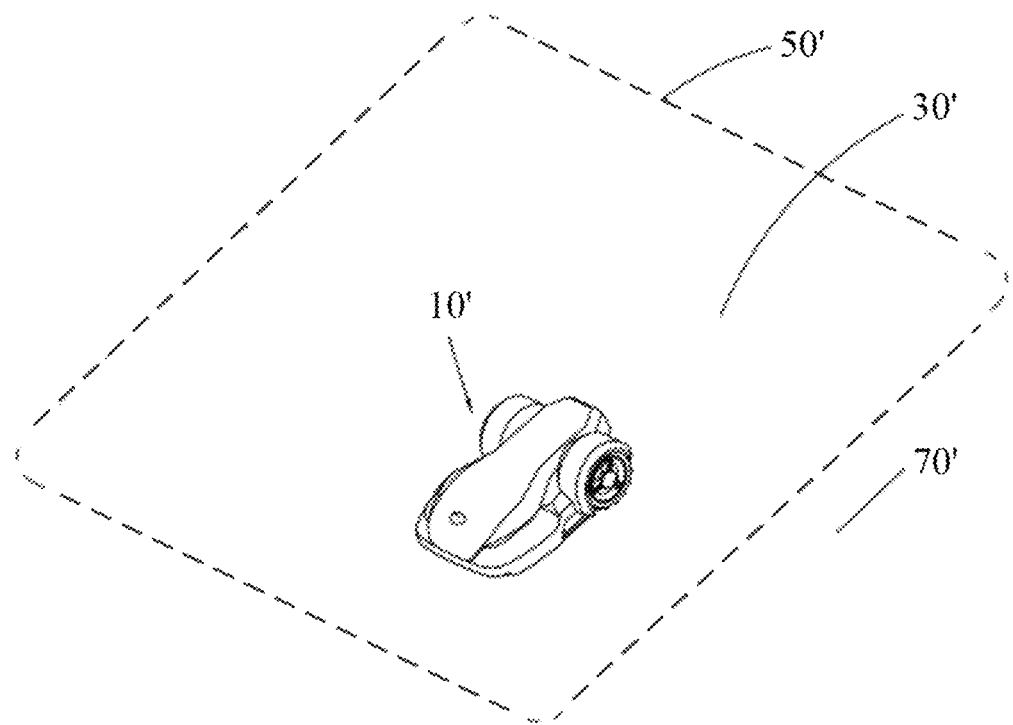
FIG. 1 is a schematic diagram of an exemplary application environment according to an embodiment of the present disclosure.

Various exemplary embodiments, features, and aspects of the present disclosure are described below in detail with reference to the accompanying drawings. The same reference numerals in the accompanying drawings represent components with same or similar functions. Although various aspects of the embodiments are shown in the accompanying drawings, it should be pointed out that the accompanying drawings are not necessarily drawn in proportion unless specially indicated.

The word "exemplary" specially used herein means "used as an example, embodiment or description". Herein, any "exemplary" embodiment is not necessarily construed as being better than other embodiments.

In addition, to better describe the present disclosure, numerous specific details are provided in the following specific implementation. A person skilled in the art should understand that the present disclosure may still be implemented without some specific details. In some examples, the methods, approaches, components, and circuits known to a person skilled in the art are described in detail to highlight the theme of the present disclosure.

FIG. 1 is a schematic diagram of an exemplary application environment according to an embodiment of the present disclosure.

As shown in FIG. 1, an automatic lawn mower 10' is used as an example. In an exemplary application environment, the positioning method or the positioning apparatus in the embodiments of the present disclosure may be used to determine a virtual boundary 50' of a working region of the automatic lawn mower 10'. The boundary 50' plans a working region 30' defined by the boundary 50' and a non-working region 70' located outside the boundary 50'.

When walking automatically inside the working region 30', the autonomous lawn mower 10' may compare a position of the autonomous lawn mower 10' with a position of the boundary 50' to determine whether the automatic lawn mower 10' is located inside the working region 30' or determine a distance of the autonomous lawn mower 10' from the boundary 50' and adjust a movement manner according to a determining result to stay inside the working region 30'.

Figure 2:
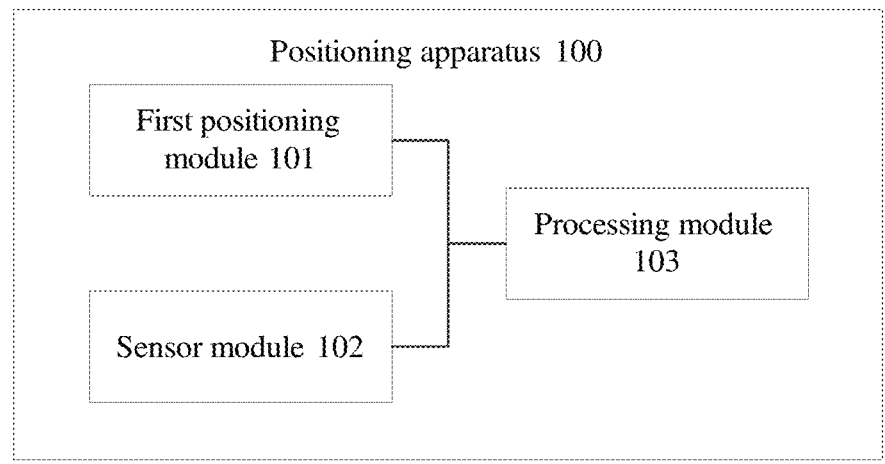
FIG. 2 is a structural diagram of a positioning apparatus according to an embodiment of the present disclosure.

FIG. 2 is a structural diagram of a positioning apparatus according to an embodiment of the present disclosure. A carrier can carry the positioning apparatus and walk. As shown in FIG. 2, the positioning apparatus 100 includes a first positioning module 101, a sensor module 102, and a processing module 103.

The first positioning module 101 is configured to acquire a first positioning result of the carrier of the positioning apparatus 100.

The sensor module 102 is configured to measure acceleration and an angle parameter of walking of the carrier of the positioning apparatus 100.

The processing module 103 is configured to:

in a first mode used to determine a boundary of a working range of a self-moving device, if the first positioning result satisfies a quality condition, determine a position of the carrier of the positioning apparatus according to the first positioning result; or if the first positioning result does not satisfy a quality condition, determine a position of the carrier of the positioning apparatus according to the acceleration and the angle parameter and based on a pedestrian dead reckoning algorithm; and determine the boundary according to the position of the carrier of the positioning apparatus.

According to quality of a first positioning result, a position of a carrier of the positioning apparatus is determined based on the first positioning result or based on a pedestrian dead reckoning algorithm. The positioning apparatus according to an embodiment of the present disclosure integrates a pedestrian dead reckoning technology and other positioning technologies to establish a virtual boundary. The pedestrian dead reckoning technology is insusceptible to an external environment and can compensate for inadequacy of precision of the other positioning technologies because of environmental influence, so that positioning precision is high, and a precise boundary is established. In addition, it is not necessary to arrange a physical boundary, so that operations of a user are less complex.

The pedestrian dead reckoning algorithm may include a positioning technology of performing positioning based on a step length (the length of each step) and a course. For the walking of a pedestrian, a step frequency (a quantity of steps in a unit time) is associated with a step length. Gaits of walking of a pedestrian are periodic. In one gait cycle (one step), for example, there are the following gaits: a foot leaves contact with the ground, a leg swings, the sole of the foot touches the ground, and the legs are still. Various gaits correspond to different acceleration of the pedestrian. Therefore, a gait and a step frequency may be obtained by analyzing features of acceleration of the pedestrian, a step length may be estimated according to the step frequency, and the pedestrian may be located according to the step length and the course. In a scenario in which the carrier (pedestrian) carries the positioning apparatus 100 and walks along the boundary, the sensor module 102 in the positioning apparatus 100 measures acceleration and an angle parameter of walking of the carrier of the positioning apparatus, and positioning based on the pedestrian dead reckoning algorithm may be performed by combining the principle of the foregoing pedestrian dead reckoning algorithm. The pedestrian dead reckoning algorithm may be, for example, a PDR algorithm or any other pedestrian dead reckoning algorithm.

In a possible implementation, the positioning apparatus 100 may work in various working modes such as a first mode and a second mode. The first mode is used to determine a boundary of a working range of the automatic walking device. In the first mode, the positioning apparatus 100 may be detached from the self-moving device, and is carried (for example, held) by the carrier (for example, a user). The carrier walks along an expected boundary (for example, the boundary 50'). The positioning apparatus 100 performs positioning during walking, so that coordinates (a boundary map) of the boundary may be determined and stored. The second mode is used to locate the self-moving device. In the second mode, the positioning apparatus may be installed at the self-moving device and locate the self-moving device to determine whether the self-moving device moves beyond the boundary. The various working modes may be manually or automatically set and switched, and may be prompted on the positioning apparatus. A person skilled in the art should understand that the working modes of the positioning apparatus are not limited to the foregoing examples. The positioning apparatus may also have only the first mode, that is, is only configured to determine a position of the boundary.

The first positioning module 101 may be a positioning module that is not based on the pedestrian dead reckoning algorithm, and is, for example, any positioning module that is susceptible to an external environment. For example, the first positioning module 101 may be a satellite positioning module such as a GPS module, a Beidou positioning module, and a Galileo positioning module. For another example, the first positioning module 101 may be a wireless positioning module such as a UWB positioning module. When the first positioning module 101 is a GPS module, the first positioning module 101 may be any module that can implement GPS-based positioning, and is, for example, a GPS receiver that can receive a GPS signal to perform positioning. The first positioning module 101 may be implemented based on the prior art.

The sensor module 102 may include a part such as an accelerator that can measure acceleration and a part such as a gyroscope and an electronic compass that can measure an angle parameter. The angle parameter may be, for example, angular velocity, and a course angle. For example, the sensor module 102 may be a 6-axis inertial sensor that includes a gyroscope and an accelerator, or may include a gyroscope, an accelerator, and an electronic compass, or may include an accelerator and an electronic compass.

The processing module 103 may be any processing part such as a single-chip microcomputer, a CPU, an MPU or an FPGA that can perform data processing. The processing module 103 may be implemented by using a dedicated hardware circuit, or may be implemented by using a general-purpose processing part combining an executable logic instruction, to execute a processing process of the processing module 103.

In a possible implementation, if the positioning apparatus 100 is in an on state, the first positioning module 101 and the sensor module 102 may be kept in a working state to obtain the first positioning result, the acceleration, and the angle parameter in real time. The first positioning result, the acceleration, and the angle parameter that are obtained in real time may be transferred to the processing module 103 for processing. Data such as the acceleration and the angle parameter may be sampled by using a universal sampling clock of the first positioning module 101. To be specific, the processing module 103 may obtain the first positioning result of the first positioning module, a measurement result of the acceleration, and a measurement result of the angle parameter at a same sampling time point.

In a possible implementation, the positioning apparatus 100 may further include a storage module (not shown) to store the data such as the coordinate data of the boundary generated by the processing module 103.

The quality of the first positioning result may be determined in any appropriate manner, for example, is determined according to a received signal or an output signal of the first positioning module. This is not limited in the present disclosure.

For example, the first positioning module is a satellite positioning module, and the first positioning result is a satellite positioning result. The processing module 103 may determine, according to either or both of a satellite quantity received by the satellite positioning module and a positioning state of the satellite positioning module, whether the satellite positioning result of the satellite positioning module satisfies the quality condition. The satellite quantity received by the satellite positioning module represents strength and an information amount of a satellite signal, and affects precision of the satellite positioning result. The positioning state of the satellite positioning module can reflect the precision of the satellite positioning result.

For example, the GPS module is a satellite positioning module. According to common parameter settings of the GPS module, the positioning state may include:

Positioning state 0: No positioning
Positioning state 1: GPS single-point positioning fixed solution
Positioning state 2: Differential positioning
Positioning state 3: PPS
Positioning state 4: RTK fixed solution
Positioning state 5: RTK float solution
Positioning state 6: Estimated value
Positioning state 7: Manual input mode
Positioning state 8: Simulated mode Some positioning states (for example, the positioning state 4) may represent excellent quality of a GPS positioning result, some positioning states (for example, the positioning state 5) may represent good quality of a GPS positioning result, and some positioning states (for example, the positioning states 1, 2, 3, 6, 7, and 8) may represent poor quality of a GPS positioning result.

In a possible implementation, the quality condition may be set. When the quality condition is satisfied, it is considered that quality of the first positioning result is good, and the first positioning result is used to perform positioning. If the quality condition is not satisfied, it is considered that the quality of the first positioning result is poor, and the pedestrian dead reckoning algorithm is used instead to perform positioning.

For example, if the positioning state is a specified state and the satellite quantity is not less than a threshold, the processing module 103 may determine that the satellite positioning result satisfies the quality condition.

Still, for example, the first positioning module is a GPS module, the positioning states 4 and 5 are specified states, and the threshold of the satellite quantity is set to, for example, 6. The processing module 103 may determine the satellite quantity and the positioning state according to an output signal of the GPS module. The processing module 103 may be configured to: if the positioning state is a specified state (for example, the positioning state 4 or 5) and the satellite quantity is not less than the threshold (for example, is not less than 6), determine that the GPS positioning result (the first positioning result) satisfies the quality condition; and if the positioning state is not a specified state (for example, is neither the positioning state 4 nor the positioning state 5) and/or the satellite quantity is less than the threshold (for example, is less than 6), determine that the GPS positioning result (the first positioning result) does not satisfy the quality condition.

The foregoing quality condition is only an example. A person skilled in the art may set another quality condition as required to determine the quality of the first positioning result.

Figure 3:
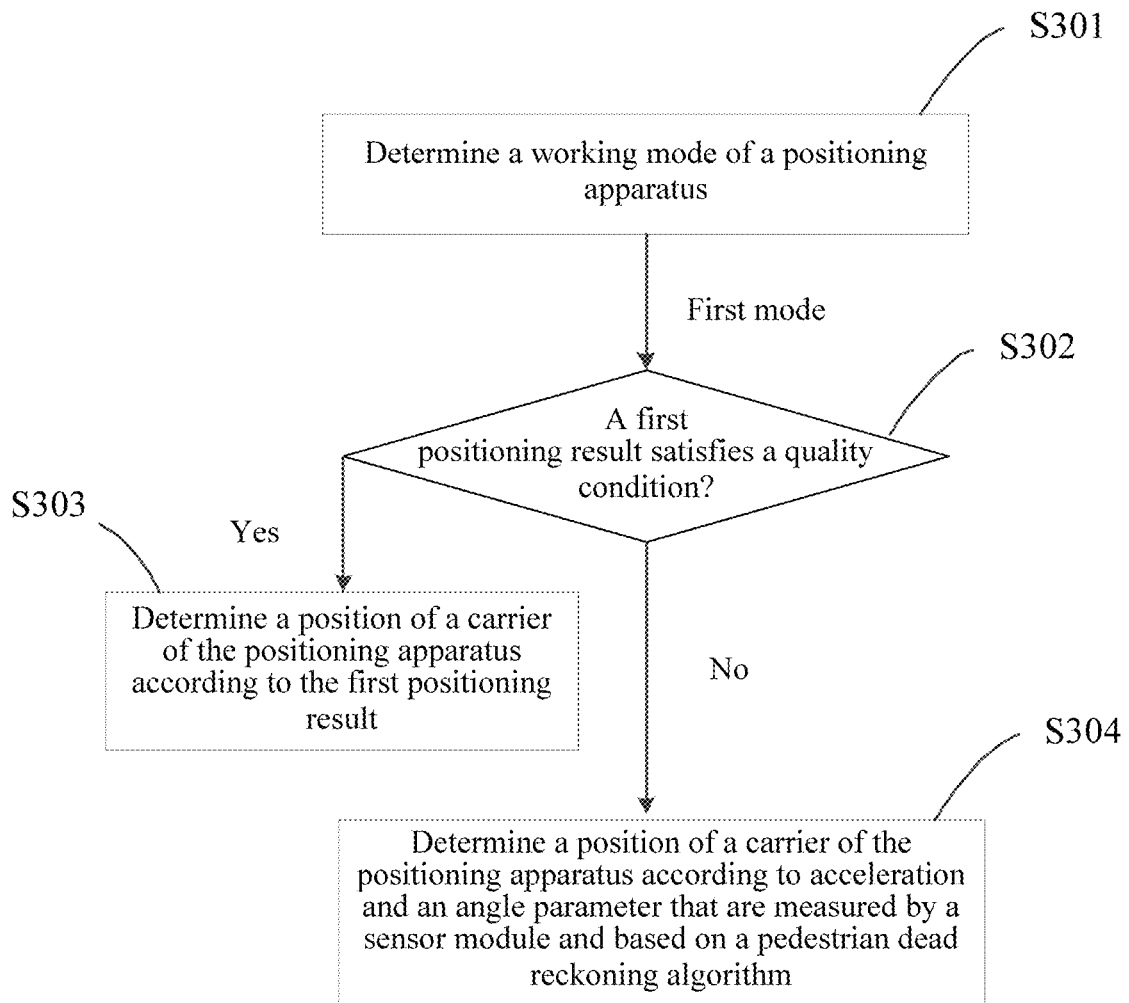
FIG. 3 is a flowchart of an example of a processing process of a processing module.

FIG. 3 is a flowchart of an example of a processing process of the processing module. As shown in FIG. 3, in a possible implementation, the processing module 103 may be configured to: determine a working mode of the positioning apparatus (S301); if the positioning apparatus is in a first mode, determine whether the first positioning result of the first positioning module 101 satisfies the quality condition (S302); if the first positioning result satisfies the quality condition (for example, the positioning state of the GPS module is 4 or 5, and the satellite quantity is not less than 6), determine a position of the carrier of the positioning apparatus 100 according to the first positioning result (S303), and save the position; or if the first positioning result does not satisfy a quality condition (for example, the positioning state is neither 4 nor 5 and/or the satellite quantity is less than 6, that is, "the positioning state is 4 or 5 and the satellite quantity is not less than 6" is not satisfied), determine a position of the carrier of the positioning apparatus according to acceleration and an angle parameter that are measured by the sensor module 102 and based on a pedestrian dead reckoning algorithm (S304), save the position, and determine a boundary according to the position of the carrier of the positioning apparatus.

Figure 4:
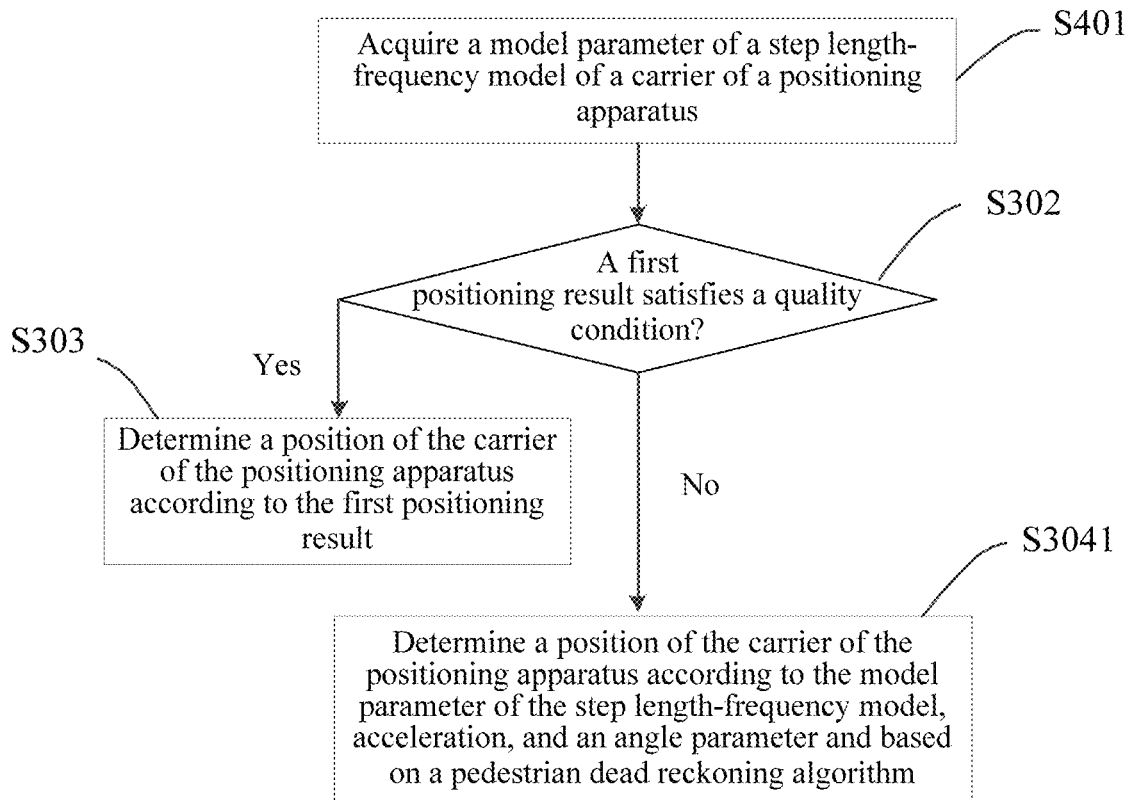
FIG. 4 is a flowchart of an example of a processing process of a processing module.

FIG. 4 is a flowchart of an example of a processing process of the processing module. FIG. 4 shows an exemplary process of performing positioning based on a pedestrian dead reckoning algorithm if the first positioning result does not satisfy the quality condition. Reference numerals that are the same as those in FIG. 3 represent similar steps.

In a possible implementation, as shown in FIG. 4, the processing module 103 may be configured to the following steps.

S401: Acquire a model parameter of a step length-frequency model of the carrier of the positioning apparatus, where the step length-frequency model represents a relationship between a step frequency and a step length of the carrier.

If the first positioning result does not satisfy the quality condition, the determining the position of the carrier of the positioning apparatus according to the acceleration and the angle parameter and based on the pedestrian dead reckoning algorithm includes the following step.

S3041: If the first positioning result does not satisfy the quality condition, determine the position of the carrier of the positioning apparatus according to the model parameter of the step length-frequency model, the acceleration, and the angle parameter and based on the pedestrian dead reckoning algorithm.

The model parameter of the step length-frequency model may be obtained in various appropriate manners. This is not limited in the present disclosure.

Figure 5:
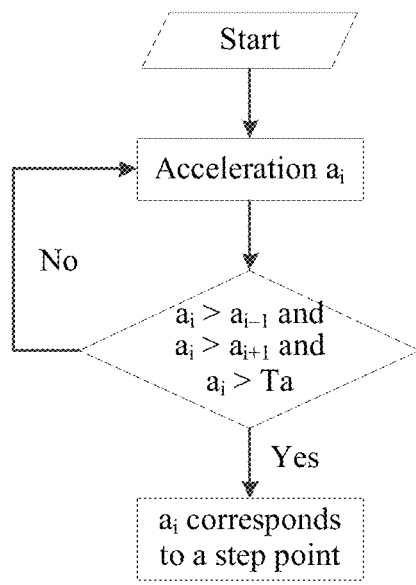
FIG. 5 is a schematic diagram of an example of a process of determining a step point according to acceleration.

For example, gait detection may be performed according to acceleration, and the model parameter is determined according to a result of gait detection. As discussed above, there is a correspondence between a gait and acceleration of a pedestrian. Periodic steps lead to periodic changes in acceleration, and a step frequency and a step point of the carrier may be determined according to the acceleration measured by the sensor module. FIG. 5 is a schematic diagram of an example of a process of determining a step point according to acceleration. As shown in FIG. 5, a threshold Ta may be set. When an acceleration sampling point $a_i$ in an acceleration change cycle (a step cycle) is an extremum ($a_i > a_{i-1}$ and $a_i > a_{i+1}$) and the extremum is greater than the threshold Ta ($a_i > Ta$), it is considered that the sampling point is a step point, and it is considered that a current cycle is a valid step cycle, so as to implement gait detection. A person skilled in the art should understand that a step point is used as a feature point of each step of the carrier, and may correspond to another feature point of acceleration, but is not limited to an extremum point. A frequency of step points may be used as the step frequency, or the acceleration change cycle is used as the step frequency. A step length l of the carrier may be determined according to a first positioning result corresponding to a step point (at a same sampling time point). The model parameter of the step length-frequency model may be determined according to a step frequency f and the step length l.

The step length-frequency model may be selected as required, and may be a linear model or a nonlinear model. A specific form of the step length-frequency model is not limited in the present disclosure.

For example, the step length-frequency model may be the following linear model:

$$l = k \times f + b \qquad \text{Formula 1}$$

where f is the step frequency, l is the step length, and k and b are model parameters.

A plurality of groups of data of the step length l and the step frequency f may be used to calculate the parameters k and b according to the least square method.

For example, when it is determined that a current sampling time point corresponds to a step point, a first positioning result corresponding to the current sampling time point may be acquired. The step length l is determined according to first positioning results corresponding to adjacent step points. The step frequency f is determined according to a time interval between adjacent step points. A plurality of groups of data of the step length and the step frequency may be stored. The parameters k and b may be calculated by using the stored plurality of groups of data of the step length and the step frequency and according to the least square method.

For another example, the step length-frequency model may be the following non-linear model:

$$l = k \cdot \sqrt[4]{a_{max} - a_{min}} + b \qquad \text{Formula 2}$$

where l is the step length, k and b are model parameters, and $a_{max}$ and $a_{min}$ are respectively a maximum and a minimum of acceleration in a step cycle. The model parameters k and b may be calculated by using the least square method with reference to the foregoing example.

Figure 6:
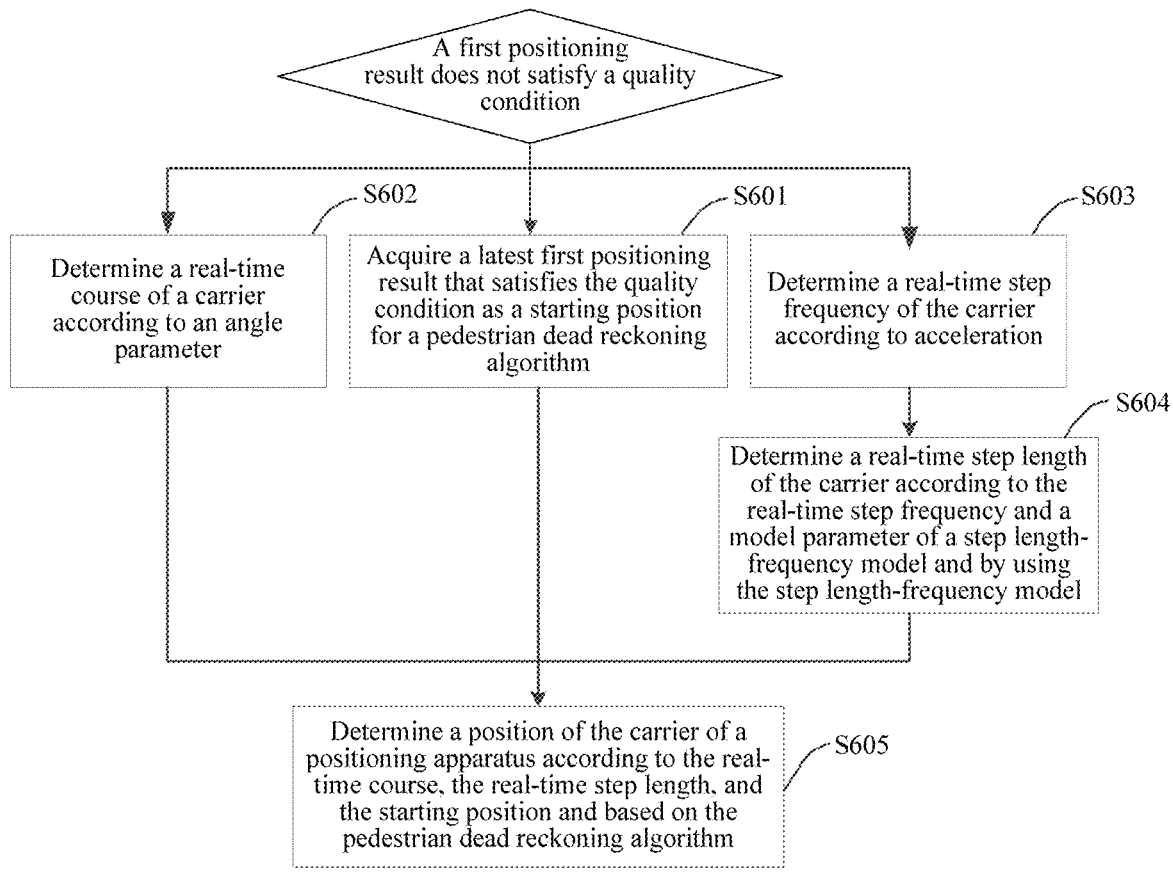
FIG. 6 is a flowchart of an example of a processing process of a processing module.

FIG. 6 is a flowchart of an example of a processing process of the processing module. FIG. 6 shows an example of a process of determining the position of the carrier of the positioning apparatus according to the model parameter of the step length-frequency model, the acceleration, and the angle parameter and based on the pedestrian dead reckoning algorithm if the first positioning result does not satisfy the quality condition. The process includes the following steps.

S601: When the first positioning result does not satisfy the quality condition, acquire a latest first positioning result that satisfies the quality condition as a starting position for the pedestrian dead reckoning algorithm.

For example, if it is determined at a sampling time point $t_i$ that the first positioning result does not satisfy the quality condition but the first positioning result satisfies the quality condition at a previous sampling time point the first positioning result (the latest first positioning result that satisfies the quality condition) at the sampling time point may be used as the starting position for the pedestrian dead reckoning algorithm.

S602: Determine a real-time course of the carrier according to the angle parameter.

For example, if the angle parameter includes angular velocity, the real-time course may be a sum of integral values of an initial course of the carrier of the positioning apparatus and a real-time measurement result of the angular velocity starting from a moment determined by using the initial course.

In a possible implementation, the processing module may be configured to acquire the initial course of the carrier of the positioning apparatus. The initial course may be an initial course of the carrier of the positioning apparatus when the positioning apparatus enters a first mode, and in other words, may be an initial course when a process of locating a boundary by the carrier is started. In an example, the initial course may be obtained at the same time as the foregoing model parameter.

Figure 7:
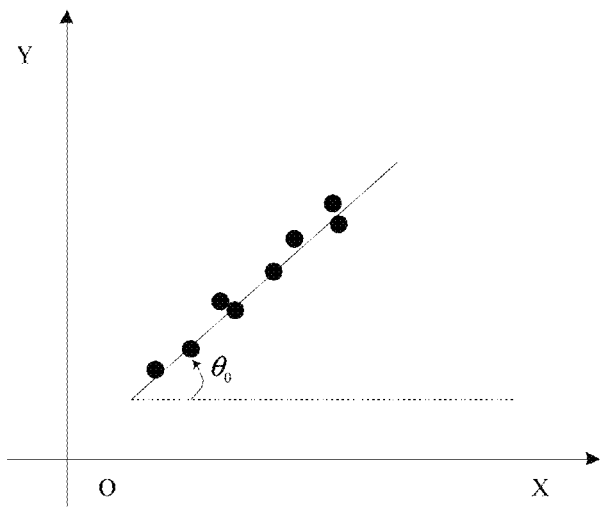
FIG. 7 is a schematic diagram of an example of determining an initial course by using linear fitting.

For example, the initial course may be determined according to the first positioning result of the first positioning module. For example, linear fitting may be performed according to first positioning results corresponding to step points in a period of time (for example, 10 steps), and an arctangent value of a linear slope obtained after fitting is used as the initial course. FIG. 7 is a schematic diagram of an example of determining an initial course by using linear fitting. A round dot represents a step point corresponding to each first positioning result, and an angle $\theta_0$ is used as the initial course.

The foregoing manner of determining the initial course or the model parameter of the step length-frequency model depends on the first positioning result. In a possible implementation, the positioning apparatus 100 may include a prompt module. When the first positioning result satisfies the quality condition, the prompt module prompts that a user may start to locate a boundary. When the first positioning result does not satisfy the quality condition, the prompt module prompts that the user cannot locate a boundary. The first positioning result and the acceleration are acquired when the positioning apparatus 100 starts to locate a boundary (for example, enters the first mode) to determine the initial course and/or the model parameter to ensure the obtaining of an accurate initial course and/or model parameter.

However, a person skilled in the art should understand that the manner of determining the initial course or the model parameter of the step length-frequency model is not limited thereto. For example, when the positioning apparatus 100 enters the first mode, if the first positioning result does not satisfy the quality condition, it may be determined that the initial course is 0, and an empirical value may be used for the model parameter of the step length-frequency model, and the initial course and the model parameter may be calibrated after quality of the first positioning result satisfies a condition. For another example, the positioning apparatus may further include a part such as a compass configured to determine a course. When the positioning apparatus 100 enters the first mode, if the first positioning result does not satisfy the quality condition, the compass may be used to determine the initial course, and an empirical value may be used for the model parameter of the step length-frequency model, and the initial course and the model parameter may be calibrated after the quality of the first positioning result satisfies a condition. In this manner, the user may start to use the positioning apparatus 100 to locate a boundary in any condition, and it is not necessary to find or wait for a starting point at which the quality of the first positioning result is good.

For another example, if the angle parameter includes a course angle, the real-time course may be directly determined by using the course angle. For example, coordinate system conversion may be performed on a course angle measured by the electronic compass to obtain the real-time course.

S603: Determine a real-time step frequency of the carrier according to the acceleration. For example, the real-time step frequency may be determined according to the acceleration in the manner of gait detection in the foregoing example.

An order of performing S601, S602, and S603 is not limited.

S604: Determine a real-time step length of the carrier according to the real-time step frequency and the model parameter of the step length-frequency model and by using the step length-frequency model. For example, the real-time step frequency may be introduced in the step length-frequency model (for example, Formula 1 or Formula 2) determined according to the foregoing example to determine the real-time step length.

S605: Determine the position of the carrier of the positioning apparatus according to the real-time course, the real-time step length, and the starting position and based on the pedestrian dead reckoning algorithm. For example, a relative position between the carrier and the starting position after each step may be determined according to the pedestrian dead reckoning algorithm and according to the real-time course, the real-time step length, and the starting position, to implement positioning.

By using the foregoing process, as the carrier carries the positioning apparatus 100 and walks along an expected boundary, the first positioning result obtained when the quality of the first positioning result is high and a positioning result of the pedestrian dead reckoning algorithm obtained when the quality of the first positioning result is low may be obtained, so as to obtain a position of the boundary.

Due to inherent biases of the acceleration and the angle parameter, an accumulated error may occur in the process of running the pedestrian dead reckoning algorithm. Therefore, in a possible implementation, the processing module 103 may further calibrate, according to the first positioning result, the positioning result obtained by using the pedestrian dead reckoning algorithm, thereby further improving positioning precision of a boundary.

Figure 8:
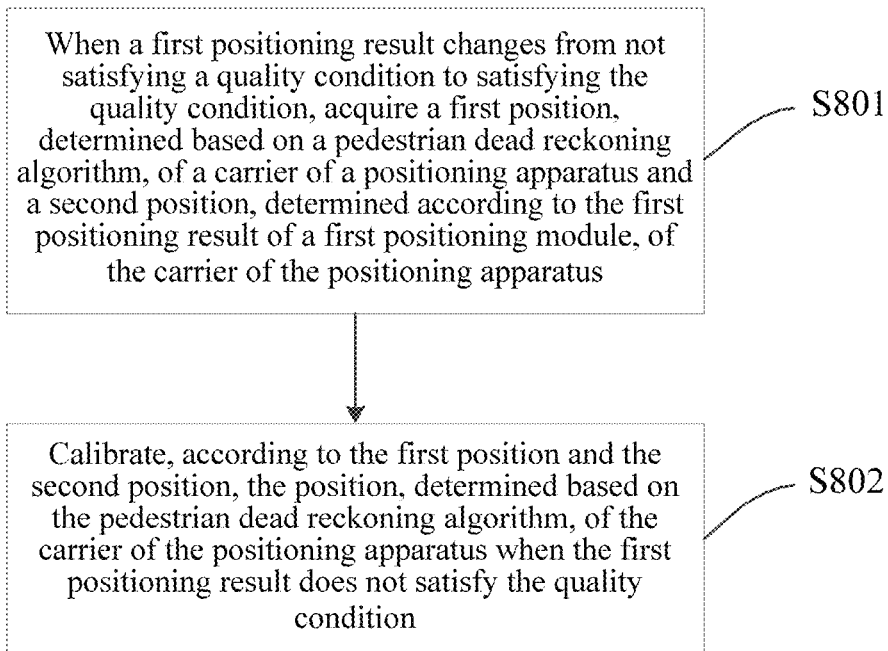
FIG. 8 is a flowchart of an example of a processing process of a processing module.

FIG. 8 is a flowchart of an example of a processing process of the processing module. FIG. 8 shows an example of the processing module performing calibration processing. As shown in FIG. 8, the processing module 103 is further configured to perform the following steps.

S801: When the first positioning result changes from not satisfying the quality condition to satisfying the quality condition, acquire a first position, determined based on the pedestrian dead reckoning algorithm, of the carrier of the positioning apparatus and a second position, determined according to the first positioning result of the first positioning module, of the carrier of the positioning apparatus.

For example, if the first positioning results at sampling time points $t_1$ to $t_i$ do not satisfy the quality condition, the positioning apparatus 100 performs positioning from $t_1$ to $t_i$ based on the pedestrian dead reckoning algorithm to obtain a positioning result $P_1$-$P_i$ (for example, coordinates of the carrier of the positioning apparatus 100) of the pedestrian dead reckoning algorithm. At a sampling time points $t_{i+1}$, the processing module 103 determines that the first positioning result changes from not satisfying the quality condition to satisfying the quality condition, a positioning result $P_{i+1}$ (the first position) of the pedestrian dead reckoning algorithm and the first positioning result $P'_{i+1}$ (the second position) at the sampling time point $t_{i+1}$ may be acquired.

S802: Calibrate, according to the first position and the second position, the position, determined based on the pedestrian dead reckoning algorithm, of the carrier of the positioning apparatus when the first positioning result does not satisfy the quality condition.

For example, the positioning results $P_1$ to $P_i$ of the pedestrian dead reckoning algorithm at the sampling time points $t_1$ to $t_i$ may be calibrated according to the foregoing first position $P_{i+1}$ and the second position $P'_{i+1}$. A specific manner of calibration may be selected as required. This is not limited in the present disclosure.

Figure 9A:
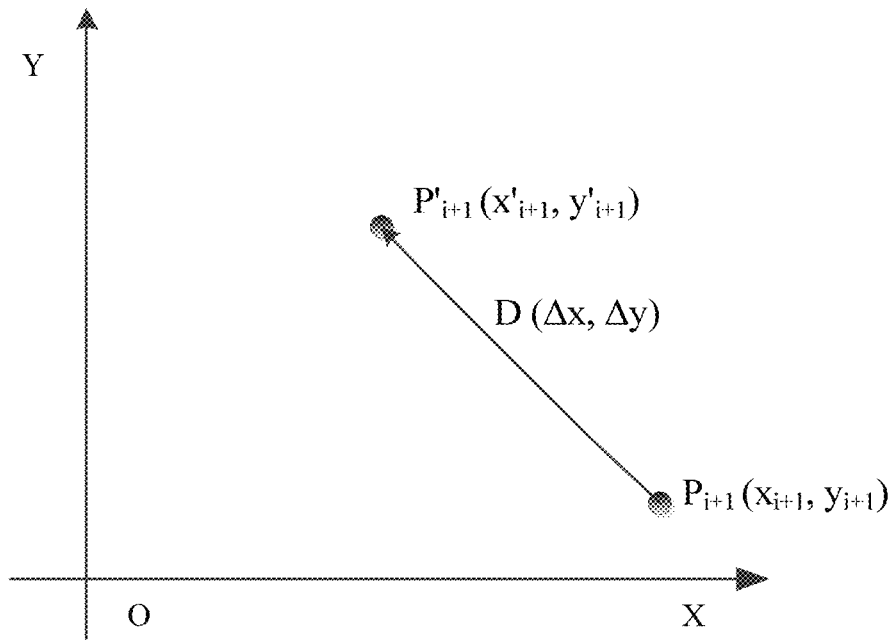
FIG. 9a and FIG. 9b are schematic diagrams of an example of calibrating a positioning result of a pedestrian dead reckoning algorithm.

FIG. 9a shows a schematic diagram of an example of calibrating a positioning result of the pedestrian dead reckoning algorithm. As shown in FIG. 9a, in an example, a deviation D between the first position $P_{i+1}$ and the second position $P'_{i+1}$ may be calculated:

$$D = P'_{i+1} - P_{i+1} \qquad \text{Formula 3}$$

For example, if the first position $P_{i+1}$ is represented by the coordinates $(x_{i+1}, y_{i+1})$, and the second position $P'_{i+1}$ is represented by the coordinates $(x'_{i+1}, y'_{i+1})$, the deviation D may be represented as $(\Delta x, \Delta y)$, where $$\Delta x = x'_{i+1} - x_{i+1}$$

$$\Delta y = y'_{i+1} - y_{i+1} \qquad \text{Formula 4}$$

The deviation D may be equally divided into parts and the parts may be separately added to the positions (positioning results of the pedestrian dead reckoning algorithm) $P_1$ to $P_i$, determined based on the pedestrian dead reckoning algorithm, of the carrier of the positioning apparatus when the first positioning result does not satisfy the quality condition. For example, each positioning result $P_j$ (j is one of 1 to i) of the pedestrian dead reckoning algorithm may be added to a quotient of dividing the foregoing deviation D by a total quantity i of positioning results of the pedestrian dead reckoning algorithm, to obtain a calibrated positioning result $P_j$ ($x'_j$, $y'_j$) of the pedestrian dead reckoning algorithm:

$$P'_j = P_j + D \cdot \frac{j}{i} = \left( x_j + \Delta x \cdot \frac{j}{i}, y_j + \Delta y \cdot \frac{j}{i} \right) \qquad \text{Formula 5}$$

The calibrated positioning result of the pedestrian dead reckoning algorithm may be saved to determine the boundary.

Figure 9B:
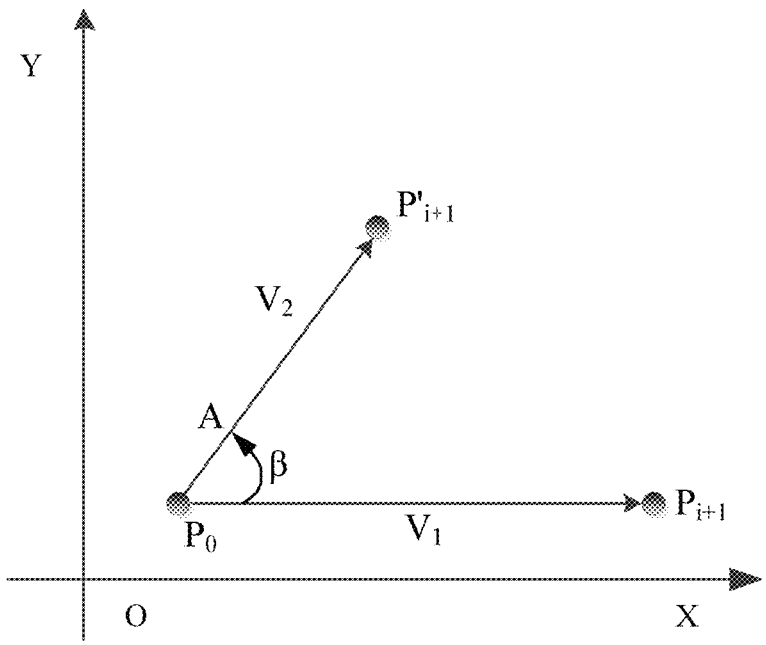

A person skilled in the art should understand that a manner of calibrating a positioning result of the pedestrian dead reckoning algorithm is not limited thereto. For example, a positioning result may be calibrated based on a nonlinear sharing algorithm. FIG. 9b shows a schematic diagram of another example of calibrating a positioning result of the pedestrian dead reckoning algorithm. As shown in FIG. 9b, a first vector $V_1$ between a starting position $P_0$ (that is, the latest first positioning result that satisfies the quality condition before positioning using the pedestrian dead reckoning algorithm is started) for positioning using the pedestrian dead reckoning algorithm and the foregoing first position $P_{i+1}$ may be determined. A second vector $V_2$ between the foregoing starting position $P_0$ and the foregoing second position $P'_{i+1}$ is determined. An angle deviation (the magnitude and direction of an angle $\beta$) between the first vector and the second vector is equally divided into parts and the parts are separately added to the positioning results $P_1$ to $P_i$ during positioning in the pedestrian dead reckoning algorithm. For example, i vectors between $P_0$ and $P_1$ to $P_i$ all rotate by an angle $\beta/i$ towards $V_2$ (the direction A shown by the arrow), to complete correction of a positioning result of the pedestrian dead reckoning algorithm.

Figure 10:
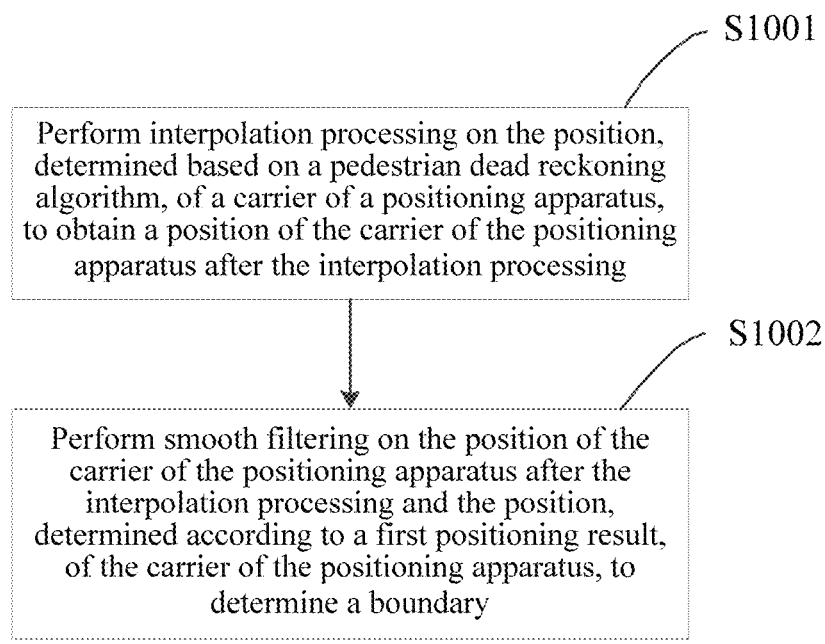
FIG. 10 is a flowchart of an example of a processing process of a processing module.

FIG. 10 is a flowchart of an example of a processing process of the processing module. FIG. 10 shows an exemplary process in which the processing module determines a boundary according to the position of the carrier of the positioning apparatus. As shown in FIG. 10, the processing module 103 is further configured to perform the following steps.

S1001: Perform interpolation processing on the position, determined based on a pedestrian dead reckoning algorithm, of the carrier of the positioning apparatus, to obtain the position of the carrier of the positioning apparatus after the interpolation processing.

S1002: Perform smooth filtering on the position of the carrier of the positioning apparatus after the interpolation processing and the position, determined according to the first positioning result, of the carrier of the positioning apparatus, to determine the boundary.

A step is used as a cycle for a positioning result of a pedestrian dead reckoning algorithm. To be specific, positioning is performed once for each step, the frequency is approximately is 2 Hz, and the interval is approximately 0.6 m. Therefore, the interpolation processing may further be performed on a positioning result of the pedestrian dead reckoning algorithm to obtain a positioning result after the interpolation processing, so that obtained positions are smooth and continuous. The quantity of interpolated values between two adjacent positioning results of the pedestrian dead reckoning algorithm is not limited, and for example, may be equal to a quantity (or referred to as a quantity of original first positioning results) of first positioning results corresponding to a time interval between two adjacent positioning results of the pedestrian dead reckoning algorithm. For example, interpolation may be performed according to the following formula between positioning results $P_i$ and $P_{i+1}$ of the pedestrian dead reckoning algorithm to obtain a processed position $P_m$:

$$p_m = p_i + m \cdot \Delta p \qquad \text{Formula 6}$$

where $1 \leq m \leq N$, $$\Delta p = \frac{p_{i+1} - p_i}{N+1},$$

and N is the quantity of original first positioning results.

A person skilled in the art may perform the interpolation processing in another appropriate manner. A specific manner of the interpolation processing is not limited in the present disclosure.

The positions obtained by using the first positioning results in combination with the positioning results of the pedestrian dead reckoning algorithm may fluctuate. Therefore, the smooth filtering may further be performed on the position to reduce data fluctuations and obtain a smooth boundary.

For example, a dynamic sliding window filtering method may be used to perform the smooth filtering. Filtering windows with different sizes may be used for different regions of the boundary. For example, a relatively small window (for example, a window size is 2) may be used for a position (a corner point) at a corner of the boundary to perform filtering. A relatively large window (for example, a window size is 5) may be used for a position (a non-corner point) that is not at a corner to perform filtering. An example of the smooth filtering is shown in the following formula, where P″ is a position obtained after the smooth filtering:

$$p_i'' = \begin{cases} \sum_{s=i-2}^{i+2} p_s/5, & i \text{ is a corner point} \\ \sum_{s=i-5}^{i+5} p_s/11, & i \text{ is a non-corner point} \end{cases} \quad \text{Formula 7}$$

A person skilled in the art may perform the smooth filtering in another appropriate manner. A specific manner of the smooth filtering is not limited in the present disclosure.

A person skilled in the art may use either or both of S1001 and S1002 according to a use requirement to perform processing, or may skip processing of S1001 and S1002.

Figure 11:
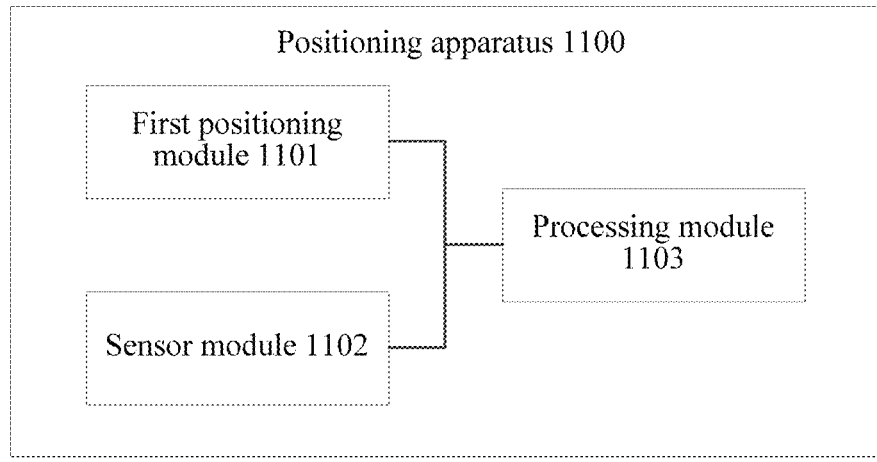
FIG. 11 is a structural diagram of a positioning apparatus according to an embodiment of the present disclosure.

FIG. 11 is a structural diagram of a positioning apparatus according to an embodiment of the present disclosure. A carrier can carry the positioning apparatus and walk. As shown in FIG. 11, the positioning apparatus 1100 includes a first positioning module 1101, a sensor module 1102, and a processing module 1103.

The first positioning module 1101 is configured to acquire a first positioning result of the carrier of the positioning apparatus 1100.

The sensor module 1102 is configured to measure acceleration and an angle parameter of walking of the carrier of the positioning apparatus 1100.

The processing module 1103 is configured to:

in a first mode used to determine a boundary of a working range of a self-moving device, determine a third position of the carrier of the positioning apparatus according to the first positioning result; determine a fourth position of the carrier of the positioning apparatus according to the acceleration and the angle parameter and based on a pedestrian dead reckoning algorithm; and determine a position of the carrier of the positioning apparatus according to the third position and the fourth position; and determine the boundary according to the position of the carrier of the positioning apparatus.

A position of a carrier of the positioning apparatus is determined by using a position determined according to a first positioning result and a position determined based on a pedestrian dead reckoning algorithm. The positioning apparatus according to an embodiment of the present disclosure integrates a pedestrian dead reckoning technology and other positioning technologies to establish a virtual boundary. The pedestrian dead reckoning technology is insusceptible to an external environment and can compensate for inadequacy of precision of the other positioning technologies because of environmental influence, so that positioning precision is high, and a precise boundary is established. In addition, it is not necessary to arrange a physical boundary, so that operations of a user are less complex.

Refer to the foregoing description of the examples of the first positioning module 101, the sensor module 102, and the processing module 103 for the examples of the first positioning module 1101, the sensor module 1102, and the processing module 1103.

In a possible implementation, the determining a position of the carrier of the positioning apparatus according to the third position and the fourth position may include: determining the position of the carrier of the positioning apparatus according to integration of the third position and the fourth position.

The third position and the fourth position may be integrated in any appropriate manner, and may be closely integrated or may be loosely integrated. This is not limited in the present disclosure.

For example, the determining the position of the carrier of the positioning apparatus according to integration of the third position and the fourth position may include:

determining the position of the carrier of the positioning apparatus according to a weighted sum of the third position and the fourth position.

For example, at a sampling time point $t_j$, a third position $P_{gj}$ of the carrier of the positioning apparatus is determined according to the first positioning result, a fourth position $P_{rj}$ of the carrier of the positioning apparatus is determined according to the acceleration and the angle parameter and based on the pedestrian dead reckoning algorithm, and a position $P_3$ of the carrier of the positioning apparatus at the sampling time point $t_3$ may be determined by using the following Formula 8:

$$P_j = w_1 \times P_{gj} + w_2 \times P_{rj} \quad \text{Formula 8}$$

where $w_1$ is a weight value of the third position, $w_2$ is a weight value of the fourth position, $0<w_1<1$, $0<w_2<1$, and $w_1+w_2=1$.

Values of $w_1$ and $w_2$ may be set as required, and this is not limited in the present disclosure.

In a possible implementation, $w_1$ and $w_2$ may have fixed values.

In another possible implementation, the processing module 1103 may be further configured to determine respective weights of the third position and the fourth position in the weighted sum according to quality of the first positioning result.

In this manner, proportions of positions obtained by using different positioning technologies in an eventually determined position can be appropriately adjusted for different quality of the first positioning data, thereby further ensuring positioning precision.

Refer to the foregoing for an example of determining the quality of the first positioning result. In a possible implementation, for example, the first positioning module is a satellite positioning module, and the first positioning result is a satellite positioning result. The quality of the satellite positioning result of the satellite positioning module may be determined according to either or both of a satellite quantity received by the satellite positioning module and a positioning state of the satellite positioning module.

In a possible implementation, the determining respective weights of the third position and the fourth position in the weighted sum according to quality of the first positioning result may include: as the quality of the first positioning result increases, increasing the weight of the third position in the weighted sum, and decreasing the weight of the fourth position in the weighted sum; and as the quality of the first positioning result decreases, decreasing the weight of the third position in the weighted sum, and increasing the weight of the fourth position in the weighted sum.

For example, as the quality of the first positioning result increases, $w_1$ may be increased and $w_2$ may be decreased to increase a proportion of the third position in the determined position. As the quality of the first positioning result decreases, $w_1$ may be decreased and $w_2$ may be increased to a proportion of the fourth position in the determined position.

In this manner, the positioning precision can be further improved.

In a possible implementation, if the first positioning result is in an excellent state, $w_1$ may be set to 1 and $w_2$ to 0. In this case, it may be considered that the position of the carrier is determined based on only the first positioning result. In an example, in this case, the determining of the fourth position may be skipped. If the first positioning result is in a terrible state, $w_1$ may be set to 0 and $w_2$ to 1. In this case, it may be considered that the position of the carrier is determined based on only the pedestrian dead reckoning algorithm.

For example, the quality of the first positioning result may include a plurality of states such as "excellent" (a first quality state), "normal" (a third quality state), and "poor" (a second quality state). $w_1$ and $w_2$ may be set to different values for different states. For example, two quality conditions may be set. If a first quality condition is satisfied, it is determined that the first positioning result is in the first quality state, and $w_1$ is set to 1 and $w_2$ to 0. If a second quality condition is not satisfied, it is determined that the first positioning result is in the second quality state, and $w_1$ is set to 0 and $w_2$ to 1. If neither of the foregoing two cases applies (for example, the first quality condition is not satisfied, but the second quality condition is satisfied), it is determined that the first positioning data is in a third quality state, and $w_1$ and $w_2$ may both be set to intermediate values greater than 0 and less than 1. For example, the GPS module is used as the first positioning module. A threshold of the satellite quantity may be set, and is set to, for example, 6. The processing module 103 may determine the satellite quantity and the positioning state according to an output signal of the GPS module. If the positioning state is 4, it is considered that the first quality condition is satisfied, and the processing module 103 may determine that the GPS positioning result is in the first quality state. If the positioning state is neither 4 nor 5, and/or the satellite quantity is less than 6, it is considered that the second quality condition is not satisfied, and the processing module 103 may determine that GPS positioning result is in a second quality state. If neither of the foregoing two cases applies, for example, the positioning state is 5 or the satellite quantity is greater than or equal to 6, the processing module 103 may determine that the GPS positioning result is in the third quality state.

The foregoing conditions for distinguishing quality states are only an example. A person skilled in the art may set other conditions as required to distinguish different quality states, or may set one quality state or any quantity of quality states. Alternatively, instead of the setting of quality states, weights $w_1$ and $w_2$ may be calculated in real time according to the quality of the first positioning result. This is not limited in the present disclosure.

As discussed above, a positioning result (the fourth position) of the pedestrian dead reckoning algorithm may only exist at a step point, and the first positioning result (the third position) may exist at all sampling time points. Therefore, the interpolation processing may be performed in a process of determining the position of the carrier of the positioning apparatus based on the third position and the fourth position.

In a possible implementation, the determining a position of the carrier of the positioning apparatus according to the third position and the fourth position may include: determining the position of the carrier of the positioning apparatus at a step point according to the third position at the step point and the fourth position at the step point; and performing the interpolation processing on the position of the carrier of the positioning apparatus at the step point to obtain the position of the carrier of the positioning apparatus, where the step point is a feature point of each step of the carrier.

For example, a position of the carrier at a step point may be obtained according to a fourth position at the step point and a third position at the step point (that is, a sampling time point corresponding to the step point) and according to Formula 8, and interpolation may be performed on positions of the carrier at step points in, for example, the manner shown in Formula 6 or any appropriate manner. A quantity of interpolated values may be a quantity (or referred to as a quantity of original first positioning results) of first positioning results corresponding to a time interval between step points, so as to obtain continuous positions of the carrier of the positioning apparatus, thereby ensuring the continuity of the results.

In another possible implementation, the determining a position of the carrier of the positioning apparatus according to the third position and the fourth position may include: performing interpolation processing on the fourth position at the step point to obtain a fourth position after interpolation; and determining the position of the carrier of the positioning apparatus according to the third position and the fourth position after interpolation, where the step point is a feature point of each step of the carrier.

For example, interpolation may be performed on fourth positions at the step points in the manner shown in Formula 6 or any appropriate manner, to obtain fourth positions after interpolation. A quantity of interpolated values may be a quantity (or referred to as a quantity of original first positioning results) of first positioning results corresponding to a time interval between step points. The position of the carrier of the positioning apparatus may be obtained according to the fourth positions obtained after interpolation and the third positions at sampling time points and according to Formula 8, thereby ensuring the continuity of the results.

In a possible implementation, the fourth position may be obtained based on the pedestrian dead reckoning algorithm in a manner similar to the foregoing manner of obtaining a positioning result based on the pedestrian dead reckoning algorithm.

For example, the processing module 1103 may acquire a model parameter of a step length-frequency model of the carrier of the positioning apparatus in a manner similar to that in the foregoing, for example, may determine the step frequency and a step point of the carrier according to the acceleration measured by the sensor module, determine the step length of the carrier according to the first positioning result corresponding to the step point, and determine the model parameter of the step length-frequency model according to the step frequency and the step length. Refer to the foregoing for exemplary description.

In a manner similar to that in the foregoing, the fourth position of the carrier of the positioning apparatus may be determined according to the model parameter of the step length-frequency model, the acceleration, and the angle parameter and based on the pedestrian dead reckoning algorithm.

Figure 12:
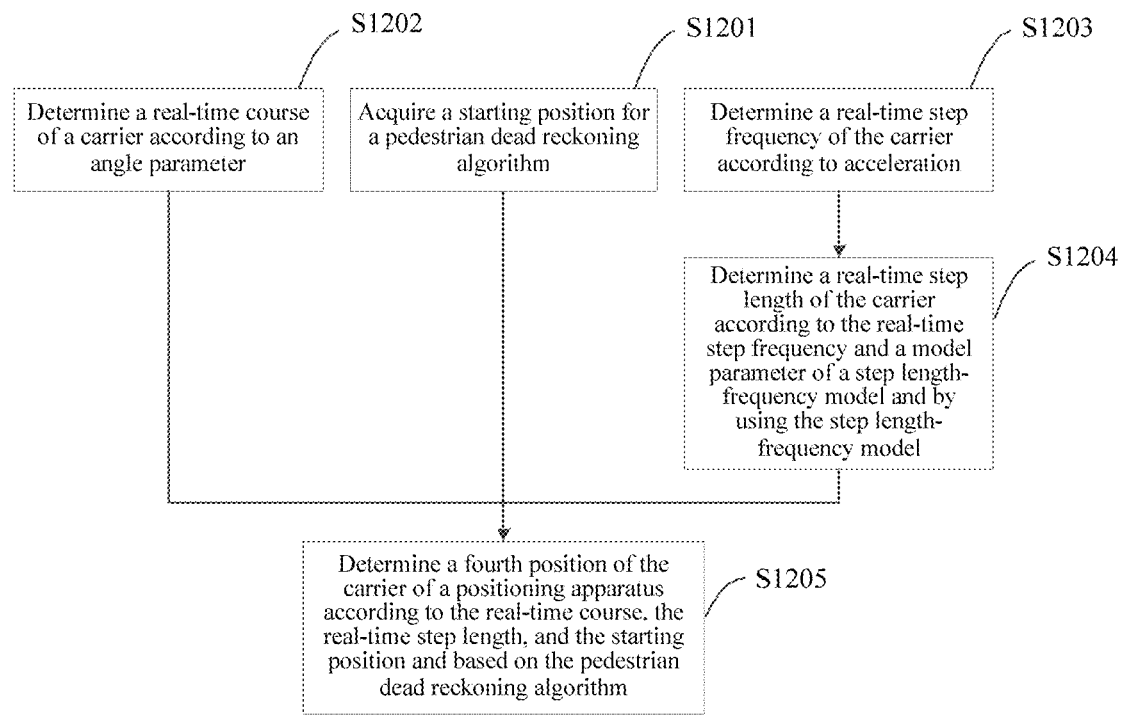
FIG. 12 is a flowchart of an example of a processing process of a processing module.

FIG. 12 is a flowchart of an example of a processing process of the processing module. FIG. 12 shows an example of a process of determining the fourth position of the carrier of the positioning apparatus according to the model parameter of the step length-frequency model, the acceleration, and the angle parameter and based on the pedestrian dead reckoning algorithm. The process includes the following steps.

S1201: Acquire a starting position for the pedestrian dead reckoning algorithm.

For example, the first positioning result obtained when the positioning apparatus enters a first mode may be used as the starting position. In this case, in a manner similar to that in the foregoing, the carrier is prompted to start to locate a boundary only when the first positioning result satisfies the quality condition. Alternatively, a latest first positioning result that satisfies the quality condition after the positioning apparatus enters the first mode may be used as the starting position. A manner of acquiring the starting position is not limited in the present disclosure.

S1202: Determine a real-time course of the carrier according to the angle parameter. Refer to the description of S602.

S1203: Determine a real-time step frequency of the carrier according to the acceleration. Refer to the description of S603.

An order of performing S1201, S1202, and S1203 is not limited.

S1204: Determine a real-time step length of the carrier according to the real-time step frequency and the model parameter of the step length-frequency model and by using the step length-frequency model. Refer to the description of S604.

S1205: Determine the fourth position of the carrier of the positioning apparatus according to the real-time course, the real-time step length, and the starting position and based on the pedestrian dead reckoning algorithm. Refer to the description of S605.

In a possible implementation, the positioning apparatus in the foregoing embodiments can be installed at the self-moving device. The processing module (for example, the processing module 103 or 1103) in the positioning apparatus may be configured to: in a second mode used to locate the self-moving device, determine a position of the self-moving device according to at least one of the first positioning result and an inertial positioning result, where the inertial positioning result is determined according to at least the acceleration and the angle parameter output by the sensor module and based on an inertial navigation prediction algorithm. Refer to the foregoing for the exemplary description of the first mode and the second mode.

In the second mode, the self-moving device may be located according to the first positioning result, or the self-moving device may be located according to the inertial positioning result, or the self-moving device may be located based on the integration of the first positioning result and the inertial positioning result.

In the positioning by integrating the first positioning result and the inertial positioning result, for example, Kalman filtering may be used to integrate the first positioning result and inertial data such as acceleration and an angle parameter in real time. The acceleration and the angle parameter that are acquired by the sensor module and the first positioning result obtained by the first positioning module are transferred into a Kalman filter for integration. Closed-ring correction is performed on the first positioning result, to obtain a corrected position, speed, attitude, and the like, so that a more precise positioning result is obtained. That is, an integrated positioning system for the second mode is implemented to alleviate a problem of low positioning precision if the first positioning module encounters a signal blockage. The integrated positioning may be implemented based on related technologies. Details are not described herein again.

In a possible implementation, the inertial navigation prediction algorithm may include an INS algorithm.

In a possible implementation, if the first positioning module is a GPS module, a differential GPS (DGPS) technology, a continuously operating reference station (CORS) technology, and the like may further be used to further improve positioning precision. According to the DGPS technology, during actual positioning, a mobile station receives a GPS satellite signal, an observation of a carrier from a reference station (at a fixed and known position), and a position of the reference station, and a differential observation is formed between the observation and an observation of a phase of a carrier received by the mobile station (a technology of using a phase of a carrier to perform differential is also referred to as real-time kinematic (RTK, carrier-phase differential), so as to correct the phase of the carrier to obtain a high-precision positioning result. In the CORS technology, a multi-base station network RTK technology is used to create CORS. In the CORS, several fixed and continuously operating GPS reference stations constitute a differential network by using modern computer, data communication, and Internet technologies to perform correction for a mobile target, thereby greatly improving positioning precision of the mobile station.

Figure 13:
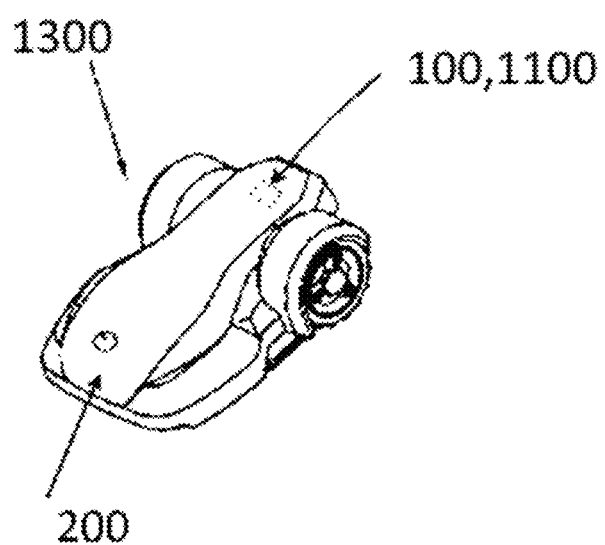
FIG. 13 is a structural diagram of a self-moving device according to an embodiment of the present disclosure.

FIG. 13 is a structural diagram of a self-moving device according to an embodiment of the present disclosure. The self-moving device 1300 includes a device body 200 and the foregoing positioning apparatus, for example, the positioning apparatus 100 or the positioning apparatus 1100. The positioning apparatus can be detachably installed at the device body 200.

The self-moving device in this embodiment may work in, for example, the application environment shown in FIG. 1. The positioning apparatus locates a boundary (for example, the boundary 50' in FIG. 1) of a working region of the self-moving device.

The self-moving device in this embodiment of the present disclosure may be in various forms of a lawn mower, a vacuum cleaner, an industrial robot, and the like. When the self-moving device is a lawn mower, the self-moving device may further include a cutting mechanism. The cutting mechanism may include a cutting motor and a cutting blade. When the lawn mower works in the working region 30' defined by the boundary 50', the cutting motor drives the cutting blade to rotate to cut grass.

A person skilled in the art should understand that FIG. 13 is only a schematic diagram that schematically shows a walking device, and the shape of the self-moving device, an installing position of the positioning apparatus at the self-moving device, the shape of the positioning apparatus, and the like are not limited in the present disclosure.

An installing manner between the positioning apparatus and the device body 200 is not limited. For example, the positioning apparatus may be clamped in a clamping groove of the device body, or is accommodated in an installing box disposed on the device body. When the positioning apparatus is installed on the device body, the positioning apparatus may be electrically connected to another circuit in the device body, and for example, may perform data or electrical communication with the other circuit.

Figure 14:
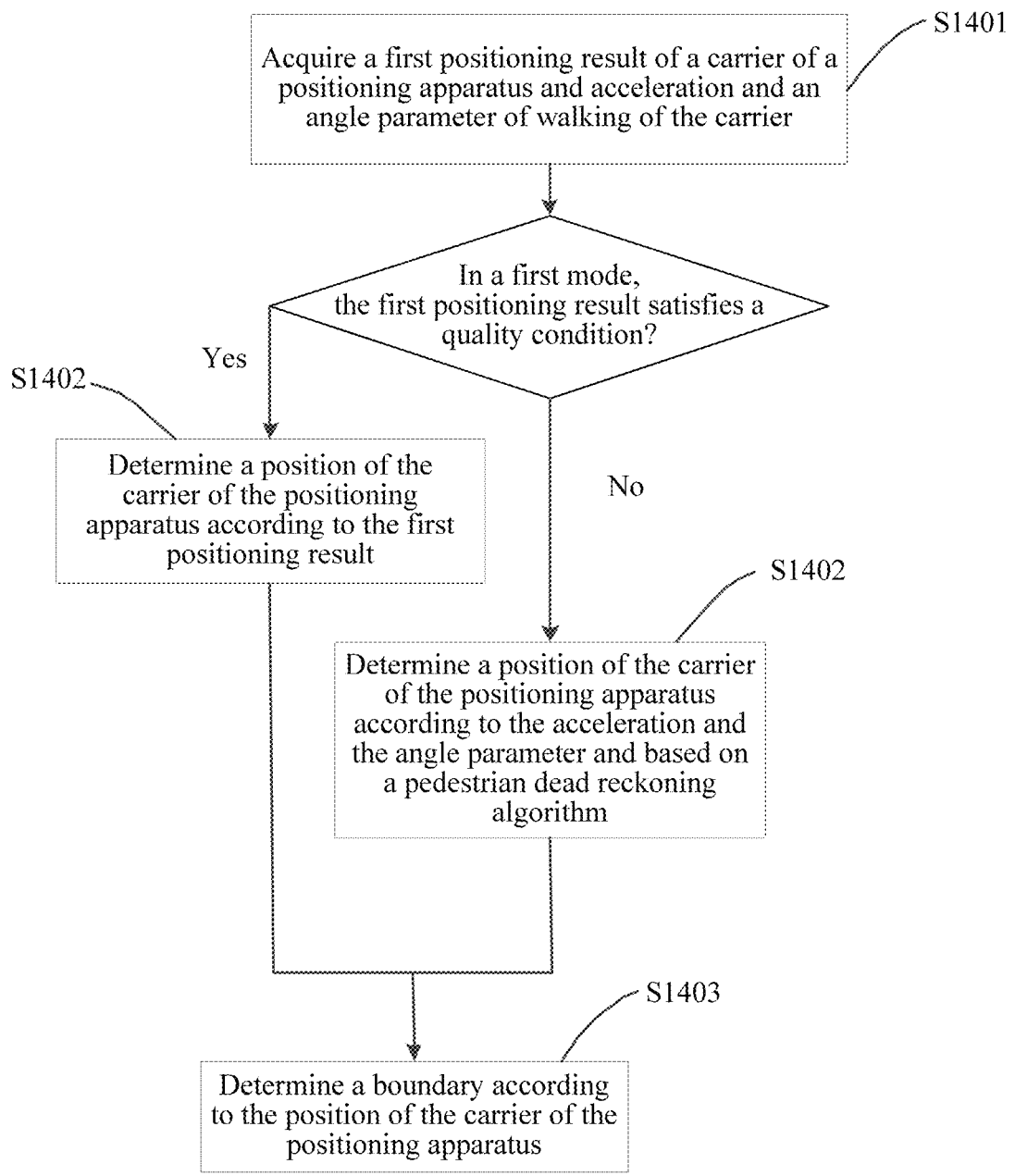
FIG. 14 is a flowchart of a positioning method according to an embodiment of the present disclosure.

FIG. 14 is a flowchart of a positioning method according to an embodiment of the present disclosure. The method is applicable to the foregoing positioning apparatus 100. The method includes the following steps:

S1401: Acquire a first positioning result of a carrier of the positioning apparatus and acceleration and an angle parameter of walking of the carrier.

S1402. In a first mode used to determine a boundary of a working range of a self-moving device, if the first positioning result satisfies a quality condition, determine a position of the carrier of the positioning apparatus according to the first positioning result; or if the first positioning result does not satisfy a quality condition, determine a position of the carrier of the positioning apparatus according to the acceleration and the angle parameter and based on a pedestrian dead reckoning algorithm.

S1403: Determine the boundary according to the position of the carrier of the positioning apparatus.

According to quality of a first positioning result, a position of a carrier of a positioning apparatus is determined based on the first positioning result or based on a pedestrian dead reckoning algorithm. In the positioning method according to this embodiment of the present disclosure, a pedestrian dead reckoning technology and other positioning technologies are integrated to establish a virtual boundary. The pedestrian dead reckoning technology is insusceptible to an external environment and can compensate for inadequacy of precision of the other positioning technologies because of environmental influence, so that positioning precision is high, and a precise boundary is established. In addition, it is not necessary to arrange a physical boundary, so that operations of a user are less complex.

In a possible implementation, the method may further include: acquiring a model parameter of a step length-frequency model of the carrier of the positioning apparatus, where the step length-frequency model represents a relationship between a step frequency and a step length of the carrier; and the determining a position of the carrier of the positioning apparatus according to the acceleration and the angle parameter and based on a pedestrian dead reckoning algorithm may include: determining the position of the carrier of the positioning apparatus according to the model parameter of the step length-frequency model, the acceleration, and the angle parameter and based on the pedestrian dead reckoning algorithm.

In a possible implementation, the determining the position of the carrier of the positioning apparatus according to the model parameter of the step length-frequency model, the acceleration, and the angle parameter and based on the pedestrian dead reckoning algorithm may include: when the first positioning result does not satisfy the quality condition, acquiring a latest first positioning result that satisfies the quality condition as a starting position for the pedestrian dead reckoning algorithm; determining a real-time course of the carrier according to the angle parameter; determining a real-time step frequency of the carrier according to the acceleration; determining a real-time step length of the carrier according to the real-time step frequency and the model parameter of the step length-frequency model and by using the step length-frequency model; and determining the position of the carrier of the positioning apparatus according to the real-time course, the real-time step length, and the starting position and based on the pedestrian dead reckoning algorithm.

In a possible implementation, the acquiring a model parameter of a step length-frequency model of the carrier of the positioning apparatus may include: determining the step frequency and a step point of the carrier according to the acceleration measured by the sensor module, determining the step length of the carrier according to the first positioning result corresponding to the step point, and determining the model parameter of the step length-frequency model according to the step frequency and the step length, where the step point is a feature point of each step of the carrier.

In a possible implementation, the method may further include: when the first positioning result changes from not satisfying the quality condition to satisfying the quality condition, acquiring a first position, determined based on the pedestrian dead reckoning algorithm, of the carrier of the positioning apparatus and a second position, determined according to the first positioning result of the first positioning module, of the carrier of the positioning apparatus; and calibrating, according to the first position and the second position, the position, determined based on the pedestrian dead reckoning algorithm, of the carrier of the positioning apparatus when the first positioning result does not satisfy the quality condition.

In a possible implementation, the determining the boundary according to the position of the carrier of the positioning apparatus may include: performing interpolation processing on the position, determined based on the pedestrian dead reckoning algorithm, of the carrier of the positioning apparatus, to obtain the position of the carrier of the positioning apparatus after the interpolation processing; and performing smooth filtering on the position of the carrier of the positioning apparatus after the interpolation processing and the position, determined according to the first positioning result, of the carrier of the positioning apparatus, to determine the boundary.

In a possible implementation, the first positioning module may be a satellite positioning module, and the first positioning result is a satellite positioning result.

In a possible implementation, the method may further include: determining, according to either or both of a satellite quantity received by the satellite positioning module and a positioning state of the satellite positioning module, whether the satellite positioning result of the satellite positioning module satisfies the quality condition.

In a possible implementation, the determining, according to either or both of a satellite quantity received by the satellite positioning module and a positioning state of the satellite positioning module, whether the satellite positioning result of the satellite positioning module satisfies the quality condition may include: if the positioning state is a specified state and the satellite quantity is not less than a threshold, determining that the satellite positioning result satisfies the quality condition.

In a possible implementation, the method may further include: in a second mode used to locate the self-moving device, determining a position of the self-moving device according to at least one of the first positioning result and an inertial positioning result, where the inertial positioning result is determined according to at least the acceleration and the angle parameter output by the sensor module and based on an inertial navigation prediction algorithm.

In a possible implementation, the inertial navigation prediction algorithm includes an INS algorithm.

In a possible implementation, the pedestrian dead reckoning algorithm includes a PDR algorithm.

In a possible implementation, the first positioning module includes a UWB positioning module.

The foregoing method may be performed by the positioning apparatus 100, for example, by the processing module 103 in the positioning apparatus. The processing module 103 may be configured as a dedicated hardware circuit for performing the foregoing method or may execute a logic instruction to perform the foregoing method.

Refer to the foregoing description of the positioning apparatus 100 for the exemplary description of the foregoing method. Details are not described herein again.

Figure 15:
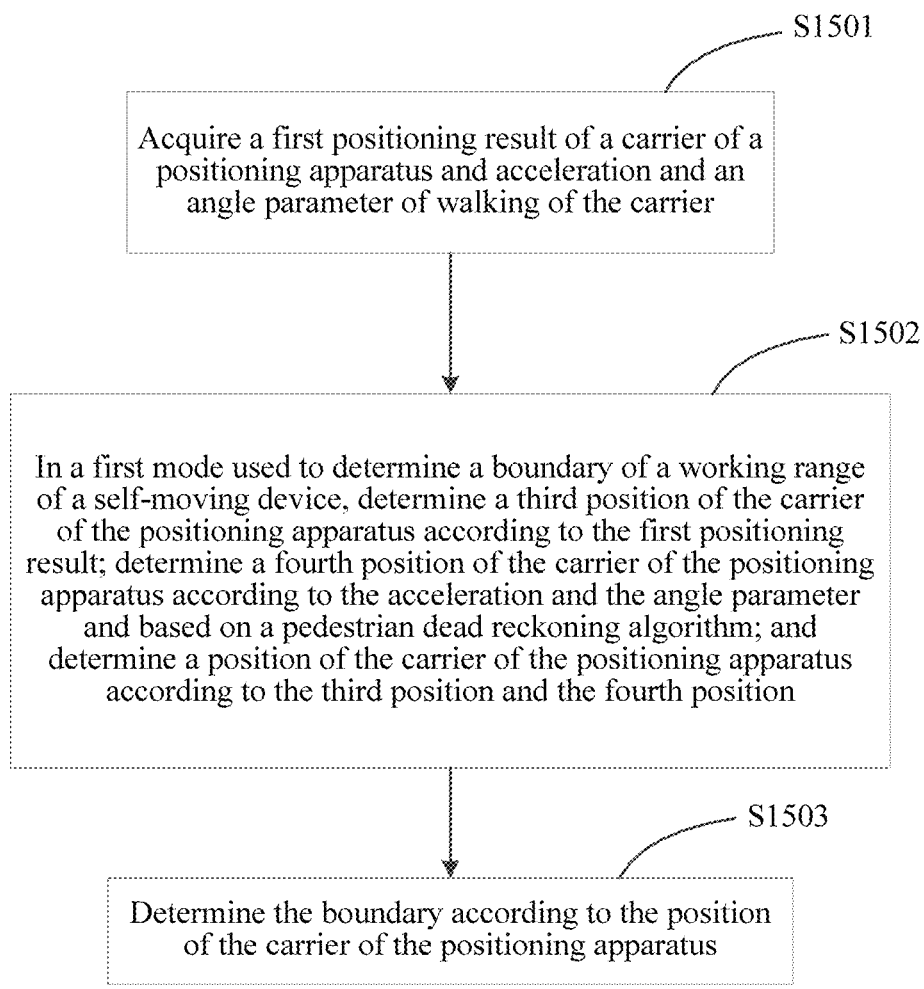
FIG. 15 is a flowchart of a positioning method according to an embodiment of the present disclosure.

FIG. 15 is a flowchart of a positioning method according to an embodiment of the present disclosure. The method may be applied to the foregoing positioning apparatus 1100. The method includes the following steps:

S1501: Acquire a first positioning result of a carrier of the positioning apparatus and acceleration and an angle parameter of walking of the carrier.

S1502: In a first mode used to determine a boundary of a working range of a self-moving device, determine a third position of the carrier of the positioning apparatus according to the first positioning result; determine a fourth position of the carrier of the positioning apparatus according to the acceleration and the angle parameter and based on a pedestrian dead reckoning algorithm; and determine a position of the carrier of the positioning apparatus according to the third position and the fourth position.

S1503: Determine the boundary according to the position of the carrier of the positioning apparatus.

A position of a carrier of a positioning apparatus is determined according to a position determined by a first positioning result and a position determined based on a pedestrian dead reckoning algorithm. In the positioning method according to this embodiment of the present disclosure, a pedestrian dead reckoning technology and other positioning technologies are integrated to establish a virtual boundary. The pedestrian dead reckoning technology is insusceptible to an external environment and can compensate for inadequacy of precision of the other positioning technologies because of environmental influence, so that positioning precision is high, and a precise boundary is established. In addition, it is not necessary to arrange a physical boundary, so that operations of a user are less complex.

In a possible implementation, the determining a position of the carrier of the positioning apparatus according to the third position and the fourth position may include: determining the position of the carrier of the positioning apparatus according to integration of the third position and the fourth position.

In a possible implementation, the determining the position of the carrier of the positioning apparatus according to integration of the third position and the fourth position may include: determining the position of the carrier of the positioning apparatus according to a weighted sum of the third position and the fourth position.

In a possible implementation, the method further includes: determining respective weights of the third position and the fourth position in the weighted sum according to quality of the first positioning result.

In a possible implementation, the determining respective weights of the third position and the fourth position in the weighted sum according to quality of the first positioning result may include: as the quality of the first positioning result increases, increasing the weight of the third position in the weighted sum, and decreasing the weight of the fourth position in the weighted sum; and as the quality of the first positioning result decreases, decreasing the weight of the third position in the weighted sum, and increasing the weight of the fourth position in the weighted sum.

In a possible implementation, the first positioning module is a satellite positioning module, and the first positioning result is a satellite positioning result.

In a possible implementation, the method may further include: determining, according to either or both of a satellite quantity received by the satellite positioning module and a positioning state of the satellite positioning module, the quality of the satellite positioning result of the satellite positioning module.

In a possible implementation, the determining a position of the carrier of the positioning apparatus according to the third position and the fourth position may include: determining the position of the carrier of the positioning apparatus at a step point according to the third position at the step point and the fourth position at the step point; and performing interpolation processing on the position of the carrier of the positioning apparatus at the step point to obtain the position of the carrier of the positioning apparatus, where the step point is a feature point of each step of the carrier.

In a possible implementation, the determining a position of the carrier of the positioning apparatus according to the third position and the fourth position may include: performing interpolation processing on the fourth position at the step point to obtain a fourth position after interpolation; and determining the position of the carrier of the positioning apparatus according to the third position and the fourth position after interpolation, where the step point is a feature point of each step of the carrier.

In a possible implementation, the method may further include: acquiring a model parameter of a step length-frequency model of the carrier of the positioning apparatus, where the step length-frequency model represents a relationship between a step frequency and a step length of the carrier; and the determining a fourth position of the carrier of the positioning apparatus according to the acceleration and the angle parameter and based on a pedestrian dead reckoning algorithm includes: determining the fourth position of the carrier of the positioning apparatus according to the model parameter of the step length-frequency model, the acceleration, and the angle parameter and based on the pedestrian dead reckoning algorithm.

In a possible implementation, the determining the fourth position of the carrier of the positioning apparatus according to the model parameter of the step length-frequency model, the acceleration, and the angle parameter and based on the pedestrian dead reckoning algorithm may include: acquiring a starting position for the pedestrian dead reckoning algorithm; determining a real-time course of the carrier according to the angle parameter; determining a real-time step frequency of the carrier according to the acceleration; determining a real-time step length of the carrier according to the real-time step frequency and the model parameter of the step length-frequency model and by using the step length-frequency model; and determining the fourth position of the carrier of the positioning apparatus according to the real-time course, the real-time step length, and the starting position and based on the pedestrian dead reckoning algorithm.

In a possible implementation, the acquiring a model parameter of a step length-frequency model of the carrier of the positioning apparatus may include: determining the step frequency and a step point of the carrier according to the acceleration measured by the sensor module, determining the step length of the carrier according to the first positioning result corresponding to the step point, determining the model parameter of the step length-frequency model according to the step frequency and the step length, where the step point is a feature point of each step of the carrier.

In a possible implementation, the method further includes: in a second mode used to locate the self-moving device, determining a position of the self-moving device according to at least one of the first positioning result and an inertial positioning result, where the inertial positioning result is determined according to at least the acceleration and the angle parameter output by the sensor module and based on an inertial navigation prediction algorithm.

In a possible implementation, the inertial navigation prediction algorithm includes an INS algorithm.

In a possible implementation, the first positioning module includes a UWB positioning module.

In a possible implementation, the pedestrian dead reckoning algorithm includes a PDR algorithm.

The foregoing method may be performed by the positioning apparatus 1100, for example, by the processing module 1103 in the positioning apparatus. The processing module 1103 may be configured as a dedicated hardware circuit for performing the foregoing method or may execute a logic instruction to perform the foregoing method. Refer to the foregoing description of the positioning apparatus 1100 for the exemplary description of the foregoing method. Details are not described herein again.

Application Example 1

Figure 16A:
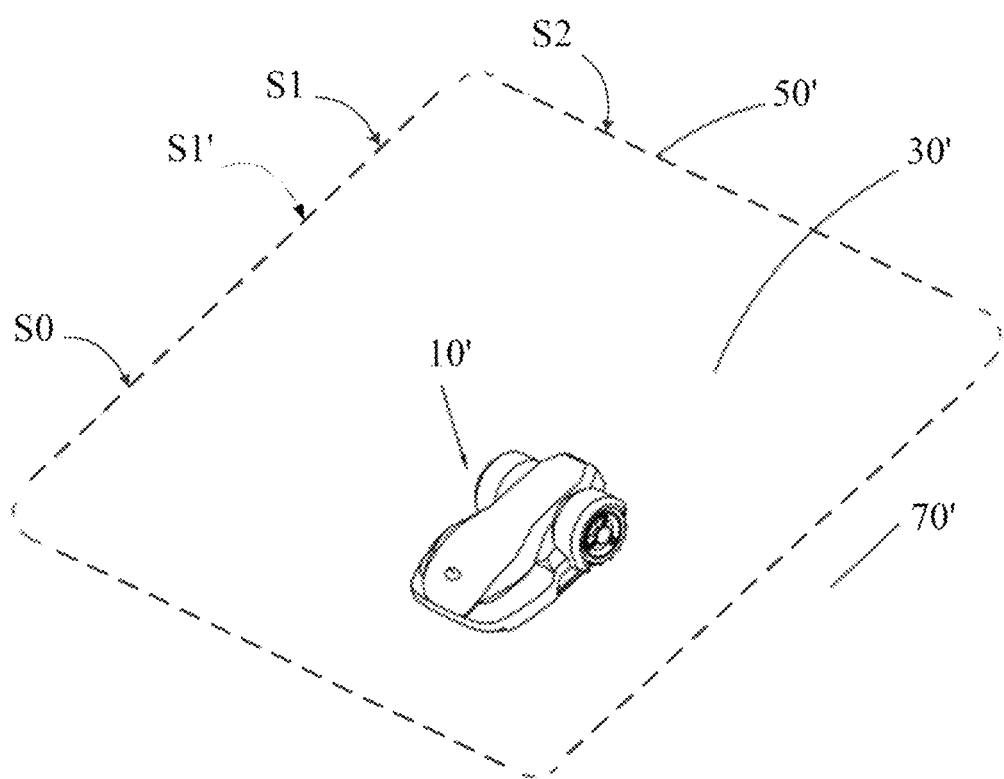
FIG. 16a to FIG. 16c are schematic diagrams of application examples according to an embodiment of the present disclosure.
Figure 16B:
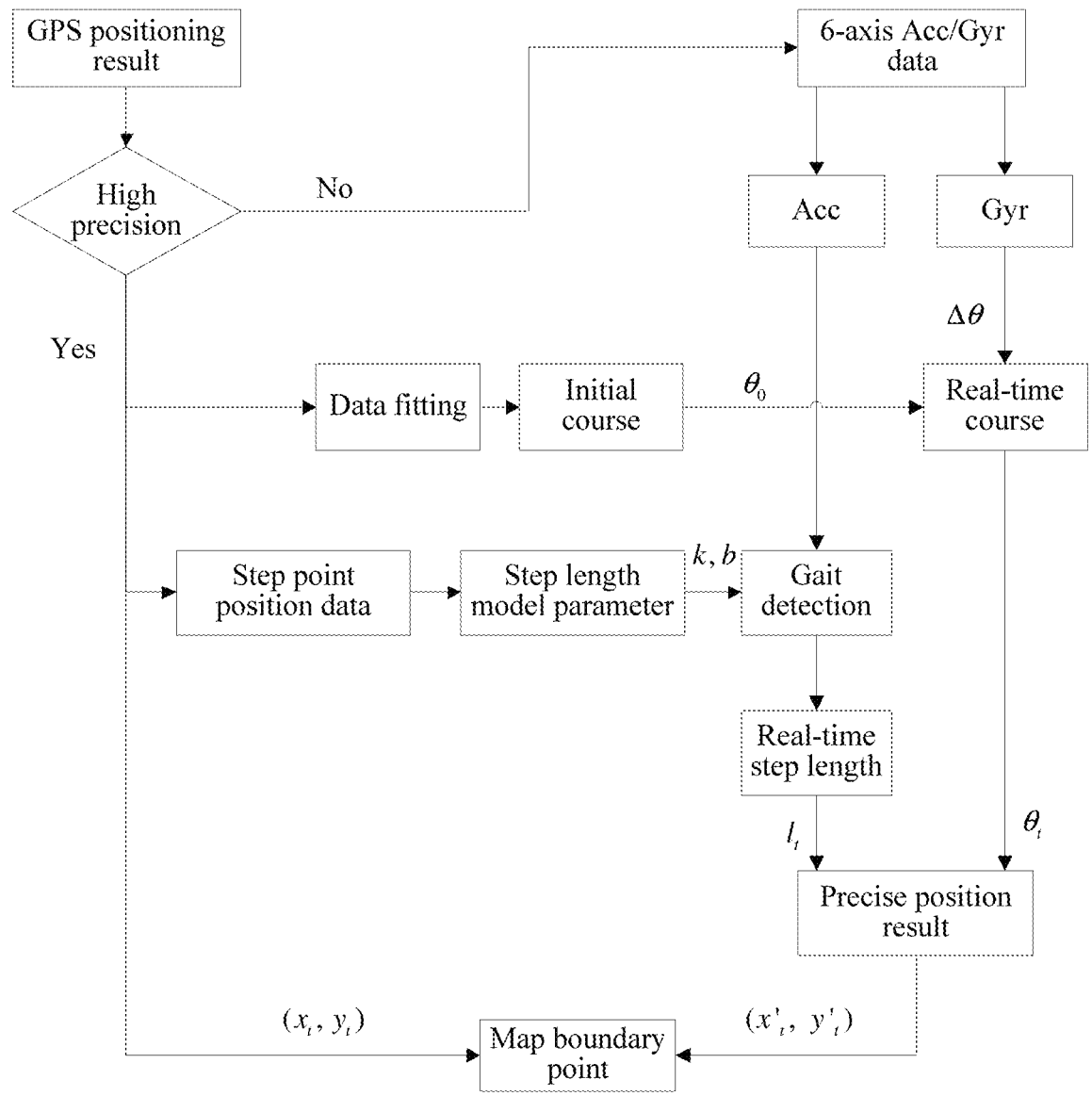

An application example according to an embodiment of the present disclosure is shown below with reference to FIG. 16a and FIG. 16b. A person skilled in the art should understand that the application example is only used to facilitate understanding but not intended to limit the present disclosure in any way.

The application example schematically shows an exemplary scenario in which the first positioning module is a GPS module, an angle parameter is angular velocity, and as quality of a GPS positioning result changes, either GPS or PDR is used to perform positioning.

When the positioning apparatus needs to be used to determine a position of a virtual boundary, a user carries the positioning apparatus and reaches a boundary 50'. The user may walk along the boundary 50' until finding a starting point S0 where a GPS positioning result satisfies a quality condition. In this case, the positioning apparatus may prompt the user that quality of GPS positioning result is good (or a GPS signal zone is strong, or GPS positioning precision is high). The boundary may start to be located. The user may trigger a button on the positioning apparatus or use another manner to instruct the positioning apparatus to start to locate the boundary. The positioning apparatus may use a GPS positioning result and a measurement result of the sensor module that are obtained when an instruction is received as initial values of measurement and use the point S0 as the starting point of measurement.

As the user walks clockwise along the boundary 50', the positioning apparatus may obtain and record in real time a GPS positioning result $(x_t, y_t)$ as a position of a user and stores the position. Meanwhile, the positioning apparatus may determine, by using an output of the GPS module, a quality state of the GPS positioning result in real time, and measure acceleration Acc and an angle Gyr by using the sensor module, so as to determine an initial course $\theta_0$ and model parameters k and b of a step length-frequency model.

When the user walks to a position S1, a working region is blocked by a house or a tree, and the positioning apparatus determines that the GPS positioning result does not satisfy the quality condition (or a GPS signal zone is weak, or GPS positioning precision is low). The positioning apparatus uses a latest GPS positioning result that satisfies the quality condition as starting coordinates of PDR, obtains a real-time course $\theta_t$ according to the initial course $\theta_0$ and angular velocity data $\Delta\theta$, determines a real-time step length $l_t$ by using the step length-frequency model and according to a real-time step frequency, calculates a real-time coordinate point $(x'_t, y'_t)$ according to the real-time course and the real-time step length, and stores the coordinate point as the position of the user.

When the user walks to a position S2, GPS positioning result changes from not satisfying the quality condition to satisfying the quality condition, the positioning apparatus may obtain a PDR positioning result and a GPS positioning result at this time, and calibrate, according to a deviation between the PDR positioning result and the GPS positioning result, a previous PDR positioning result that does not satisfy the quality condition.

As the user walks along the boundary 50', the foregoing processes take place alternately according to the quality of the GPS positioning result until the user returns to the starting point $S_0$. The positioning apparatus may automatically determine that the user has returned to the starting point, or the user indicates that the positioning apparatus has returned to the starting point. For example, the user may send an instruction indicating that positioning ends to the positioning apparatus. The positioning apparatus may perform interpolation processing on stored PDR positioning results, and perform smooth filtering on the GPS positioning results and the PDR positioning results obtained after interpolation, to obtain eventual boundary position data (map boundary points) and store the boundary position data in the positioning apparatus.

When needing to use the self-moving device, the user may install the positioning apparatus at the self-moving device. The positioning apparatus may use a positioning technology that integrates GPS and INS to determine a position of the self-moving device, and compare the position with a stored boundary position to determine whether the self-moving device is in the working region or determine a distance of the self-moving device from the boundary or the like, so as to control a movement manner of the self-moving device.

Application Example 2

Figure 16C:
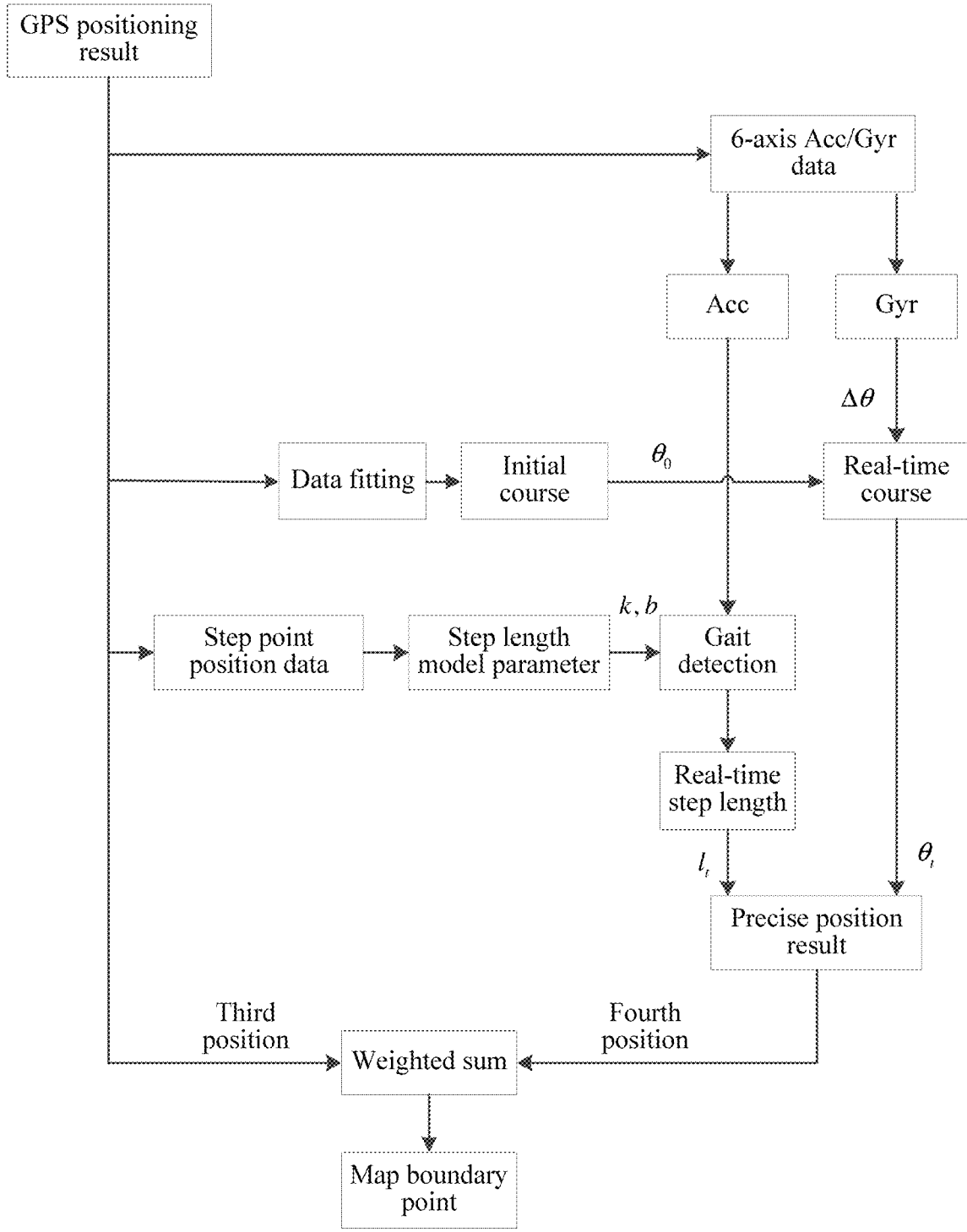

An application example according to an embodiment of the present disclosure is shown below with reference to FIG. 16a and FIG. 16c. A person skilled in the art should understand that the application example is only used to facilitate understanding but not intended to limit the present disclosure in any way.

The application example schematically shows an exemplary scenario in which the first positioning module is a GPS module, an angle parameter is angular velocity, and as quality of a GPS positioning result changes, weight values of the GPS positioning result and a PDR positioning result in a weighted sum are changed.

Similar to the application example 1, when the positioning apparatus needs to be used to determine a position of a virtual boundary, a user carries the positioning apparatus and reaches the boundary 50'. The user may walk along the boundary 50' until finding a starting point S0 where a GPS positioning result satisfies a quality condition. In this case, the positioning apparatus may prompt the user that quality of GPS positioning is good (or a GPS signal zone is strong, or GPS positioning precision is high). The boundary may start to be located. The user may trigger a button on the positioning apparatus or use another manner to instruct the positioning apparatus to start to locate the boundary. The positioning apparatus may use a GPS positioning result and a measurement result of the sensor module that are obtained when an instruction is received as initial values of measurement. The GPS positioning result is used as an initial position of PDR, and the point S0 is used as the starting point of measurement.

As the user walks clockwise along the boundary 50', the positioning apparatus may obtain and record in real time a GPS positioning result as a third position. Meanwhile, the positioning apparatus may measure acceleration Acc and an angle Gyr by using the sensor module, so as to determine an initial course $\theta_0$ and model parameters k and b of a step length-frequency model, obtain a real-time course $\theta_t$ according to the initial position of PDR, the initial course $\theta_0$, and angular velocity data $\Delta\theta$, determine a real-time step length $l_t$ by using the step length-frequency model and according to a real-time step frequency, and calculate a real-time coordinates point as a fourth position according to the real-time course and the real-time step length. The positioning apparatus may calculate a weighted sum of the third position and the fourth position and as the position of the carrier.

The positioning apparatus may determine, by using an output of the GPS module, a quality state of the GPS positioning result in real time, and adjust weights of the third position and the fourth position in the weighted sum according to the quality state. When the user walks to a position S1', a working region is blocked by a house or a tree, the positioning apparatus determines that the quality of the GPS positioning result decreases, and the positioning apparatus decreases the weight of the third position and increases the weight of the fourth position.

The quality of the GPS positioning result further decreases when the user walks to a position S1. In this case, the weight value of the third position may be set to 0, or the GPS positioning result is ignored, and the fourth position is stored as the position of the carrier.

The quality of the GPS positioning result increases when the user walks to a position S2. The positioning apparatus may increase the weight of the third position, and decrease the weight of the fourth position. If the quality of the GPS positioning result is good enough, the positioning apparatus may even stop a PDR positioning process, or the weight of the fourth position may be set to 0, and the third position is stored as the position of the carrier.

As the user walks along the boundary 50', the foregoing processes take place alternately according to the quality of the GPS positioning result until the user returns to the starting point $S_0$. The positioning apparatus may automatically determine that the user has returned to the starting point, or the user indicates that the positioning apparatus has returned to the starting point. For example, the user may send an instruction indicating that positioning ends to the positioning apparatus. The positioning apparatus may obtain eventual boundary position data (map boundary points) and store the boundary position data in the positioning apparatus.

When needing to use the self-moving device, the user may install the positioning apparatus at the self-moving device. The positioning apparatus may use a positioning technology that integrates GPS and INS to determine a position of the self-moving device, and compare the position with a stored boundary position to determine whether the self-moving device is inside the working region or determine a distance of the self-moving device from the boundary or the like, so as to control a movement manner of the self-moving device.

It should be noted that although two-dimensional coordinates (x, y) are used as an example of coordinate data for representing a position, a person skilled in the art should understand that three-dimensional coordinates or coordinate data in another form may be used to represent a position, and a coordinate system may be chosen according to an actual requirement. This is not limited in the present disclosure.

Figure 17:
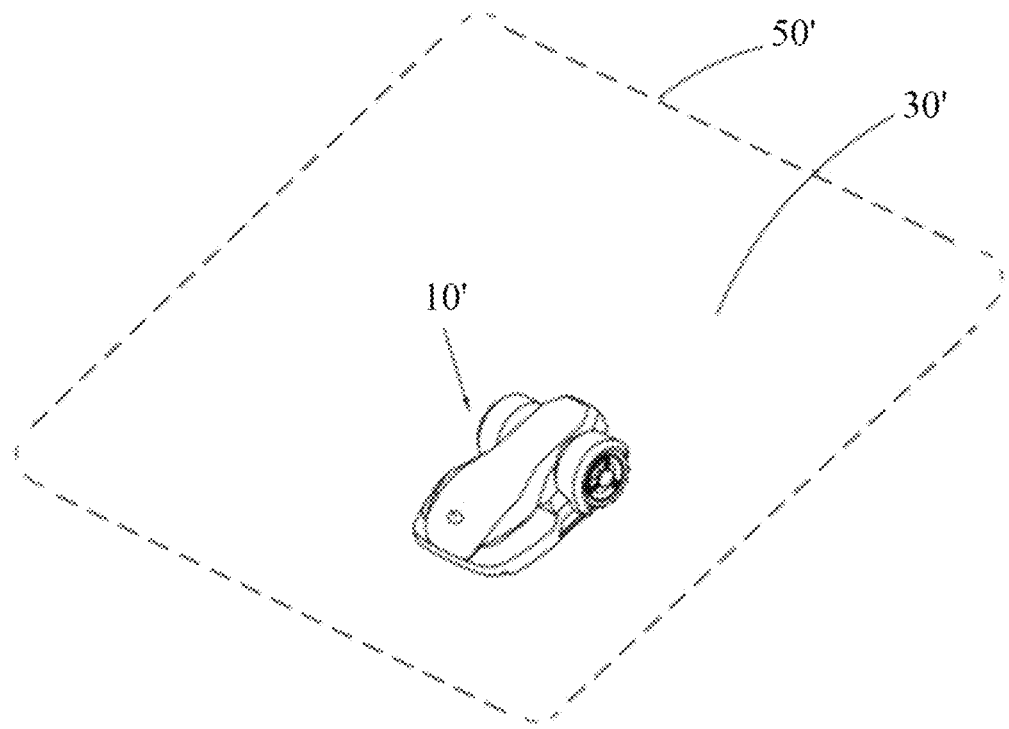
FIG. 17 is a schematic diagram of an exemplary application environment of a self-moving device according to an embodiment of the present disclosure.

FIG. 17 is a schematic diagram of an exemplary application environment of a self-moving device according to an embodiment of the present disclosure.

As shown in FIG. 17, in an exemplary application environment, the self-moving device 10' according to this embodiment of the present disclosure may be an automatic lawn mower. The self-moving device 10' may automatically walk in a working region 30' within a boundary 50' to cut vegetation on a working surface.

When walking automatically inside the working region 30', the self-moving device 10' may autonomously locate itself and compare a position of the self-moving device 10' with a position of the boundary 50' to determine whether the self-moving device 10' is located inside the working region 30' or determine a distance of the self-moving device 10' from the boundary and adjust a movement manner according to a determining result, so as to keep the self-moving device 10' inside the working region 30'.

Figure 18:
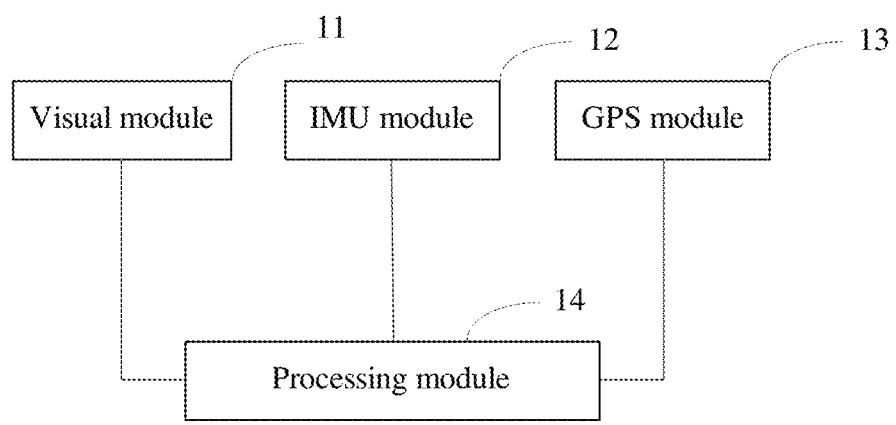
FIG. 18 is a block diagram of a self-moving device according to an embodiment of the present disclosure.

FIG. 18 is a block diagram of a self-moving device according to an embodiment of the present disclosure. As shown in FIG. 18, the self-moving device includes a visual module 11, an inertial navigation module, a satellite navigation module, and a processing module 14.

The visual module 11 is configured to acquire visual data of a surrounding environment of the self-moving device.

The inertial navigation module is specifically an IMU module 12 in this embodiment, and is configured to acquire inertial data of the self-moving device.

The satellite navigation module is specifically a GPS module 13, and is configured to acquire GPS positioning data of the self-moving device.

The processing module 14 is electrically connected to the visual module 11, the IMU module 12, and the GPS module 13, and the processing module 14 is configured to:

perform visual positioning according to the visual data to obtain a visual positioning result;

perform inertial positioning according to the inertial data to obtain an inertial positioning result;

integrate the visual positioning result and the inertial positioning result to obtain an integrated first integration result; and if the GPS positioning data satisfies the quality condition, integrate the first integration result and the GPS positioning data to obtain an integrated second integration result, and determine the second integration result as a position of the self-moving device.

For the self-moving device according to this embodiment of the present disclosure, the visual module 11, the IMU module 12, and the GPS module 13 can respectively acquire visual data, inertial data, and GPS positioning data, and positioning results are integrated to determine a position of the self-moving device, so that the self-moving device can implement precise autonomous positioning.

Figure 19:
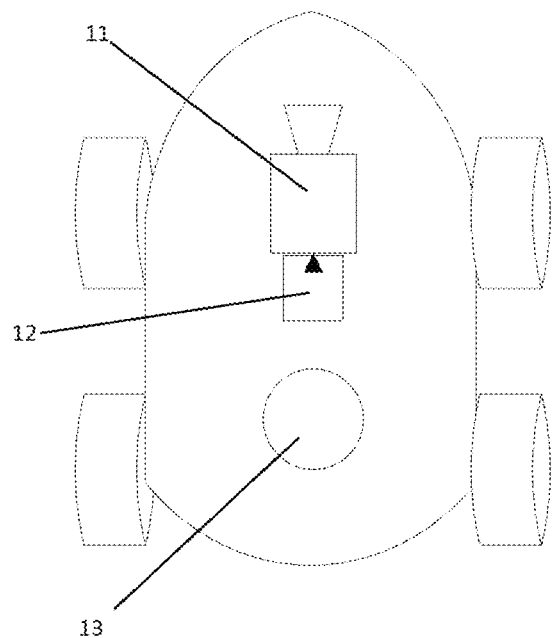
FIG. 19 is a schematic diagram of a self-moving device according to an embodiment of the present disclosure.

FIG. 19 is a schematic diagram of a self-moving device according to an embodiment of the present disclosure. In FIG. 19, for example, the self-moving device is a lawn mower. As shown in FIG. 19, in the application example, the self-moving device may include a visual module 11, an IMU module 12, and a GPS module 13.

In a possible implementation, the visual module 11 may include a visual sensor. For example, the visual sensor may be a global shutter monochrome CMOS visual sensor. When this type of visual sensor is used, visual interference can be avoided and precision can be improved. A lens of the visual sensor may be a fisheye lens, so as to increase an angle of view of the visual sensor to acquire more visual information. A specific type of the visual sensor of the visual module 11 is not limited in the present disclosure.

In a possible implementation, the IMU module 12 may include an inertial sensor. The inertial sensor may include a gyroscope, an accelerator, or, may further include either or both of a geomagnetic sensor and a speedometer in addition to a gyroscope and an accelerator. For example, the IMU module 12 may be a 6-axis inertial sensor that includes a gyroscope and an accelerator, or may be a 9-axis inertial sensor that includes a gyroscope, an accelerator, and a geomagnetic sensor. For example, the IMU module 12 may obtain angular velocity data of the self-moving device by using the gyroscope; may obtain acceleration data of the self-moving device by using the accelerator; may obtain latitude and longitude data of a position of the self-moving device by using the geomagnetic sensor; and may obtain speed data of the self-moving device by using the speedometer. Specific parts of the inertial sensor of the IMU module 12 are not limited in the present disclosure.

In a possible implementation, the inertial data acquired by the IMU module 12 may include one or more of speed, acceleration, angular velocity, and an orientation angle. The inertial data may be determined according to the condition of the inertial sensor that constitutes the IMU module 12. This is not limited in the present disclosure.

In a possible implementation, an optical axis of the visual module 11, an axis of the IMU module 12, and the center of the GPS module 13 are located on a central axis of the self-moving device. The optical axis of the visual module 11 and the axis of the IMU module 12 are collinear. For example, a CMOS chip of the visual sensor of the visual module 11 and the IMU module 12 may be installed back to back, and it is ensured that the optical axis of the CMOS chip and the axis of the IMU module 12 are collinear. Moreover, the optical axis of the CMOS chip, the axis of the IMU module 12, and the center of the GPS module 13 may be located on the central axis of the self-moving device. In this manner, the degree of freedom of obtaining data can be reduced, so that algorithms are simplified, and a processing procedure becomes faster.

In a possible implementation, the GPS module 13 may be any module that can implement GPS-based positioning, for example, a GPS receiver that can receive a GPS signal to perform positioning. The GPS module 13 may be implemented based on the prior art. A standard for determining whether GPS positioning data satisfies a quality condition may be set arbitrarily as required. For example, it may be determined, according to strength of a GPS signal, a quantity of satellites for reception, a positioning state, and the like, whether the GPS positioning data satisfies the quality condition. This is not limited in the present disclosure.

In a possible implementation, the center of the GPS module 13 may be located above a center point of two drive wheels of the self-moving device. In this manner, when the self-moving device rotates, a positioning position of the GPS module 13 may remain unchanged or only change slightly, thereby simplifying processing of data.

In a possible implementation, the processing module 14 may be any processing part such as a single-chip microcomputer, a CPU, an MPU or an FPGA that can perform data processing. The processing module 14 may be implemented by using a dedicated hardware circuit, or may be implemented by using a general-purpose processing part combining an executable logic instruction, to execute a processing process of the processing module 14.

In a possible implementation, the self-moving device may further include a storage module (not shown) to store the data such as the visual data, the inertial data, and the GPS positioning data generated by the processing module 14.

In a possible implementation, the processing module 14 may be configured to perform the following steps.

Step S501: Perform visual positioning according to visual data to obtain a visual positioning result.

Step S502: Perform inertial positioning according to inertial data to obtain an inertial positioning result.

Step S503: Integrate the visual positioning result and the inertial positioning result to obtain an integrated first integration result.

Step S504. If GPS positioning data satisfies a quality condition, integrate the first integration result and the GPS positioning data to obtain an integrated second integration result, and determine the second integration result as a position of the self-moving device.

For example, the visual module 11 may photograph one frame of visual image once every time interval T and use the frame of visual image as the visual data. The time interval T may be set by default in the system according to an attribute of the visual sensor. For example, the visual sensor may photograph 30 frames of visual image per minute. In this case, the time interval T may be 2 seconds. A specific value of the time interval T is not limited in the present disclosure.

In a possible implementation, based on the visual data (for example, one photographed frame of visual image), image feature information and corresponding description information may be extracted. The image feature information may be a plurality of feature points in a visual image that cover regions in the entire visual image as much as possible. The description information may be a descriptor corresponding to each feature point, and the feature point is described by using the descriptor. A person skilled in the art should understand that a feature extraction algorithm (for example, an ORB algorithm, a FAST algorithm, a SURF algorithm, and a SIFT algorithm) well known in the art may be used to extract image feature information and description information from the visual data. This is not limited in the present disclosure.

In a possible implementation, the visual module 11, the IMU module 12, and the GPS module 13 may be first initialized to set initial positioning positions of the visual module 11, the IMU module 12, and the GPS module 13 to zero.

In a possible implementation, the visual module 11 may be initialized according to the visual data and the inertial data. For example, based on the visual data (for example, one frame of visual image that is photographed at an initial moment T1) at the initial moment T1, image feature information and corresponding description information at the initial moment T1 may be extracted. By using the description information, the image feature information at the initial moment T1 may be matched with image feature information at a previous moment T0 to determine a correspondence between the image feature information at T1 and the image feature information at the previous moment T0. A basic matrix F between the visual data at the adjacent initial moment T1 and previous moment T0 may be determined based on the correspondence. The inertial data (for example, speed, acceleration, and angular velocity between the previous moment T0 and the initial moment T1) of the IMU module 12 is integrated, and a baseline distance B between the positions of the self-moving device at the previous moment T0 and the initial moment T1 may be obtained by combining an orientation angle (attitude of the self-moving device) at the initial moment T1 in the inertial data. A relative position between two frames of image at the adjacent initial moment T1 and previous moment T0 may be obtained according to the basic matrix F and the baseline distance B. Further, depth information of the image feature information (each feature point) at the initial moment T1 may be determined, so as to determine a three-dimensional initial position of each feature point relative to an initial positioning position (a position at the initial moment T1, that is, a coordinate origin) of the self-moving device. The three-dimensional initial position may include three-dimensional coordinates (for example, a position and a depth of the feature point) of the feature point.

The foregoing initialization process is only an example for description. A person skilled in the art should understand that an algorithm well known in the art may be used to acquire a three-dimensional initial position of image feature information. This is not limited in the present disclosure.

In this manner, visual positioning may be initialized, and the three-dimensional initial position of the image feature information at the initial moment T1 is determined.

Step S501: Perform visual positioning according to visual data to obtain a visual positioning result.

Visual positioning may be implemented in an appropriate manner in related technologies. The visual positioning result may be any appropriate result generated by using a visual positioning process. This is not limited in the present disclosure.

For example, based on the visual data (one frame of visual image that is photographed at a current moment Tn) at the current moment Tn, image feature information (a plurality of feature points and corresponding coordinates) at the current moment Tn and corresponding description information (a descriptor) may be extracted, where n represents a quantity of image frames photographed from the initial moment to the current moment, and n>1. By using the description information, the image feature information at the current moment Tn may be matched with image feature information at a previous moment Tn−1 to determine a correspondence between the image feature information at the current moment Tn and the image feature information at the previous moment Tn−1.

In a possible implementation, according to a three-dimensional (3D) position of the image feature information at the previous moment Tn−1, a coordinate position (2D position) of the image feature information at the current moment Tn, and the foregoing correspondence, calculation may be performed by using, for example, a PNP algorithm to obtain a 3D position of the image feature information at the current moment Tn relative to the image feature information at the previous moment Tn−1. Based on the 3D position, calculation may be performed by using, for example, a triangular positioning algorithm to determine a 3D position of a photographing position (a position of the self-moving device) at the current moment Tn. Another well known algorithm may be used to determine the 3D position of the image feature information at the current moment Tn and a 3D position of the self-moving device at the current moment Tn. This is not limited in the present disclosure.

In this manner, the 3D position of the self-moving device at the current moment Tn may be used as the visual positioning result, so that a process of visual positioning is implemented.

Step S502: Perform inertial positioning according to the inertial data to obtain an inertial positioning result.

The inertial positioning may be implemented in an appropriate manner in related technologies. The inertial positioning result may be any appropriate result generated in a used process of inertial positioning. This is not limited in the present disclosure.

For example, the IMU module 12 may determine the inertial data according to a sensor parameter and rated information. The inertial data may include, for example, speed, acceleration, and angular velocity from the previous moment Tn−1 to the current moment Tn and an orientation angle (attitude of the self-moving device) at the current moment Tn. Data such as the speed, the acceleration, and the angular velocity in the inertial data is integrated. A displacement and an attitude change amount of the self-moving device from the previous moment Tn−1 to the current moment Tn may be acquired. In this way, an inertial positioning position of the self-moving device at the current moment Tn relative to the previous moment Tn−1 may be predicted.

In this manner, the inertial positioning position of the self-moving device at the current moment Tn may be used as the inertial positioning result, so that a process of inertial positioning is implemented.

Step S503: Integrate the visual positioning result and the inertial positioning result to obtain an integrated first integration result.

In a possible implementation, step 503 includes:

if the visual positioning result is valid, integrating the visual positioning result and the inertial positioning result to obtain an integrated first integration result; or if the visual positioning result is invalid, determining the inertial positioning result as the first integration result.

For example, if visual positioning fails (a possible cause includes that, for example, the image feature information at the current moment Tn fails to be matched with the image feature information at the previous moment Tn−1; the PNP algorithm has no solution; and triangular positioning has no solution), the inertial positioning result may be directly determined as the first integration result.

In a possible implementation, if visual positioning succeeds, for example, a manner of extended Kalman filtering may be used to integrate the visual positioning result and the inertial positioning result. The extended Kalman filtering is a high efficiency recursive filter (autoregressive filter) and can implement recursive filtering in a nonlinear system. In the extended Kalman filtering, a current state may be determined by a previous state and a current control amount (for example, an input control amount, and an update control amount). An expression of the extended Kalman filtering may be schematically represented as Formula (1):

$$x_t = g(u_t, x_{t-1}, \varepsilon_t) \qquad (1)$$

In Formula (1), $x_t$ may represent a state at a current moment t; $x_{t-1}$ may represent a state at a previous moment t−1; $u_t$ may represent, for example, an input control amount of the current moment t; and $\varepsilon_t$ may represent, for example, an update control amount.

In a possible implementation, in a manner of extended Kalman filtering, the inertial positioning result (for example, an inertial positioning position of the self-moving device at the current moment Tn) may be used as an input control amount (for example, $u_t$ in Formula (1)). The visual positioning result (for example, a 3D position of the image feature information at the current moment Tn relative to the image feature information at the previous moment Tn−1) may be used as an update control amount (for example, $\varepsilon_t$ in Formula (1)). Therefore, a state (that is, a first integration result, for example, $x_t$ in Formula (1), at the current moment) at the current moment is calculated according to a state (that is, the first integration result, for example, $x_{t-1}$ in Formula (1) at the previous moment) at the previous moment. The "state" (the first integration result) may include any relevant state, for example, a 3D position of the self-moving device, a 3D position of the image feature information relative to the three-dimensional initial position, and a relative position between the IMU module 12 and the visual module 11, and the state at the current moment may be used as a first integration result that integrates visual positioning and inertial positioning.

In a possible implementation, the initial position obtained by using the foregoing initialization process may be used as an initial state, that is, initial $x_{t-1}$, of extended Kalman filtering.

In a possible implementation, the first integration result may include information such as an integrated 3D position of the self-moving device at the current moment Tn, an error of the IMU module 12, and a relative position between the IMU module 12 and the visual module 11.

In this manner, visual positioning and inertial positioning may be integrated to determine an integrated 3D position of the self-moving device at the current moment Tn, thereby improving positioning precision.

Step S504: If GPS positioning data satisfies a quality condition, integrate the first integration result and the GPS positioning data to obtain an integrated second integration result, and determine the second integration result as a position of the self-moving device.

In a possible implementation, the processing module is further configured to perform the following step:

if the GPS positioning data does not satisfy the quality condition, determining the first integration result as the position of the self-moving device.

For example, if the GPS module 13 does not receive a GPS signal or receives a relatively weak GPS signal, it may be considered that the GPS positioning data does not satisfy the quality condition. In this case, the first integration result that integrates visual positioning and inertial positioning may be used as an output result to determine the position of the self-moving device at the current moment Tn.

In a possible implementation, if visual positioning fails, visual positioning of the visual module 11 may be initialized again by using the GPS positioning data.

In a possible implementation, step 504 includes:

if the GPS positioning data satisfies the quality condition, acquiring a second integration result of the self-moving device at a current moment according to a first integration result at the current moment, GPS positioning data at the current moment, and a second integration result at a previous moment.

For example, if the GPS module 13 normally receives a GPS signal, it may be considered that the GPS positioning data satisfies the quality condition, the first integration result and the GPS positioning data may be integrated to obtain an integrated second integration result, and the second integration result is determined as the position of the self-moving device at the current moment Tn.

In a possible implementation, the first integration result and the GPS positioning data may be integrated in a manner of extended Kalman filtering. The first integration result (for example, a first integrated 3D position of the self-moving device at the current moment Tn) may be used as an input control amount (for example, $u_t$ in Formula (1)). The GPS positioning data (for example, a 2D position of GPS positioning at the current moment Tn) may be used as an update control amount (for example, $\varepsilon_t$ in Formula (1)). A state (that is, the second integration result at the current moment) at the current moment $x_t$ is obtained by using Formula (1) and according to a state $x_{t-1}$ (that is, the second integration result at the previous moment) at the previous moment. The "state" (the second integration result) may include any relevant state. For example, a GPS positioning position (3D position) of the self-moving device at the previous moment Tn−1 may be used as a state variable (for example, $x_{t-1}$ in Formula (1)) at the previous moment Tn−1, so as to obtain a state variable (for example, $x_t$ in Formula (1)) at the current moment Tn. The state variable at the current moment may be used as the second integration result (for example, a GPS positioning position at the current moment Tn) that integrates visual positioning, inertial positioning, and GPS positioning. In this way, the second integration result may be determined as the position of the self-moving device at the current moment Tn.

In a possible implementation, when the GPS positioning data changes from not satisfying the quality condition to satisfying the quality condition, a latest obtained first integration result may be used as an initial state, that is, initial $x_{t-1}$, of extended Kalman filtering.

An accumulated error may exist in inertial positioning. Therefore, if the GPS positioning data does not satisfy the quality condition, precision of the position of the self-moving device determined by using the first integration result is susceptible to an accumulated error. In a possible implementation, for example, a least square manner may be used to correct the accumulated error of the first integration result when the GPS positioning data does not satisfy the quality condition, thereby further improving positioning precision.

In this manner, visual positioning, inertial positioning, and GPS positioning may be integrated to determine the position of the self-moving device at the current moment Tn, thereby further improving positioning precision.

Application Example

Figure 20:
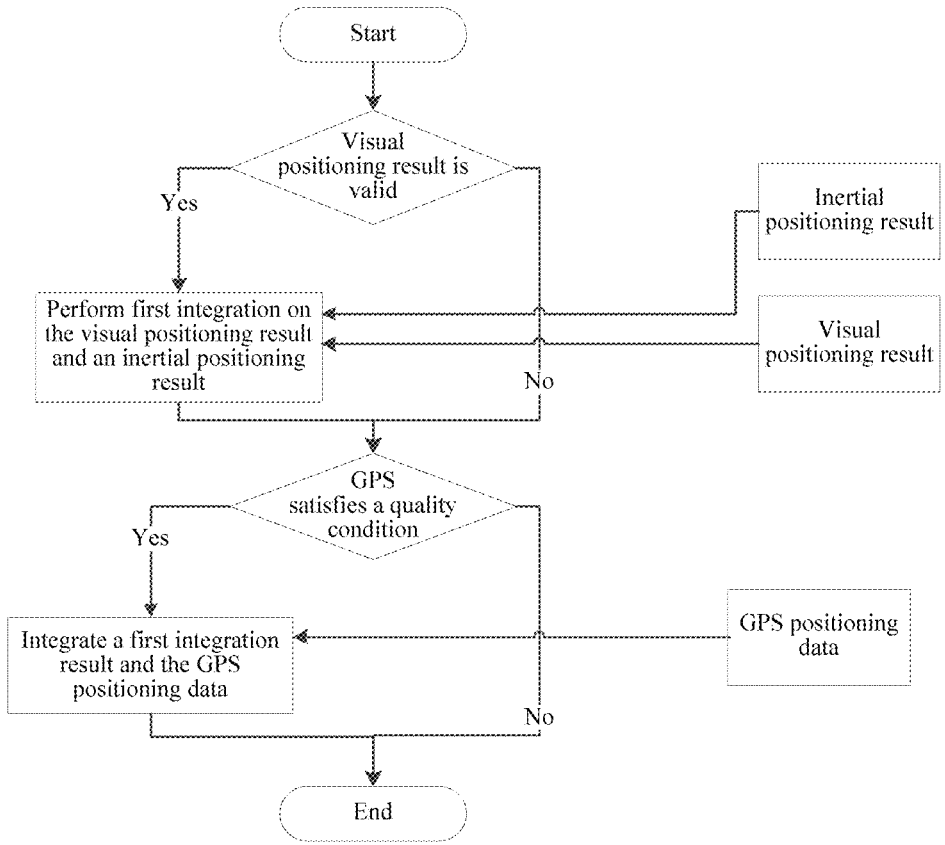
FIG. 20 is a flowchart of an application example of a processing process of a processing module according to an embodiment of the present disclosure.

FIG. 20 is a flowchart of an application example of a processing process of the processing module 14 according to an embodiment of the present disclosure. A person skilled in the art should understand that the application example is only used to facilitate understanding but not intended to limit the present disclosure in any way.

As shown in FIG. 20, as can be seen from the application example: if the visual positioning result is valid (a determining result is yes), a manner of extended Kalman filtering may be used to perform integration on the visual positioning result and an inertial positioning result to obtain an integrated first integration result; or if the visual positioning result is invalid (a determining result is no), the inertial positioning result may be directly determined as the first integration result.

If the GPS positioning data satisfies the quality condition (a determining result is yes), the first integration result and the GPS positioning data may be integrated in a manner of extended Kalman filtering to obtain an integrated second integration result, and the second integration result is determined as the position of the self-moving device. If the GPS positioning data does not satisfy the quality condition (a determining result is no), the first integration result may be determined as the position of the self-moving device.

In conclusion, for the self-moving device according to the present disclosure, the visual module 11, the IMU module 12, and the GPS module 13 can respectively acquire visual data, inertial data, and GPS positioning data, and positioning results are integrated twice to determine a position of the self-moving device, so that the self-moving device can implement precise autonomous positioning.

Figure 21:
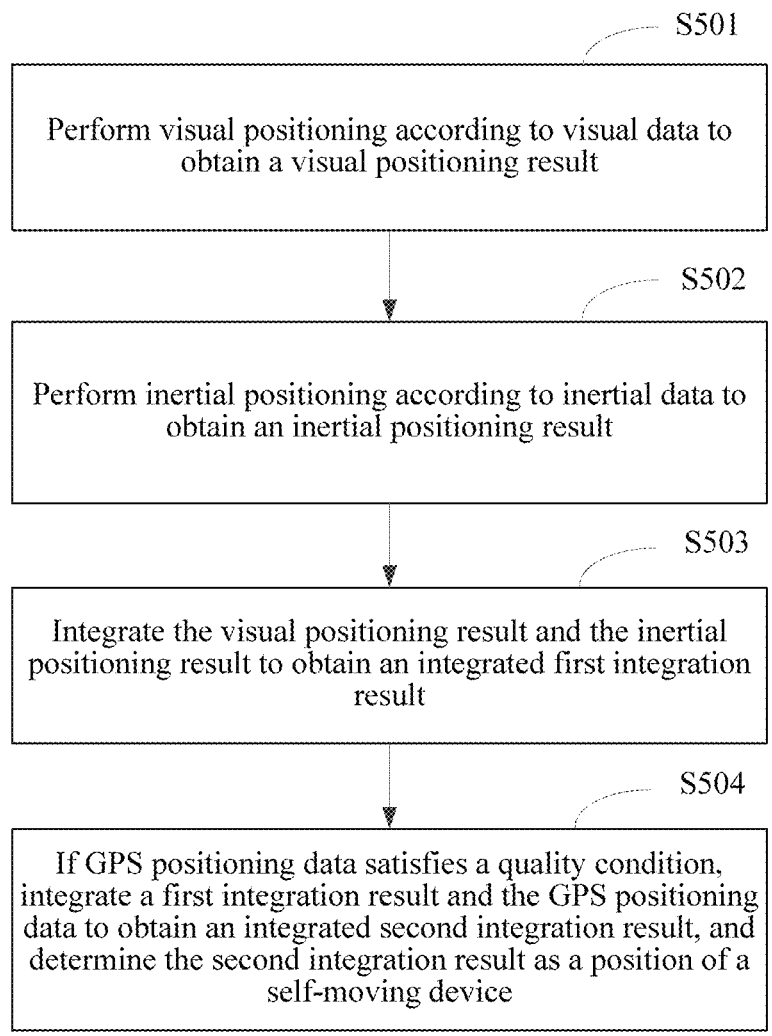
FIG. 21 is a flowchart of a positioning method according to an embodiment of the present disclosure.

FIG. 21 is a flowchart of a positioning method according to an embodiment of the present disclosure. The method may be implemented by using a processor, for example, by using the foregoing processing module 14. As shown in FIG. 21, the positioning method according to another embodiment of the present disclosure includes the following steps:

Step S501: Perform visual positioning according to visual data to obtain a visual positioning result.

Step S502: Perform inertial positioning according to inertial data to obtain an inertial positioning result.

Step S503: Integrate the visual positioning result and the inertial positioning result to obtain an integrated first integration result.

Step S504: If GPS positioning data satisfies a quality condition, integrate the first integration result and the GPS positioning data to obtain an integrated second integration result, and determine the second integration result as a position of a self-moving device.

In a possible implementation, the method further includes:

if the GPS positioning data does not satisfy the quality condition, determining the first integration result as the position of the self-moving device.

In a possible implementation, step 503 includes:

if the visual positioning result is valid, integrating the visual positioning result and the inertial positioning result to obtain the integrated first integration result; or if the visual positioning result is invalid, determining the inertial positioning result as the first integration result.

In a possible implementation, step S504 includes:

if the GPS positioning data satisfies the quality condition, acquiring a second integration result of the self-moving device at a current moment according to a first integration result at the current moment, GPS positioning data at the current moment, and a second integration result at a previous moment.

In a possible implementation, the inertial data includes one or more of speed, acceleration, angular velocity, and an orientation angle.

In a possible implementation, step S503 includes:

integrating the visual positioning result and the inertial positioning result in a manner of extended Kalman filtering.

In a possible implementation, step S504 includes:

integrating the first integration result and the GPS positioning data in a manner of extended Kalman filtering.

Figure 22:
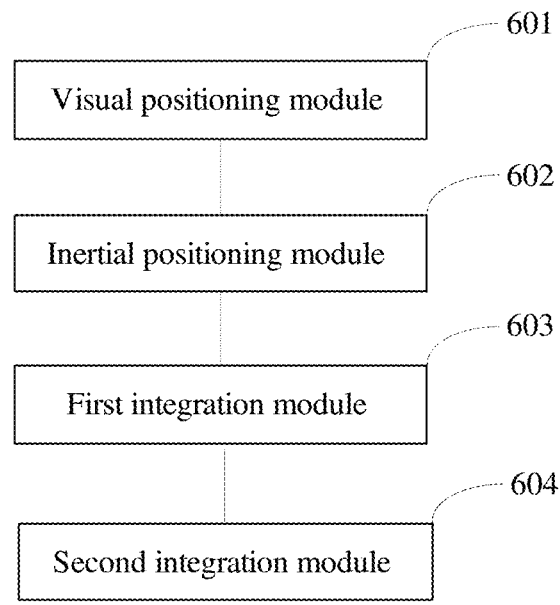
FIG. 22 is a block diagram of a positioning apparatus according to an embodiment of the present disclosure.

FIG. 22 is a block diagram of a positioning apparatus according to an embodiment of the present disclosure. The apparatus may be implemented by using the foregoing processing module 14. As shown in FIG. 22, the positioning apparatus according to another embodiment of the present disclosure includes a visual positioning module 601, an inertial positioning module 602, a first integration module 603, and a second integration module 604.

The visual positioning module 601 is configured to perform visual positioning according to visual data to obtain a visual positioning result.

The inertial positioning module 602 is configured to perform inertial positioning according to inertial data to obtain an inertial positioning result.

The first integration module 603 is configured to integrate the visual positioning result and the inertial positioning result to obtain an integrated first integration result.

The second integration module 604 is configured to: if GPS positioning data satisfies a quality condition, integrate the first integration result and the GPS positioning data to obtain an integrated second integration result, and determine the second integration result as a position of a self-moving device.

According to the embodiment of the present disclosure, the visual module 11, the IMU module 12, and the GPS module 13 can respectively acquire visual data, inertial data, and GPS positioning data, and positioning results are integrated twice to determine a position of the self-moving device, so that the self-moving device can implement precise autonomous positioning.

In a possible implementation, the apparatus may be further configured to:

if the GPS positioning data does not satisfy the quality condition, determine the first integration result as the position of the self-moving device.

In a possible implementation, the first integration module 603 may be specifically configured to:

if the visual positioning result is valid, integrate the visual positioning result and the inertial positioning result to obtain the integrated first integration result; or if the visual positioning result is invalid, determine the inertial positioning result as the first integration result.

In a possible implementation, the second integration module 604 may be specifically configured to:

if the GPS positioning data satisfies the quality condition, acquire a second integration result of the self-moving device at a current moment according to a first integration result at the current moment, GPS positioning data at the current moment, and a second integration result at a previous moment.

In a possible implementation, the inertial data includes one or more of speed, acceleration, angular velocity, and an orientation angle.

In a possible implementation, the first integration module 603 may be specifically configured to:

integrate the visual positioning result and the inertial positioning result in a manner of extended Kalman filtering.

In a possible implementation, the second integration module 604 may be specifically configured to:

integrate the first integration result and the GPS positioning data in a manner of extended Kalman filtering.

Figure 23:
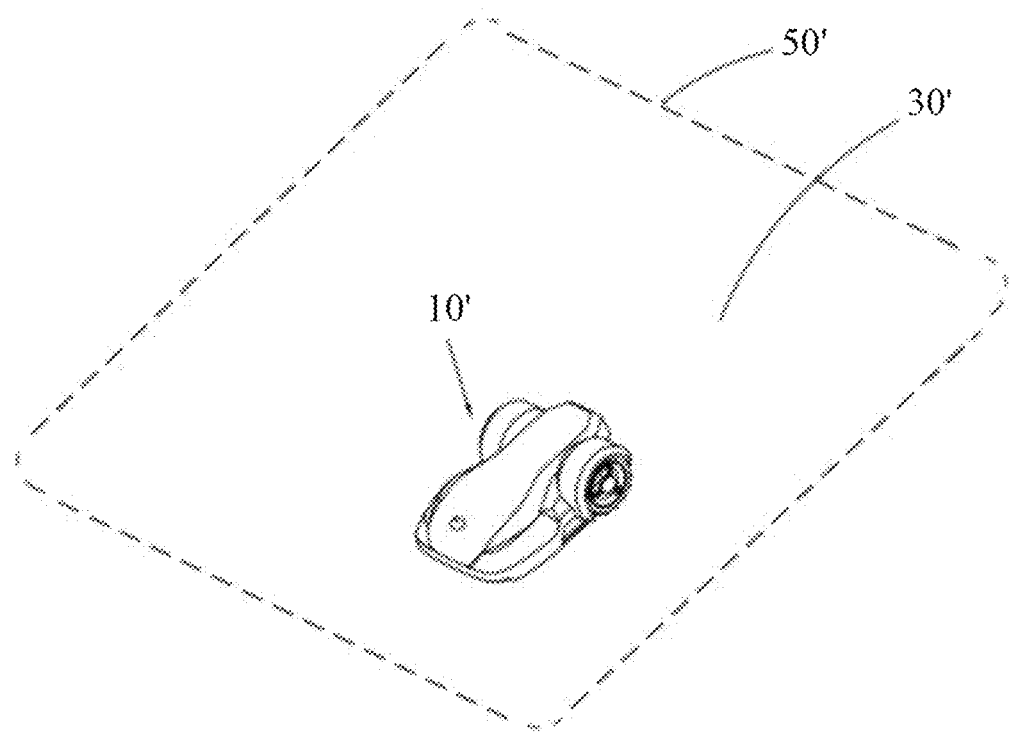
FIG. 23 is a schematic diagram of an exemplary application environment of a self-moving device according to an embodiment of the present disclosure.

FIG. 23 is a schematic diagram of an exemplary application environment of a self-moving device according to an embodiment of the present disclosure.

As shown in FIG. 23, in an exemplary application environment, the self-moving device 10' according to this embodiment of the present disclosure may be, for example, an automatic lawn mower. The self-moving device 10' may automatically walk in a working region 30' within a boundary 50' to cut vegetation on a working surface.

When automatically walking inside the working region 30', the self-moving device 10' may autonomously determine its own position and compare the position with a position of the boundary 50' to determine whether the self-moving device 10' is located inside the working region 30' or determine a distance of the self-moving device 10' from the boundary and adjust a movement manner according to a determining result to stay inside the working region 30'.

Figure 24:
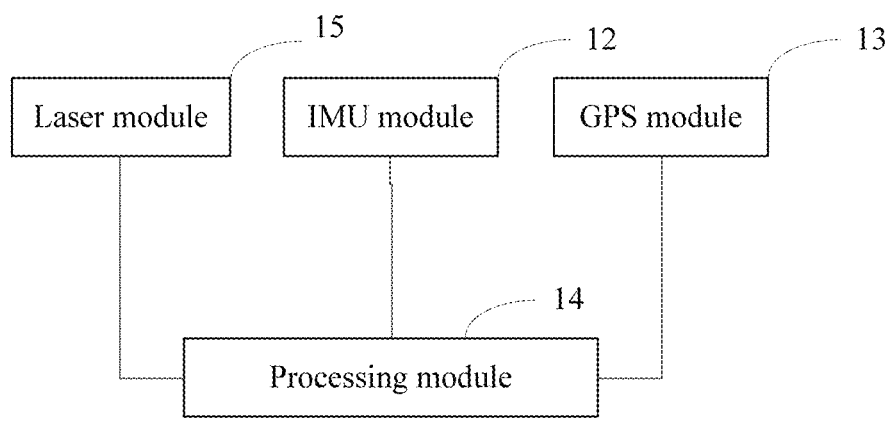
FIG. 24 is a block diagram of a self-moving device according to an embodiment of the present disclosure.

FIG. 24 is a block diagram of a self-moving device according to an embodiment of the present disclosure. As shown in FIG. 24, the self-moving device includes a laser module 15, an inertial navigation module, a satellite navigation module, and a processing module 14.

The laser module 15 is configured to acquire laser data of a surrounding environment of the self-moving device.

The inertial navigation module is specifically an IMU module 12 in this embodiment, and is configured to acquire inertial data of the self-moving device.

The satellite navigation module is specifically a GPS module 13 in this embodiment, and is configured to acquire GPS positioning data of the self-moving device.

The processing module 14 is electrically connected to the laser module 15, the IMU module 12, and the GPS module 13, and is configured to:

perform laser positioning according to the laser data to obtain a laser positioning result;

perform inertial positioning according to the inertial data to obtain an inertial positioning result;

integrate the laser positioning result and the inertial positioning result to obtain an integrated first integration result; and if the GPS positioning data satisfies a quality condition, integrate the first integration result and the GPS positioning data to obtain an integrated second integration result, and determine the second integration result as a position of the self-moving device.

For the self-moving device according to this embodiment of the present disclosure, the laser module 15, the IMU module 12, and the GPS module 13 can respectively acquire laser data, inertial data, and GPS positioning data, and positioning results are integrated to determine a position of the self-moving device, so that the self-moving device can implement precise autonomous positioning.

Figure 25:
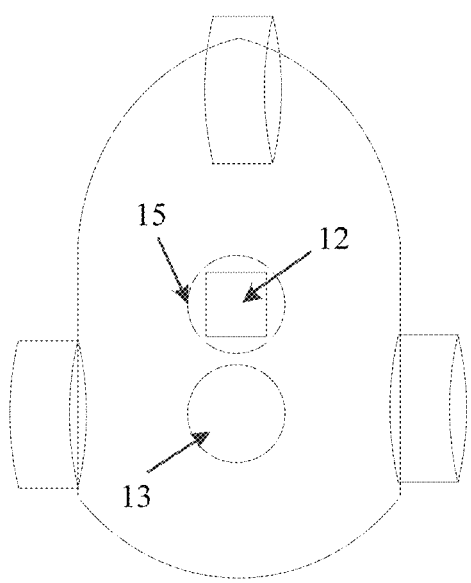
FIG. 25 is a schematic diagram of a self-moving device according to an embodiment of the present disclosure.

FIG. 25 is a schematic diagram of a self-moving device according to an embodiment of the present disclosure. In FIG. 25, for example, the self-moving device is a lawn mower. As shown in FIG. 25, in the application example, the self-moving device may include a laser module 15, an IMU module 12, and a GPS module 13.

In a possible implementation, the laser module 15 may include a laser radar. For example, the laser radar may be a circular scan laser radar. The laser radar can acquire laser data of objects within a 360-degree range in the surrounding environment, thereby improving precision of laser positioning. A specific type of the laser radar of the laser module 15 is not limited in the present disclosure.

In a possible implementation, the IMU module 12 may include an inertial sensor. The inertial sensor may include a gyroscope, an accelerator, or may further include either or both of a geomagnetic sensor and a speedometer in addition to a gyroscope and an accelerator. For example, the IMU module 12 may be a 6-axis inertial sensor that includes a gyroscope and an accelerator, or may be a 9-axis inertial sensor that includes a gyroscope, an accelerator, and a geomagnetic sensor. For example, the IMU module 12 may obtain angular velocity data of the self-moving device by using the gyroscope; may obtain acceleration data of the self-moving device by using the accelerator; may obtain latitude and longitude data of a position of the self-moving device by using the geomagnetic sensor; and may obtain speed data of the self-moving device by using the speedometer. Specific parts of the inertial sensor of the IMU module 12 are not limited in the present disclosure.

In a possible implementation, the inertial data acquired by the IMU module 12 may include one or more of speed, acceleration, angular velocity, and an orientation angle. The inertial data may be determined according to the condition of the inertial sensor that constitutes the IMU module 12. This is not limited in the present disclosure.

In a possible implementation, an axial center of the laser module 15, an axis of the IMU module 12, and the center of the GPS module 13 are located on a central axis of the self-moving device. The axial center of the laser module 15 and the axis of the IMU module 12 are collinear. For example, the laser radar of the laser module 15 and the IMU module 12 may be installed back to back, and it is ensured that an axial center of the laser radar and the axis of the IMU module 12 are collinear. Moreover, the axial center of the laser radar, the axis of the IMU module 12, and the center of the GPS module 13 may be located on the central axis of the self-moving device. In this manner, the degree of freedom of obtaining data can be reduced, so that algorithms are simplified, and a processing procedure becomes faster.

In a possible implementation, the GPS module 13 may be any module that can implement GPS-based positioning, for example, a GPS receiver that can receive a GPS signal to perform positioning. The GPS module 13 may be implemented based on the prior art. A standard for determining whether the GPS positioning data satisfies a quality condition may be set arbitrarily as required. For example, it may be determined, according to strength of a GPS signal, a quantity of satellites for reception, a positioning state, and the like, whether the GPS positioning data satisfies the quality condition. This is not limited in the present disclosure.

In a possible implementation, the center of the GPS module 13 may be located above a center point of two drive wheels of the self-moving device. In this manner, when the self-moving device rotates, a positioning position of the GPS module 13 may remain unchanged or only change slightly, thereby simplifying processing of data.

In a possible implementation, the processing module 14 may be any processing part such as a single-chip microcomputer, a CPU, an MPU or an FPGA that can perform data processing. The processing module 14 may be implemented by using a dedicated hardware circuit, or may be implemented by using a general-purpose processing part combining an executable logic instruction, to execute a processing process of the processing module 14.

In a possible implementation, the self-moving device may further include a storage module (not shown) to store the data such as the laser data, the inertial data, and the GPS positioning data generated by the processing module 14.

In a possible implementation, the processing module 14 may be configured to perform the following steps:

Step S501: Perform laser positioning according to laser data to obtain a laser positioning result.

Step S502: Perform inertial positioning according to inertial data to obtain an inertial positioning result.

Step S503: Integrate the laser positioning result and the inertial positioning result to obtain an integrated first integration result.

Step S504: If the GPS positioning data satisfies the quality condition, integrate the first integration result and the GPS positioning data to obtain an integrated second integration result, and determine the second integration result as a position of the self-moving device.

For example, the laser module 15 may measure distance data between the self-moving device and an object in a surrounding environment once every time interval T and use the distance data as the laser data. The time interval T may be set by default in the system according to an attribute of the laser radar. For example, the laser radar may measure distance data between the self-moving device and an object within a 360-degree range in the surrounding environment 30 times per minute. In this case, the time interval T may be 2 seconds. A specific value of the time interval T is not limited in the present disclosure.

In a possible implementation, based on the laser data (for example, the measured distance data between the self-moving device and an object within a 360-degree range in the surrounding environment), point cloud data (a plurality of distance points/feature points) in the laser data may be extracted, and covers regions in the surrounding environment of the self-moving device as much as possible. A person skilled in the art should understand that a point cloud data extraction algorithm well known in the art may be used to extract point cloud data from the laser data. This is not limited in the present disclosure.

In a possible implementation, the laser module 15, the IMU module 12, and the GPS module 13 may be first initialized, and initial positioning positions of the laser module 15, the IMU module 12, and the GPS module 13 are set to zero.

In a possible implementation, according to the laser data and the inertial data, the laser module 15 may be initialized. For example, based on the laser data (for example, a group of distance data measured at an initial moment T1) at the initial moment T1, point cloud data at the initial moment T1 may be extracted. By using the point cloud data, the point cloud data at the initial moment T1 may be matched with the point cloud data at a previous moment T0 to determine a correspondence between the point cloud data at T1 and the point cloud data at the previous moment T0. Based on the correspondence, a basic matrix F between the point cloud data at the adjacent initial moment T1 and previous moment T0 may be determined. The inertial data (for example, speed, acceleration, and angular velocity between the previous moment T0 and the initial moment T1) of the IMU module 12 is integrated, and a baseline distance B between the positions of the self-moving device at the previous moment T0 and the initial moment T1 may be obtained by combining an orientation angle (attitude of the self-moving device) at the initial moment T1 in the inertial data. According to the basic matrix F and the baseline distance B, a relative position between the two groups of point cloud data at the adjacent initial moment T1 and previous moment T0 may be obtained. Further, depth information of the point cloud data at the initial moment T1 (each distance point/feature point) may be determined, so as to determine a three-dimensional initial position of each distance point relative to an initial positioning position (a position at the initial moment T1, that is, a coordinate origin) of the self-moving device. The three-dimensional initial position may include three-dimensional coordinates (for example, a position and a depth of the distance point) of the feature point.

The foregoing initialization process is only an example for description. A person skilled in the art should understand that an algorithm well known in the art may be used to acquire a three-dimensional initial position of point cloud data. This is not limited in the present disclosure.

In this manner, laser positioning may be initialized to determine the three-dimensional initial position of the image feature information at the initial moment T1.

Step S501: Perform laser positioning according to laser data to obtain a laser positioning result.

The laser positioning may be implemented in an appropriate manner in related technologies. The laser positioning result may be any appropriate result generated in a used process of laser positioning. This is not limited in the present disclosure.

For example, based on the laser data (a group of laser data measured at a current moment Tn) at the current moment Tn, point cloud data (a plurality of distance points/feature points and corresponding coordinates) at the current moment Tn may be extracted, where n represents a quantity of measured laser data from the initial moment to the current moment, and n>1. The point cloud data at the current moment Tn may be matched with the point cloud data at a previous moment Tn−1 to determine a correspondence between the point cloud data at the current moment Tn and the point cloud data at the previous moment Tn−1.

In a possible implementation, according to a three-dimensional (3D) position of the point cloud data (a plurality of distance points/feature points) at the previous moment Tn−1, a coordinate position (2D position) of the point cloud data at the current moment Tn, and the foregoing correspondence, calculation may be performed by using, for example, a PNP algorithm to obtain a 3D position of the point cloud data at the current moment Tn relative to the point cloud data at the previous moment Tn−1. Based on the 3D position, calculation may be performed by using, for example, a triangular positioning algorithm to determine a 3D position of the measured position (a position of the self-moving device) at the current moment Tn. Another well known algorithm may be used to determine a 3D position of the point cloud data at the current moment Tn, and a 3D position of the self-moving device at the current moment Tn. This is not limited in the present disclosure.

In this manner, the 3D position of the self-moving device at the current moment Tn may be used as the laser positioning result, so that a process of laser positioning is implemented.

Step S502: Perform inertial positioning according to inertial data to obtain an inertial positioning result.

The inertial positioning may be implemented in an appropriate manner in related technologies. The inertial positioning result may be any appropriate result generated in a used process of inertial positioning. This is not limited in the present disclosure.

For example, the IMU module 12 may determine the inertial data according to a sensor parameter and rated information. The inertial data may include, for example, speed, acceleration, and angular velocity from the previous moment Tn−1 to the current moment Tn and an orientation angle (attitude of the self-moving device) at the current moment Tn. Data such as the speed, the acceleration, and the angular velocity in the inertial data is integrated. A displacement and an attitude change amount of the self-moving device from the previous moment Tn−1 to the current moment Tn may be acquired. In this way, an inertial positioning position of the self-moving device at the current moment Tn relative to the previous moment Tn−1 may be predicted.

In this manner, the inertial positioning position of the self-moving device at the current moment Tn may be used as the inertial positioning result, so that a process of inertial positioning is implemented.

Step S503: Integrate the laser positioning result and the inertial positioning result to obtain an integrated first integration result.

In a possible implementation, step 503 includes:

if the laser positioning result is valid, integrating the laser positioning result and the inertial positioning result to obtain the integrated first integration result; or if the laser positioning result is invalid, determining the inertial positioning result as the first integration result.

For example, if laser positioning fails (a possible cause includes that, for example, the point cloud data at the current moment Tn fails to be matched with the point cloud data at the previous moment Tn−1; the PNP algorithm has no solution; and triangular positioning has no solution), the inertial positioning result may be directly determined as the first integration result.

In a possible implementation, if laser positioning succeeds, for example, a manner of extended Kalman filtering may be used to integrate the laser positioning result and the inertial positioning result. The extended Kalman filtering is a high efficiency recursive filter (autoregressive filter) and can implement recursive filtering in a nonlinear system. In the extended Kalman filtering, a current state may be determined by a previous state and a current control amount (for example, an input control amount, and an update control amount). An expression of the extended Kalman filtering may be schematically represented as Formula (1):

$$x_t = g(u_t, x_{t-1}, \varepsilon_t) \quad (1)$$

In Formula (1), $x_t$ may represent a state at a current moment t; $x_{t-1}$ may represent a state at a previous moment t−1; $u_t$ may represent, for example, an input control amount of the current moment t; and $\varepsilon_t$ may represent, for example, an update control amount.

In a possible implementation, in a manner of extended Kalman filtering, the inertial positioning result (for example, an inertial positioning position of the self-moving device at the current moment Tn) may be used as an input control amount (for example, $u_t$ in Formula (1)). The laser positioning result (for example, a 3D position of the point cloud data at the current moment Tn relative to the point cloud data at the previous moment Tn−1) is used as an update control amount (for example, $\varepsilon_t$ in Formula (1)). Therefore, a state (that is, a first integration result, for example, $x_t$ in Formula (1), at the current moment) at the current moment is calculated according to a state (that is, the first integration result, for example, $x_{t-1}$ in Formula (1) at the previous moment) at the previous moment. The "state" (the first integration result) may include any relevant state, for example, a 3D position of the self-moving device, a 3D position of the point cloud data relative to the three-dimensional initial position, and a relative position between the IMU module 12 and the laser module 15, and the state at the current moment may be used as an integrated first integration result of laser positioning and inertial positioning.

In a possible implementation, the initial position obtained by using the foregoing initialization process may be used as an initial state, that is, initial $x_{t-1}$, of extended Kalman filtering.

In a possible implementation, the first integration result may include information such as an integrated 3D position of the self-moving device at the current moment Tn; an error of the IMU module 12; and the relative position between the IMU module 12 and the laser module 15.

In this manner, laser positioning and inertial positioning may be integrated to determine an integrated 3D position of the self-moving device at the current moment Tn, thereby improving positioning precision.

Step S504: If GPS positioning data satisfies a quality condition, integrate the first integration result and the GPS positioning data to obtain an integrated second integration result, and determine the second integration result as a position of the self-moving device.

In a possible implementation, the processing module is further configured to perform the following step:

if the GPS positioning data does not satisfy the quality condition, determining the first integration result as the position of the self-moving device.

For example, if the GPS module 13 does not receive a GPS signal or receives a relatively weak GPS signal, it may be considered that the GPS positioning data does not satisfy the quality condition. In this case, the first integration result that integrates laser positioning and inertial positioning may be used as an output result and determined as the position of the self-moving device at the current moment Tn.

In a possible implementation, if laser positioning fails, laser positioning of the laser module 15 may be initialized again by using the GPS positioning data.

In a possible implementation, step 504 includes:

if the GPS positioning data satisfies the quality condition, acquiring a second integration result of the self-moving device at a current moment according to a first integration result at the current moment, GPS positioning data at the current moment, and a second integration result at a previous moment.

For example, if the GPS module 13 normally receives a GPS signal, it may be considered that the GPS positioning data satisfies the quality condition, the first integration result and the GPS positioning data may be integrated to obtain an integrated second integration result, and the second integration result is determined as the position of the self-moving device at the current moment Tn.

In a possible implementation, the first integration result and the GPS positioning data may be integrated in a manner of extended Kalman filtering. The first integration result (for example, a first integrated 3D position of the self-moving device at the current moment Tn) may be used as an input control amount (for example, $u_t$ in Formula (1)). The GPS positioning data (for example, a 2D position of GPS positioning at the current moment Tn) may be used as an update control amount (for example, $\varepsilon_t$ in Formula (1)). A state (that is, the second integration result at the current moment) at the current moment $x_t$ is obtained by using Formula (1) and according to a state $x_{t-1}$ (that is, the second integration result at the previous moment) at the previous moment. The "state" (the second integration result) may include any relevant state. For example, a GPS positioning position (3D position) of the self-moving device at the previous moment Tn−1 may be used as a state variable (for example, $x_{t-1}$ in Formula (1)) at the previous moment Tn−1, so as to obtain a state variable (for example, $x_t$ in Formula (1)) at the current moment Tn. The state variable at the current moment may be used as the second integration result (for example, the GPS positioning position at the current moment Tn) that integrates laser positioning, inertial positioning, and GPS positioning. In this way, the second integration result may be determined as the position of the self-moving device at the current moment Tn.

In a possible implementation, when the GPS positioning data changes from not satisfying the quality condition to satisfying the quality condition, a latest obtained first integration result may be used as an initial state, that is, initial $x_{t-1}$, of extended Kalman filtering.

An accumulated error may exist in inertial positioning. Therefore, if the GPS positioning data does not satisfy the quality condition, precision of the position of the self-moving device determined by using the first integration result is susceptible to an accumulated error. In a possible implementation, for example, a least square manner may be used to correct the accumulated error of the first integration result when the GPS positioning data does not satisfy the quality condition, thereby further improving positioning precision.

In this manner, laser positioning, inertial positioning, and GPS positioning may be integrated to determine the position of the self-moving device at the current moment Tn, thereby further improving positioning precision.

Application Example

Figure 26:
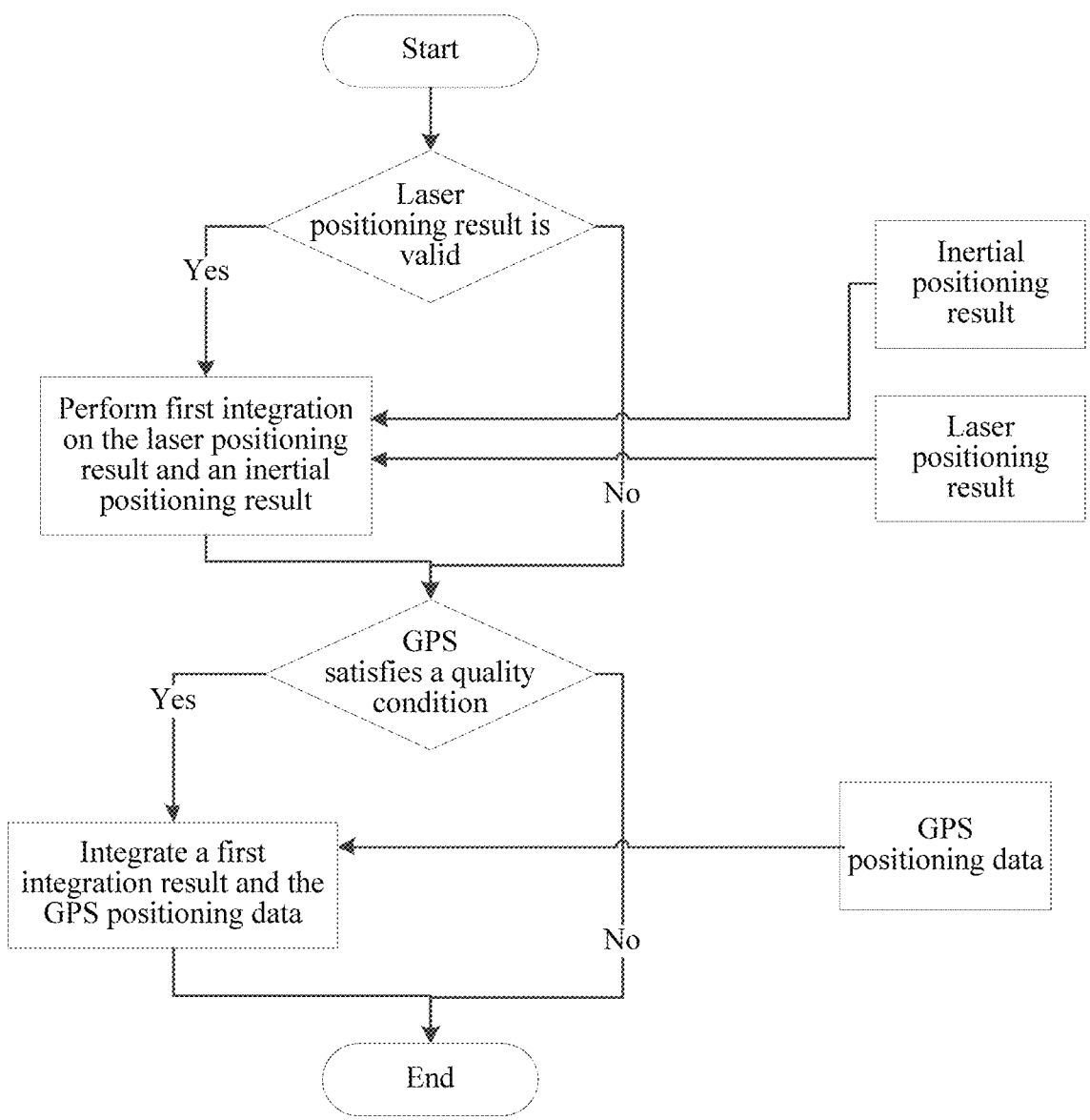
FIG. 26 is a flowchart of an application example of a processing process of a processing module according to an embodiment of the present disclosure.

FIG. 26 is a flowchart of an application example of a processing process of the processing module 14 according to an embodiment of the present disclosure. A person skilled in the art should understand that the application example is only used to facilitate understanding but not intended to limit the present disclosure in any way.

As shown in FIG. 26, as can be seen from the application example: if the laser positioning result is valid (a determining result is yes), a manner of extended Kalman filtering may be used to perform first integration on a laser positioning result and an inertial positioning result to obtain an integrated first integration result; or if the laser positioning result is invalid (a determining result is no), the inertial positioning result may be directly determined as the first integration result.

If the GPS positioning data satisfies the quality condition (a determining result is yes), the first integration result and the GPS positioning data may be integrated in a manner of extended Kalman filtering to obtain an integrated second integration result, and the second integration result is determined as the position of the self-moving device. If the GPS positioning data does not satisfy the quality condition (a determining result is no), the first integration result may be determined as the position of the self-moving device.

In conclusion, for the self-moving device according to the present disclosure, the laser module 15, the IMU module 12, and the GPS module 13 can respectively acquire laser data, inertial data, and GPS positioning data, and positioning results are integrated twice to determine a position of the self-moving device, so that the self-moving device can implement precise autonomous positioning.

Figure 27:
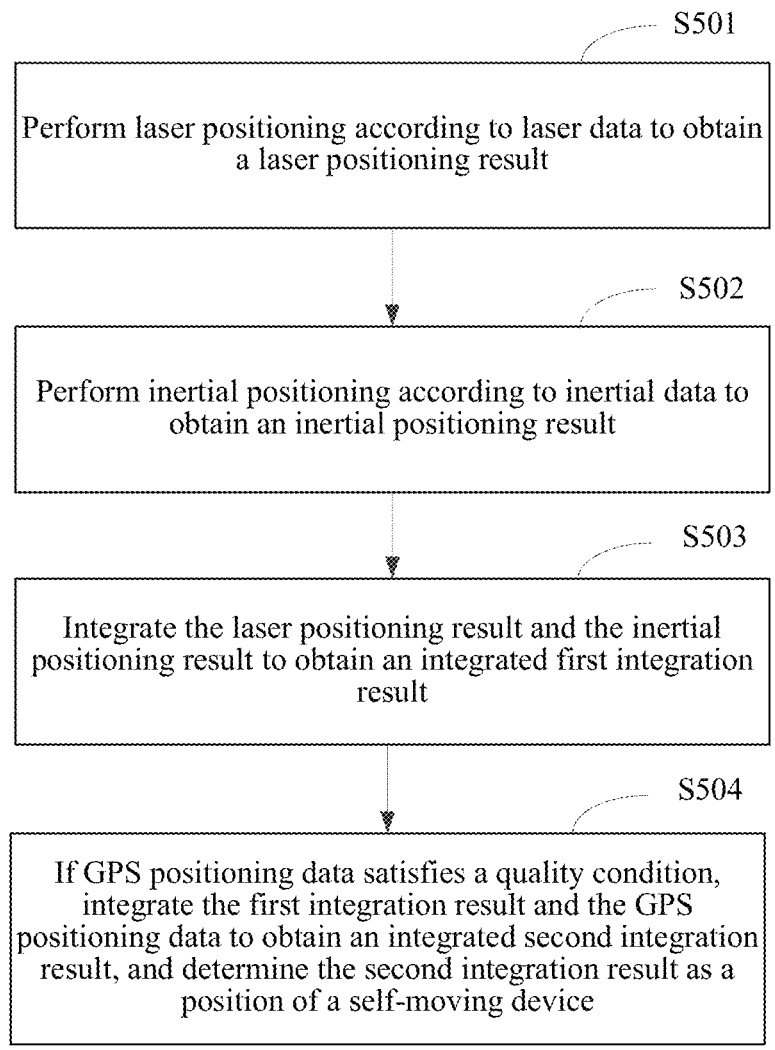
FIG. 27 is a flowchart of a positioning method according to an embodiment of the present disclosure.

FIG. 27 is a flowchart of a positioning method according to an embodiment of the present disclosure. The method may be implemented by using a processor, for example, by using the foregoing processing module 14. As shown in FIG. 27, the positioning method according to another embodiment of the present disclosure includes the following steps:

Step S501: Perform laser positioning according to laser data to obtain a laser positioning result.

Step S502: Perform inertial positioning according to inertial data to obtain an inertial positioning result.

Step S503: Integrate the laser positioning result and the inertial positioning result to obtain an integrated first integration result.

Step S504: If GPS positioning data satisfies a quality condition, integrate the first integration result and the GPS positioning data to obtain an integrated second integration result, and determine the second integration result as a position of a self-moving device.

In a possible implementation, the method further includes:

if the GPS positioning data does not satisfy the quality condition, determining the first integration result as the position of the self-moving device.

In a possible implementation, step 503 includes:

if the laser positioning result is valid, integrating the laser positioning result and the inertial positioning result to obtain the integrated first integration result; or if the laser positioning result is invalid, determining the inertial positioning result as the first integration result.

In a possible implementation, step S504 includes:

if the GPS positioning data satisfies the quality condition, acquiring a second integration result of the self-moving device at a current moment according to a first integration result at the current moment, GPS positioning data at the current moment, and a second integration result at a previous moment.

In a possible implementation, the inertial data includes one or more of speed, acceleration, angular velocity, and an orientation angle.

In a possible implementation, step S503 includes:

integrating the laser positioning result and the inertial positioning result in a manner of extended Kalman filtering.

In a possible implementation, step S504 includes:

integrate the first integration result and the GPS positioning data in a manner of extended Kalman filtering.

Figure 28:
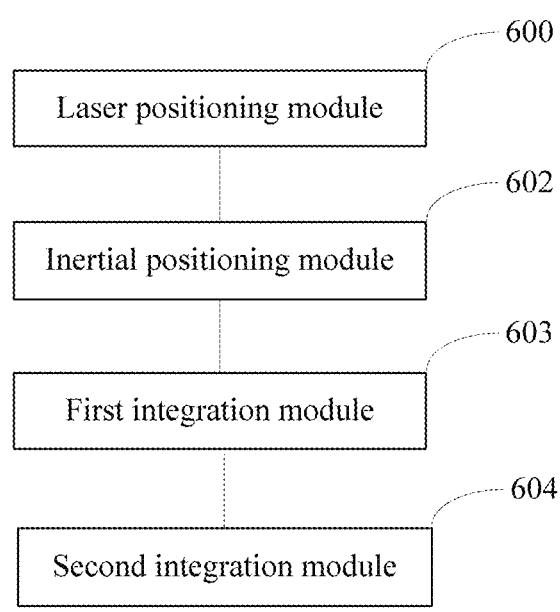
FIG. 28 is a block diagram of a positioning apparatus according to an embodiment of the present disclosure.

FIG. 28 is a block diagram of a positioning apparatus according to an embodiment of the present disclosure. The apparatus may be implemented by using the foregoing processing module 14. As shown in FIG. 28, the positioning apparatus according to another embodiment of the present disclosure includes a laser positioning module 600, an inertial positioning module 602, a first integration module 603, and a second integration module 604.

The laser positioning module 600 is configured to perform laser positioning according to laser data to obtain a laser positioning result;

The inertial positioning module 602 is configured to perform inertial positioning according to inertial data to obtain an inertial positioning result.

The first integration module 603 is configured to integrate the laser positioning result and the inertial positioning result to obtain an integrated first integration result.

The second integration module 604 is configured to: if GPS positioning data satisfies a quality condition, integrate the first integration result and the GPS positioning data to obtain an integrated second integration result, and determine the second integration result as a position of self-moving device.

According to the embodiment of the present disclosure, the laser module 15, the IMU module 12, and the GPS module 13 can respectively acquire laser data, inertial data, and GPS positioning data, and positioning results are integrated twice to determine a position of the self-moving device, so that the self-moving device can implement precise autonomous positioning.

In a possible implementation, the apparatus may be further configured to:

if the GPS positioning data does not satisfy the quality condition, determine the first integration result as the position of the self-moving device.

In a possible implementation, the first integration module 603 may be specifically configured to:

if the laser positioning result is valid, integrate the laser positioning result and the inertial positioning result to obtain the integrated first integration result; or if the laser positioning result is invalid, determine the inertial positioning result as the first integration result.

In a possible implementation, the second integration module 604 may be specifically configured to:

if the GPS positioning data satisfies the quality condition, acquire a second integration result of the self-moving device at a current moment according to a first integration result at the current moment, GPS positioning data at the current moment, and a second integration result at a previous moment.

In a possible implementation, the inertial data includes one or more of speed, acceleration, angular velocity, and an orientation angle.

In a possible implementation, the first integration module 603 may be specifically configured to:

integrate the laser positioning result and the inertial positioning result in a manner of extended Kalman filtering.

In a possible implementation, the second integration module 604 may be specifically configured to:

integrate the first integration result and the GPS positioning data in a manner of extended Kalman filtering.

The present disclosure may be a system, a method and/or a computer program product. The computer program product may include a computer readable storage medium loaded with computer readable program instructions used to enable a processor to implement the aspects of the present disclosure.

The computer readable storage medium may be a tangible device that can retain and store instructions for use by an instruction execution device. The computer readable storage medium may be, for example, but is not limited to, an electrical storage device, a magnetic storage device, an optical storage device, an electromagnetic storage device, a semiconductor storage device or any suitable combination of the foregoing. A more specific example (a nonexhaustive list) of the computer readable storage medium includes the following: a portable computer diskette, a hard disk, a random-access memory (RAM), a read-only memory (ROM), an erasable programmable ROM (EPROM or flash memory), a static RAM (SRAM), a portable compact disc ROM (CD-ROM), a digital versatile disk (DVD), a memory disk, a floppy disk, a mechanically encoded device such as a punch-cards or raised structures in a groove having instructions stored thereon, and any suitable combination of the foregoing. The computer readable storage medium used herein is not to be construed as being transitory signals per se, such as radio waves or other freely propagating electromagnetic waves, electromagnetic waves (for example, light pulses passing through a fiber-optic cable) propagating through a waveguide or other transmission media, or electrical signals transmitted through a wire.

The computer readable program instructions described herein may be downloaded from the computer readable storage medium to each computing/processing device, or to an external computer or external storage device via a network such as the Internet, a local area network, a wide area network and/or a wireless network. The network may include copper-transmitted cable, optical fiber transmission, wireless transmission, a router, a firewall, a switch, a gateway computer and/or an edge server. A network adapter card or network interface in each computing/processing device receives a computer readable program instruction from the network and forwards the computer readable program instruction for storage in the computer readable storage medium of each computing/processing device.

The computer program instructions for executing operations of the present disclosure may be assembly instructions, instructions of an instruction set architecture (ISA), machine instructions, machine-related instructions, microcodes, firmware instructions, state setting data or source codes or target codes compiled in one or any combination of a plurality of programming languages. The programming languages include object-oriented programming languages such as Smalltalk and C++, and conventional procedural programming languages such as "C" language or similar programming languages. The computer readable program instructions may be completely executed on a user computer, partially executed on a user computer, executed as an independent software package, partially executed on a user computer and partially on a remote computer, or executed completely on a remote computer or server. In a case in which a remote computer is involved, the remote computer may be connected to the user computer via any type of network, including a local area network (LAN) and a wide area network (WAN), or may be connected to an external computer (for example, connected via the Internet using an Internet service provider). In some embodiments, state information of the computer readable program instructions is used to customize an electronic circuit, for example, a programmable logic circuit, a field programmable gate array (FPGA) or a programmable logic array (PLA). The electronic circuit can execute the computer readable program instructions to implement various aspects of the present disclosure.

Various aspects of the present disclosure are described herein with reference to flowcharts and/or block diagrams of the methods, apparatuses (systems), and the computer program products according to the embodiments of the present disclosure. It should be understood that each block of the flowcharts and/or block diagrams and a combination of various blocks in the flowcharts and/or block diagrams may be implemented by computer readable program instructions.

These computer readable program instructions may be provided to a processor of a general-purpose computer, a dedicated computer or another programmable data processing apparatus to manufacture a machine, so that these instructions, when executed by the processor of the computer or the another programmable data processing apparatus, generate an apparatus for implementing functions/actions stipulated in one or more blocks in the flowcharts and/or block diagrams. These computer readable program instructions may also be stored in the computer readable storage medium and enable the computer, the programmable data processing apparatus and/or another device to work in a specific manner, so that the computer readable medium stored with the instructions includes an article of manufacture, including instructions for implementing various aspects of the functions/actions stipulated in one or more blocks of the flowcharts and/or block diagrams.

The computer readable program instructions may also be loaded into a computer, another programmable a data processing apparatus or another device, so as to execute a series of operation steps on the computer, the another programmable data processing apparatus or the another device to generate a computer-implemented procedure. Therefore, the instructions executed on the computer, the another programmable data processing apparatus or the another device implementation functions/actions stipulated in one or more blocks of the flowcharts and/or block diagrams.

The flowcharts and block diagrams in the accompanying drawings illustrate system architectures, functions, and operations that may be implemented by the systems, the methods, and the computer program products according to the embodiments of the present disclosure. In this regard, each block in the flowcharts or block diagrams may represent a module or a part of a program segment or instruction. The module or the part of the program segment or instruction includes one or more executable instructions for implementing stipulated logic functions. In some alternative implementations, the functions indicated in the blocks may also take place in an order different from that indicated in the accompanying drawings. For example, two successive blocks may be in fact executed in parallel or sometimes in a reverse order dependent on the involved functions. It should also be noted that each block in the block diagrams and/or flowcharts and a combination of the blocks in the block diagrams and/or flowcharts may be implemented by a hardware-based system exclusive for executing stipulated functions or actions, or may be implemented by a combination of dedicated hardware and computer instructions.

Various embodiments of the present disclosure have been described above and the above description is exemplary rather than exhaustive and is not limited to the disclosed embodiments. Many modifications and variations are obvious to a person of ordinary skill in the art without departing from the scope and spirit of the described embodiments. The selection of terms herein aims to best explain principles and actual applications of the embodiments or technical improvements made in the market by the embodiments, or enable a person of ordinary skill in the art to understand the embodiments disclosed herein.

What is claimed is:

1. A positioning apparatus, wherein a carrier can carry the positioning apparatus and walk, the positioning apparatus comprising:
a first positioning module, configured to acquire a first positioning result of the carrier of the positioning apparatus;
a sensor module, configured to measure acceleration and an angle parameter of walking of the carrier of the positioning apparatus; and
a processing module, configured to:
in a first mode used to determine a boundary of a working range of a self-moving device, if the first positioning result satisfies a quality condition, determine a position of the carrier of the positioning apparatus according to the first positioning result; or if the first positioning result does not satisfy a quality condition, determine a position of the carrier of the positioning apparatus according to the acceleration and the angle parameter and based on a pedestrian dead reckoning algorithm; and
determine the boundary according to the position of the carrier of the positioning apparatus.

2. The positioning apparatus according to claim 1, wherein the processing module is further configured to:
acquire a model parameter of a step length-frequency model of the carrier of the positioning apparatus, wherein the step length-frequency model represents a relationship between a step frequency and a step length of the carrier; and
the determining a position of the carrier of the positioning apparatus according to the acceleration and the angle parameter and based on a pedestrian dead reckoning algorithm comprises:
determining the position of the carrier of the positioning apparatus according to the model parameter of the step length-frequency model, the acceleration, and the angle parameter and based on the pedestrian dead reckoning algorithm.

3. The positioning apparatus according to claim 2, wherein the determining the position of the carrier of the positioning apparatus according to the model parameter of the step length-frequency model, the acceleration, and the angle parameter and based on the pedestrian dead reckoning algorithm comprises:

when the first positioning result does not satisfy the quality condition, acquiring a latest first positioning result that satisfies the quality condition as a starting position for the pedestrian dead reckoning algorithm;
determining a real-time course of the carrier according to the angle parameter;
determining a real-time step frequency of the carrier according to the acceleration;
determining a real-time step length of the carrier according to the real-time step frequency and the model parameter of the step length-frequency model and by using the step length-frequency model; and
determining the position of the carrier of the positioning apparatus according to the real-time course, the real-time step length, and the starting position and based on the pedestrian dead reckoning algorithm.

4. The positioning apparatus according to claim 2, wherein the acquiring a model parameter of a step length-frequency model of the carrier of the positioning apparatus comprises:
determining the step frequency and a step point of the carrier according to the acceleration measured by the sensor module, determining the step length of the carrier according to the first positioning result corresponding to the step point, and determining the model parameter of the step length-frequency model according to the step frequency and the step length, wherein the step point is a feature point of each step of the carrier.

5. The positioning apparatus according to claim 1, wherein the processing module is further configured to:
when the first positioning result changes from not satisfying the quality condition to satisfying the quality condition, acquire a first position, determined based on the pedestrian dead reckoning algorithm, of the carrier of the positioning apparatus and a second position, determined according to the first positioning result of the first positioning module, of the carrier of the positioning apparatus; and
calibrate, according to the first position and the second position, the position, determined based on the pedestrian dead reckoning algorithm, of the carrier of the positioning apparatus when the first positioning result does not satisfy the quality condition.

6. The positioning apparatus according to claim 1, wherein the determining the boundary according to the position of the carrier of the positioning apparatus comprises:
performing interpolation processing on the position, determined based on the pedestrian dead reckoning algorithm, of the carrier of the positioning apparatus, to obtain the position of the carrier of the positioning apparatus after the interpolation processing; and
performing smooth filtering on the position of the carrier of the positioning apparatus after the interpolation processing and the position, determined according to the first positioning result, of the carrier of the positioning apparatus, to determine the boundary.

7. The positioning apparatus according to claim 1, wherein the first positioning module is a satellite positioning module, and the first positioning result is a satellite positioning result.

8. The positioning apparatus according to claim 7, wherein the processing module is further configured to:
determine, according to either or both of a satellite quantity received by the satellite positioning module and a positioning state of the satellite positioning module, whether the satellite positioning result of the satellite positioning module satisfies the quality condition.

9. The positioning apparatus according to claim 8, wherein the determining, according to either or both of a satellite quantity received by the satellite positioning module and a positioning state of the satellite positioning module, whether the satellite positioning result of the satellite positioning module satisfies the quality condition comprises:
if the positioning state is a specified state and the satellite quantity is not less than a threshold, determining that the satellite positioning result satisfies the quality condition.

10. The positioning apparatus according to claim 1, wherein the positioning apparatus can be installed at the self-moving device, and
the processing module is configured to: in a second mode used to locate the self-moving device, determine a position of the self-moving device according to at least one of the first positioning result and an inertial positioning result, wherein
the inertial positioning result is determined according to at least the acceleration and the angle parameter output by the sensor module and based on an inertial navigation prediction algorithm.

11. The positioning apparatus according to claim 10, wherein the inertial navigation prediction algorithm comprises an inertial navigation system (INS) algorithm.

12. The positioning apparatus according to claim 1, wherein the pedestrian dead reckoning algorithm comprises a pedestrian dead reckoning (PDR) algorithm.

13. The positioning apparatus according to claim 1, wherein the first positioning module comprises an ultra-wideband (UWB) positioning module.

14. A self-moving device, wherein the self-moving device comprises a device body and the positioning apparatus according to claim 1, and the positioning apparatus can be detachably installed at the device body.

15. A positioning method, wherein the positioning method including:
acquiring a first positioning result of a carrier of a positioning apparatus and acceleration and an angle parameter of walking of the carrier;
in a first mode used to determine a boundary of a working range of a self-moving device, if the first positioning result satisfies a quality condition, determining a position of the carrier of the positioning apparatus according to the first positioning result;
if the first positioning result does not satisfy a quality condition, determining a position of the carrier of the positioning apparatus according to the acceleration and the angle parameter and based on a pedestrian dead reckoning algorithm; and
determining the boundary according to the position of the carrier of the positioning apparatus.

16. A positioning apparatus, wherein a carrier can carry the positioning apparatus and walk, the positioning apparatus comprising:
a first positioning module, configured to acquire a first positioning result of the carrier of the positioning apparatus;
a sensor module, configured to measure acceleration and an angle parameter of walking of the carrier of the positioning apparatus; and
a processing module, configured to:
in a first mode used to determine a boundary of a working range of an automatic walking device, determine a third position of the carrier of the positioning apparatus according to the first positioning result; determine a fourth position of the carrier of the positioning apparatus according to the acceleration and the angle parameter and based on a pedestrian dead reckoning algorithm; determine a position of the carrier of the positioning apparatus according to the third position and the fourth position; and
determine the boundary according to the position of the carrier of the positioning apparatus.

17. The positioning apparatus according to claim 16, wherein the determining a position of the carrier of the positioning apparatus according to the third position and the fourth position comprises:
determining the position of the carrier of the positioning apparatus according to integration of the third position and the fourth position.

18. The positioning apparatus according to claim 17, wherein the determining the position of the carrier of the positioning apparatus according to integration of the third position and the fourth position comprises:
determining the position of the carrier of the positioning apparatus according to a weighted sum of the third position and the fourth position.

19. The positioning apparatus according to claim 18, wherein the processing module is further configured to:
determine respective weights of the third position and the fourth position in the weighted sum according to quality of the first positioning result.

20. A positioning method, the positioning method including:
acquiring a first positioning result of a carrier of a positioning apparatus and acceleration and an angle parameter of walking of the carrier; in a first mode used to determine a boundary of a working range of a self-moving device, determining a third position of the carrier of the positioning apparatus according to the first positioning result; determining a fourth position of the carrier of the positioning apparatus according to the acceleration and the angle parameter and based on a pedestrian dead reckoning algorithm; determining a position of the carrier of the positioning apparatus according to the third position and the fourth position; and
determining the boundary according to the position of the carrier of the positioning apparatus.

* * * * *